United States Patent
Brusberg et al.

(10) Patent No.: US 11,914,193 B2
(45) Date of Patent: Feb. 27, 2024

(54) OPTICAL ASSEMBLY FOR COUPLING WITH TWO-DIMENSIONALLY ARRAYED WAVEGUIDES AND ASSOCIATED METHODS

(71) Applicant: CORNING RESEARCH & DEVELOPMENT CORPORATION, Corning, NY (US)

(72) Inventors: Lars Martin Otfried Brusberg, Corning, NY (US); Douglas Llewellyn Butler, Painted Post, NY (US); David Francis Dawson-Elli, Charlotte, NC (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/834,440

(22) Filed: Jun. 7, 2022

(65) Prior Publication Data
US 2022/0404555 A1   Dec. 22, 2022

Related U.S. Application Data

(60) Provisional application No. 63/213,284, filed on Jun. 22, 2021.

(51) Int. Cl.
*G02B 6/36*    (2006.01)

(52) U.S. Cl.
CPC ........... *G02B 6/368* (2013.01); *G02B 6/3636* (2013.01); *G02B 6/3664* (2013.01)

(58) Field of Classification Search
CPC ..... G02B 6/368; G02B 6/3636; G02B 6/3664
See application file for complete search history.

(56) References Cited

U.S. PATENT DOCUMENTS

| | | | |
|---|---|---|---|
| 3,503,666 A | * | 3/1970 | Moore .............. G06K 7/10831 |
| | | | 250/227.28 |
| 5,006,201 A | | 4/1991 | Kaukeinen |

(Continued)

FOREIGN PATENT DOCUMENTS

| CN | 102375177 A | 3/2012 |
|---|---|---|
| CN | 203101677 U | 7/2013 |

(Continued)

OTHER PUBLICATIONS

Djogo et al., "Femtosecond laser additive and subtractive microprocessing: enabling a high-channel density silica interposer for multicore fibre to silicon-photonic packaging", International Journal of Extreme Manufacturing, vol. 1, No. 4, 2019, 10 pages.

(Continued)

*Primary Examiner* — Sung H Pak
(74) *Attorney, Agent, or Firm* — Adam R. Weeks

(57) ABSTRACT

An optical assembly includes stacked planar lightwave circuit (PLC) members each having a plurality of waveguides in a respective plane, to provide optical connections to two-dimensional arrays of external optical waveguides (e.g., optical fiber cores), with one array including non-coplanar groups of waveguides having group members that are alternately arranged in a lateral direction. An optical assembly may provide optical connections between array of cores having a different pitch and/or orientation to serve as a fanout interface. Methods for fabricating an optical assembly are further provided.

19 Claims, 29 Drawing Sheets

(56) References Cited

U.S. PATENT DOCUMENTS

| | | | |
|---|---|---|---|
| 5,109,460 A | 4/1992 | Baek et al. | |
| 5,742,720 A | 4/1998 | Kobayashi et al. | |
| 5,996,376 A | 12/1999 | Johnson et al. | |
| 6,157,756 A | 12/2000 | Ishiwata | |
| 6,826,347 B2 | 11/2004 | Matsumoto et al. | |
| 7,899,288 B2 | 3/2011 | Shimotsu | |
| 8,270,784 B2 | 9/2012 | Thomson et al. | |
| 8,548,291 B2 | 10/2013 | Doerr et al. | |
| 9,535,221 B2 | 1/2017 | Bradley | |
| 9,709,750 B1 | 7/2017 | Kuang et al. | |
| 9,753,221 B2 | 9/2017 | Baerenklau et al. | |
| 10,012,809 B2 | 7/2018 | Mentovich et al. | |
| 10,078,190 B2 | 9/2018 | Doerr et al. | |
| 10,481,325 B2 | 11/2019 | Cui et al. | |
| 10,866,081 B2 | 12/2020 | Nasilowski et al. | |
| 2003/0174961 A1 | 9/2003 | Hamada | |
| 2003/0180023 A1 | 9/2003 | Hamada | |
| 2008/0002936 A1 | 1/2008 | Sun | |
| 2008/0099430 A1 | 5/2008 | Brooks et al. | |
| 2010/0178007 A1* | 7/2010 | Thomson | G02B 6/30 264/1.25 |
| 2014/0161396 A1 | 6/2014 | Feng et al. | |
| 2019/0346629 A1 | 11/2019 | Morishima | |
| 2021/0096302 A1 | 4/2021 | Butler et al. | |
| 2021/0373245 A1* | 12/2021 | Butler | G02B 6/3636 |

FOREIGN PATENT DOCUMENTS

| | | |
|---|---|---|
| CN | 103885118 A | 6/2014 |
| CN | 102902024 B | 4/2015 |
| CN | 105589223 A | 5/2016 |
| CN | 106597612 B | 4/2017 |
| CN | 105467524 B | 7/2017 |
| CN | 206684343 U | 11/2017 |
| CN | 111323870 A | 6/2020 |
| CN | 111474641 A | 7/2020 |
| CN | 111766660 A | 10/2020 |
| EP | 0863417 A1 | 9/1998 |
| EP | 0974077 A2 | 1/2000 |
| EP | 1347318 B1 | 12/2010 |
| JP | 06-324221 A | 11/1994 |
| JP | 08-271767 A | 10/1996 |
| JP | 09-269436 A | 10/1997 |
| JP | 10-246838 A | 9/1998 |
| JP | 11-142676 A | 5/1999 |
| JP | 2000-066125 A | 3/2000 |
| JP | 2000-352639 A | 12/2000 |
| JP | 3256533 B2 | 2/2002 |
| JP | 2002-162538 A | 6/2002 |
| JP | 2003-043305 A | 2/2003 |
| JP | 2003-185871 A | 7/2003 |
| JP | 2003-270475 A | 9/2003 |
| JP | 2004-101989 A | 4/2004 |
| JP | 2004-325610 A | 11/2004 |
| JP | 3708838 B2 | 10/2005 |
| JP | 2011-237573 A | 11/2011 |
| JP | 2013-051656 A | 3/2013 |
| JP | 2013-057842 A | 3/2013 |
| JP | 5747384 B2 | 7/2015 |
| JP | 6013953 B2 | 10/2016 |
| JP | 2017-142275 A | 8/2017 |
| JP | 2018-124307 A | 8/2018 |
| JP | 2019-101152 A | 6/2019 |
| JP | 2019-131441 A | 8/2019 |
| JP | 2019-152804 A | 9/2019 |
| WO | 02/41055 A1 | 5/2002 |
| WO | 2013/051656 A1 | 4/2013 |
| WO | 2018/099575 A1 | 6/2018 |
| WO | 2018/135411 A1 | 7/2018 |
| WO | 2019/131441 A1 | 7/2019 |
| WO | 2020/017422 A1 | 1/2020 |

OTHER PUBLICATIONS

Dwivedi et al., "Multicore Fiber Link With SiN Integrated Fan-Out and InP Photodiode Array," in IEEE Photonics Technology Letters, vol. 30, No. 22, 2018, pp. 1921-1924.

Jean-Marc Fédéli, "Integrated Photonics: Materials, Devices, and Applications III", Proceedings of SPIE, vol. 9520, 2015, 9 pages.

Dwivedi, S., et al., "Multicore Fiber Link with SiN Integrated Fan-out and InP Photodiode Array", IEEE Photonics Technology Letters, 1-1, 2018, pp. 1-4.

Gligor Djogo, et al., "Femtosecond laser additive and subtractive micro-processing: enabling a high-channel-density silica interposer for multicore fibre to silicon-photonic packaging", International Journal of Extreme Manufacturing, vol. 1, No. 4, 2019, pp. 1-10.

Jian Liu, et al., "A two-dimensional dual-wavelength routing network with 1-to-10 cascaded fanouts", IEEE Photonics Technology Letters, vol. 10, No. 2, 1998, pp. 238-240.

Poulopoulos, G. N., et al., "SiN-assisted polarization-insensitive multicore fiber to silicon photonics interface", Integrated Photonics: Materials, Devices, and Applications III, Proc. of SPIE vol. 9520, 95200E, 2015, pp. 1-16.

\* cited by examiner

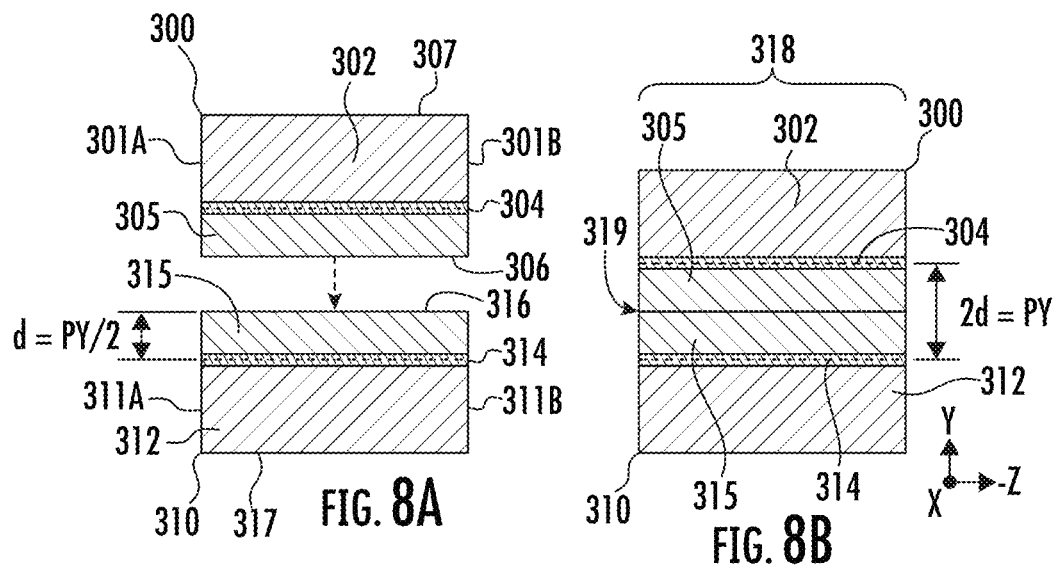
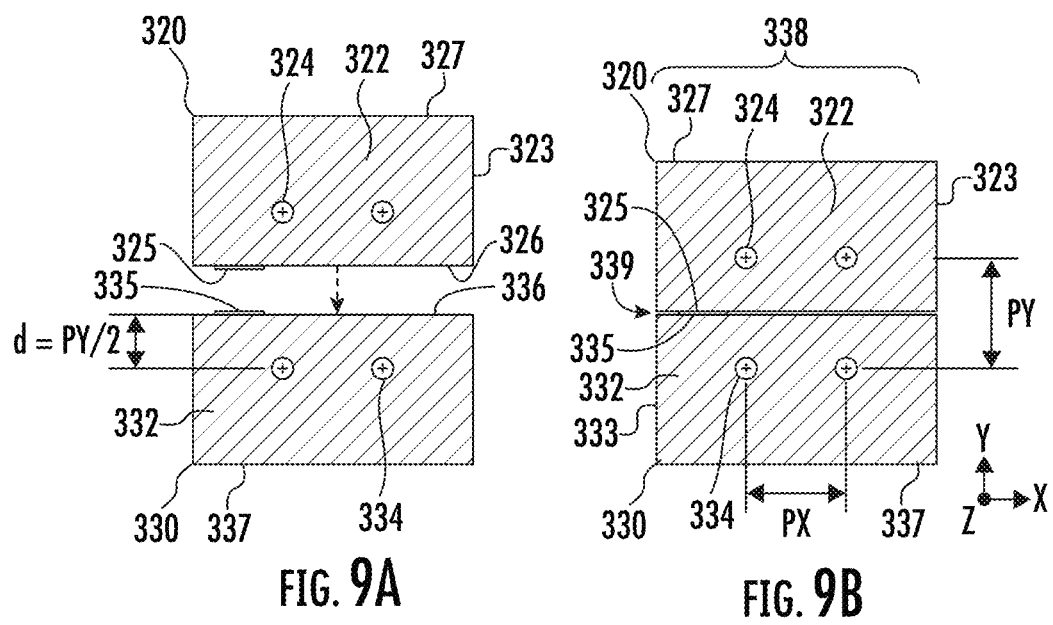

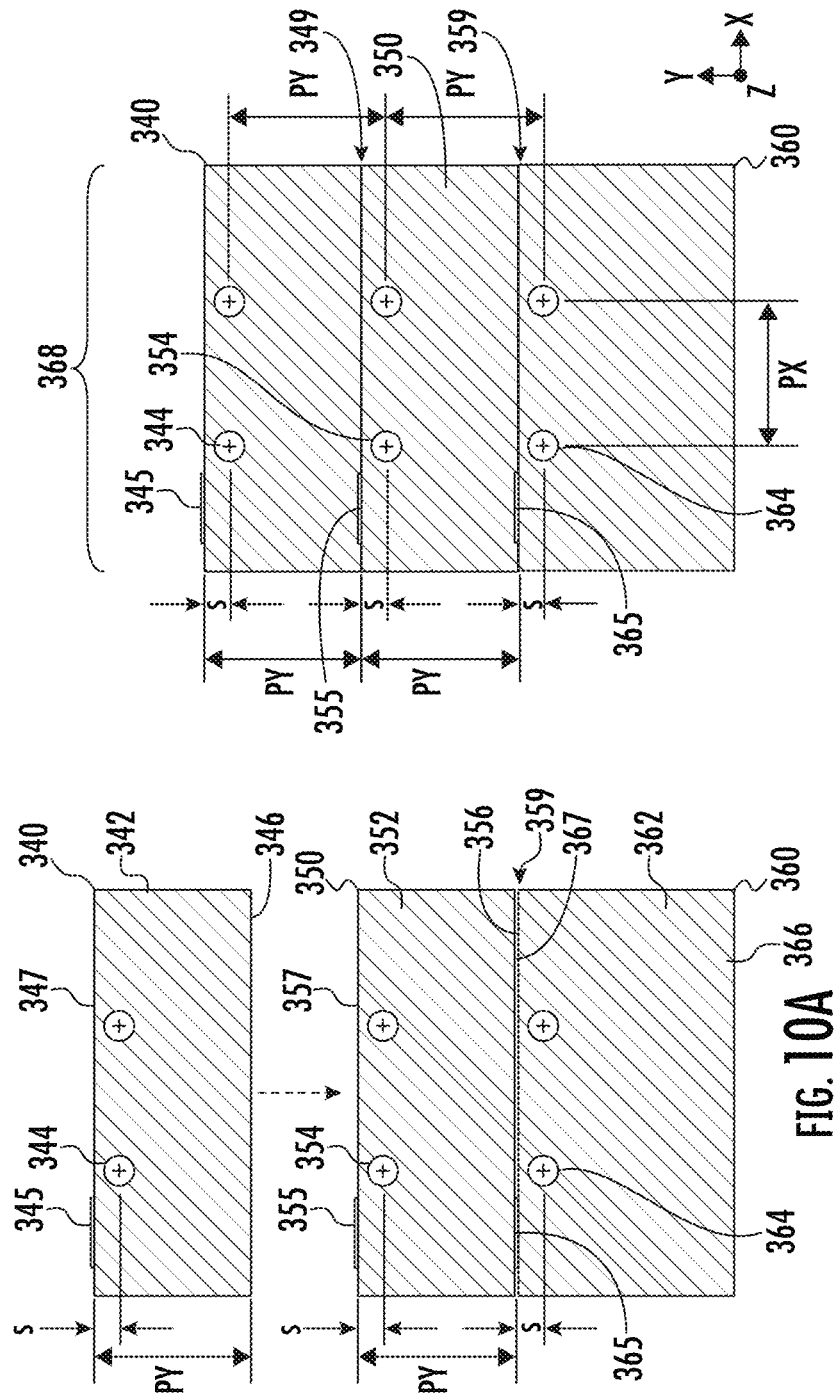

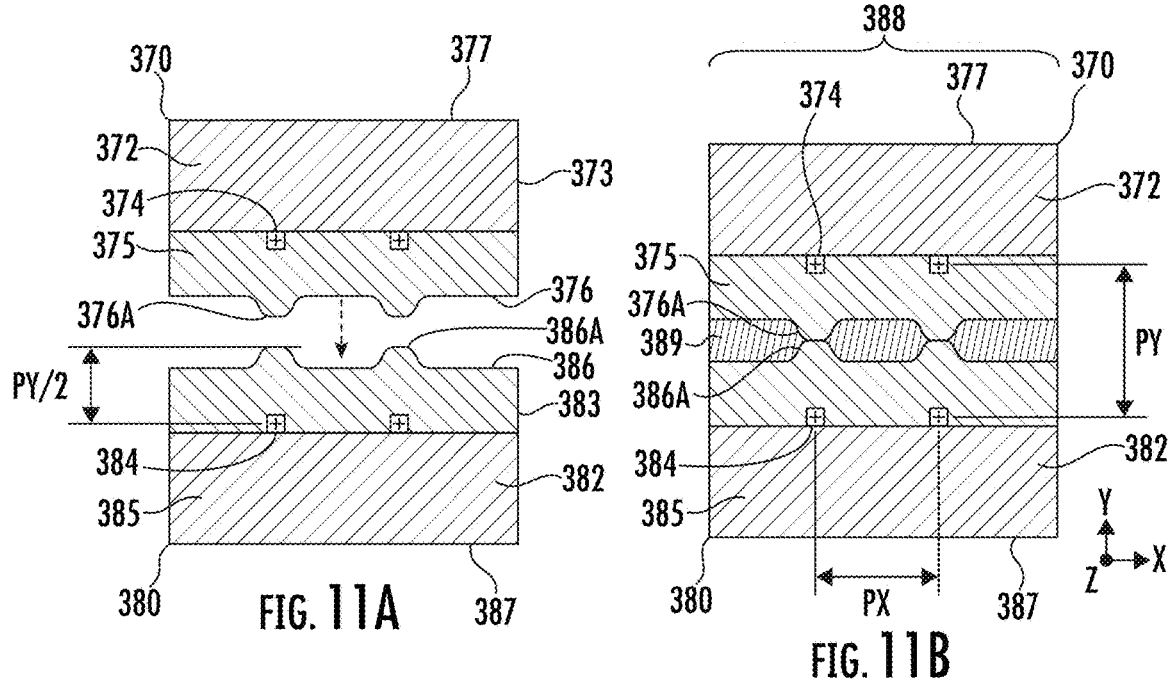
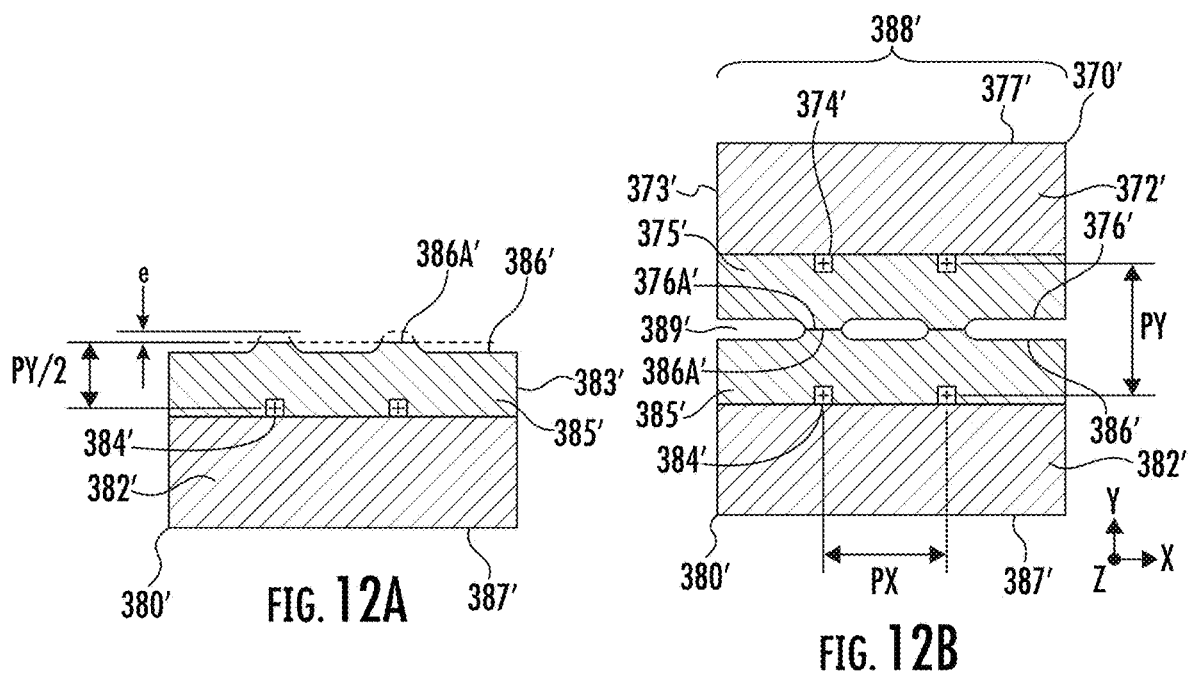

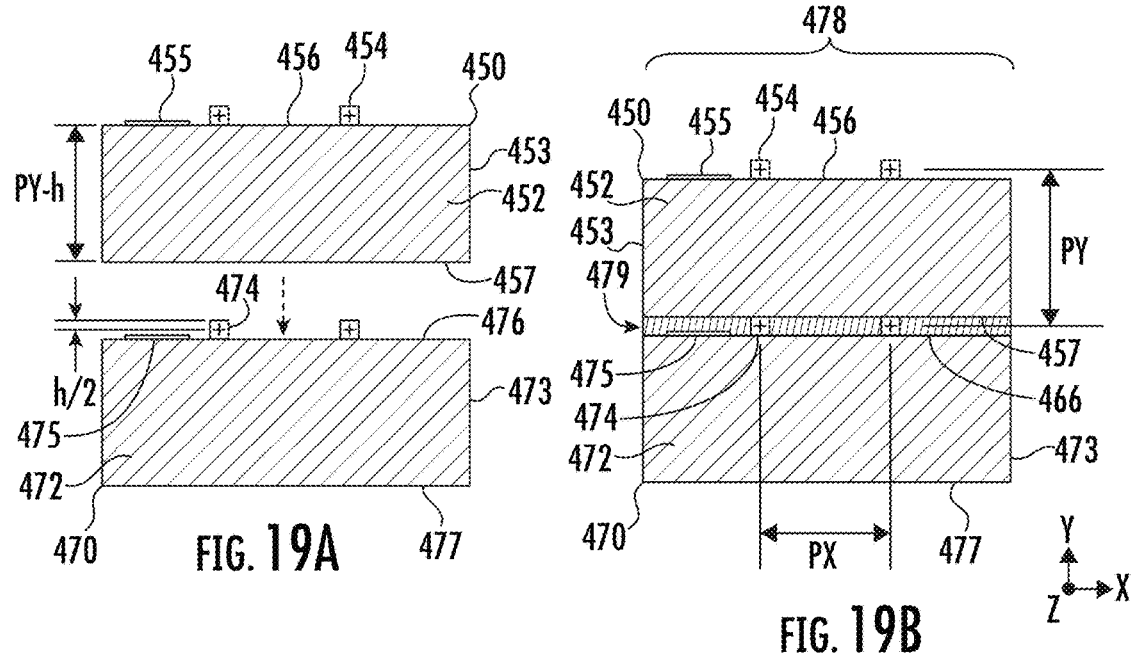
FIG. 19A
FIG. 19B
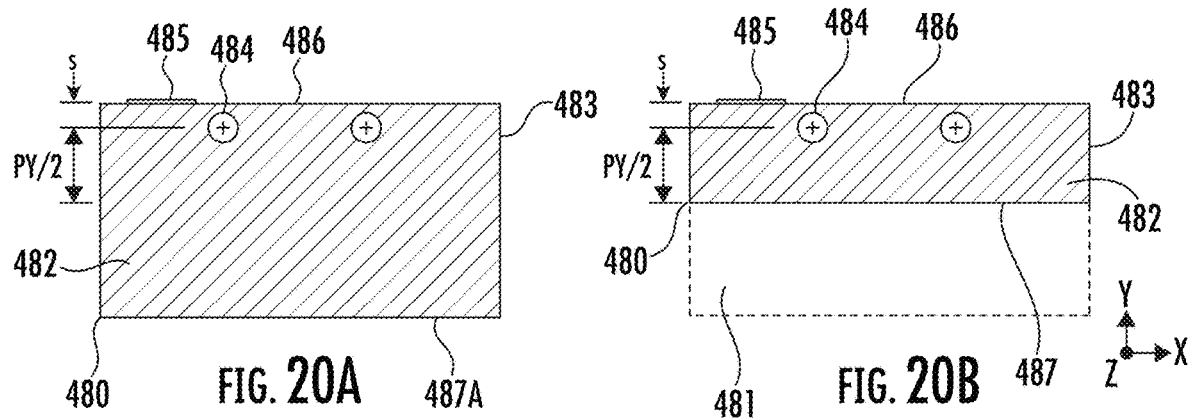
FIG. 20A
FIG. 20B

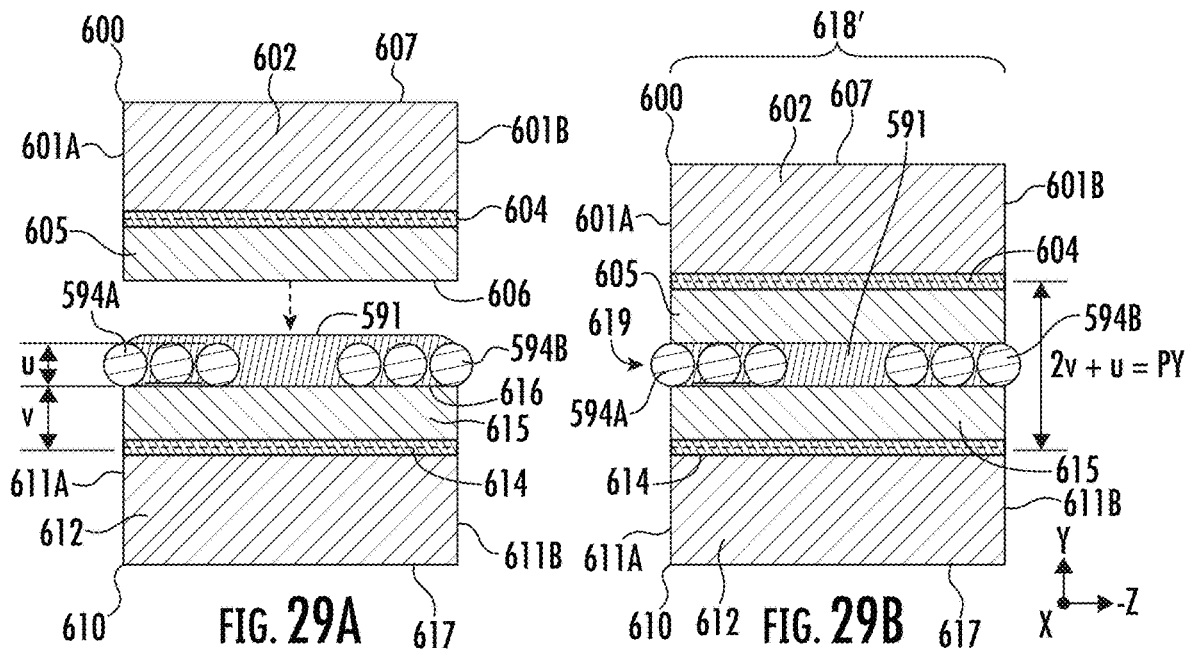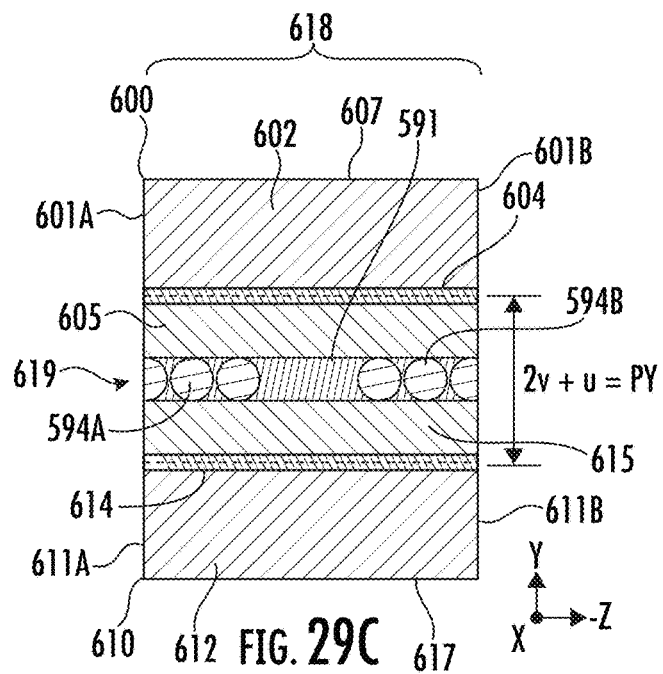

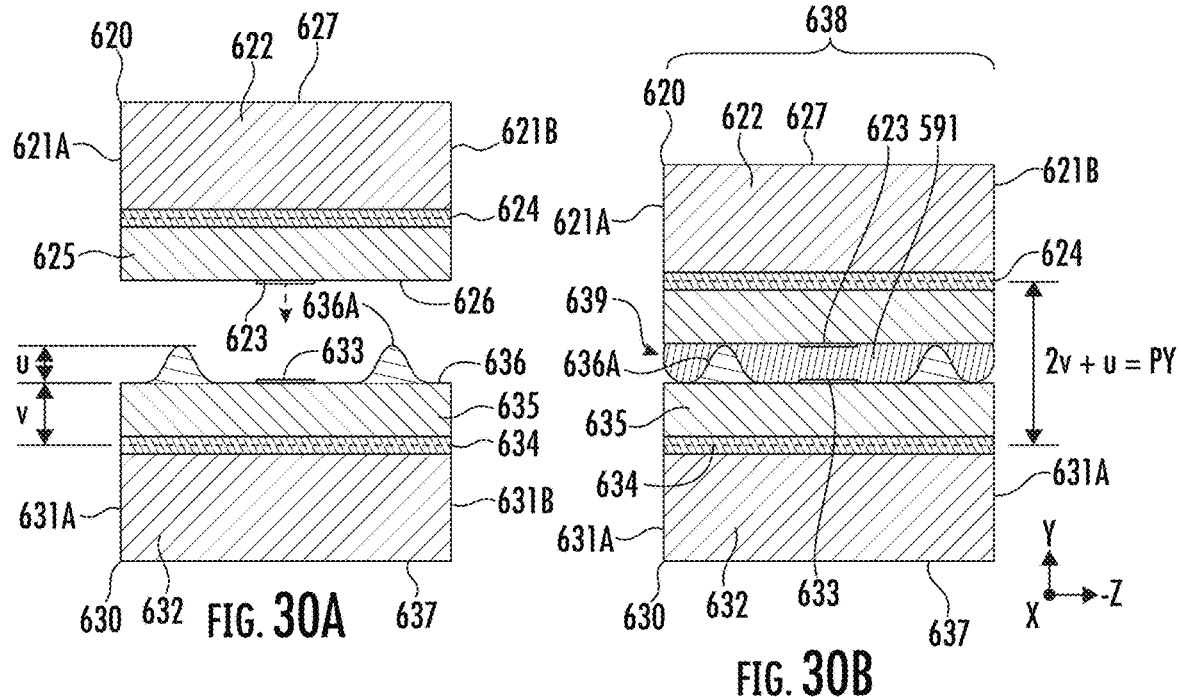
FIG. 30A
FIG. 30B
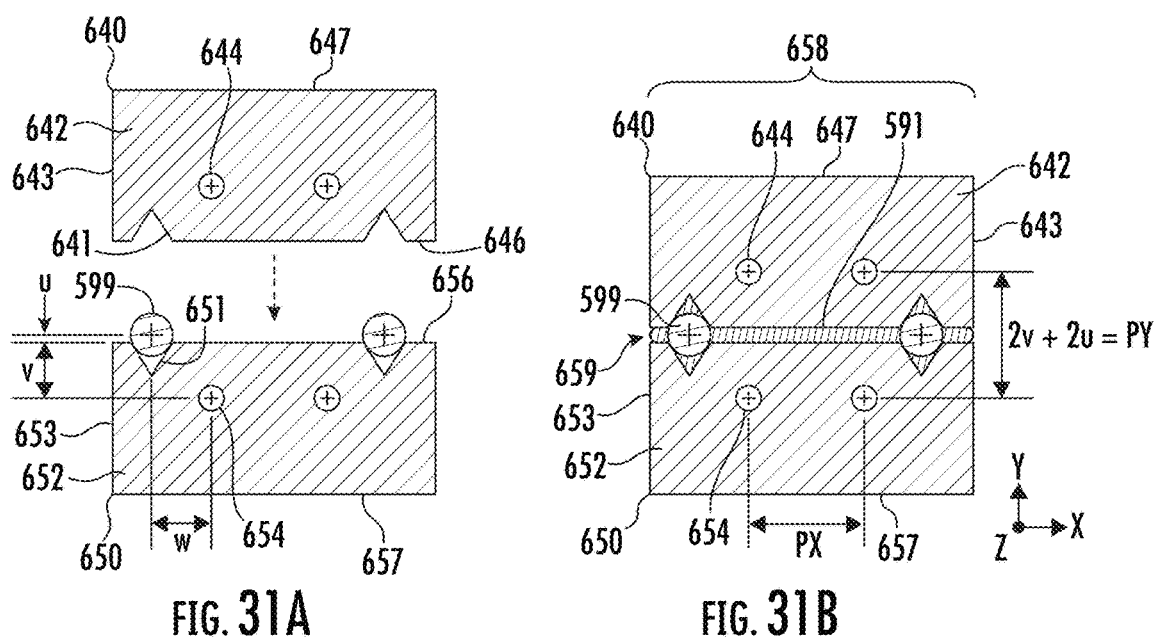
FIG. 31A
FIG. 31B

OPTICAL ASSEMBLY FOR COUPLING WITH TWO-DIMENSIONALLY ARRAYED WAVEGUIDES AND ASSOCIATED METHODS

PRIORITY APPLICATION

This application claims the benefit of priority of U.S. Provisional Application No. 63/213,284, filed on Jun. 22, 2021, the content of which is relied upon and incorporated herein by reference in its entirety.

BACKGROUND

The disclosure relates generally to optical assemblies having embedded waveguides for interconnecting optical circuits (including optical circuits with multi-core optical fibers), and methods for their fabrication and use.

Optical fibers are useful in a wide variety of applications, including the telecommunications industry for voice, video, and data transmission. In a telecommunications system that uses optical fibers, there are typically many locations where fiber optic cables (which carry the optical fibers) connect to equipment or other fiber optic cables.

As the demand for high-density parallel data transmission has increased, technologies such as multi-fiber cable assemblies and multi-core optical fibers (also referred to as "multi-core fibers" or "MCFs") have been developed to enhance data handling capacity within a given cable envelope (volume) and to reduce costs. A MCF includes a single cladding that contains multiple cores each capable of transmitting a different optical signal. Although MCFs may be more cost effective and volumetrically efficient than utilizing individual optical fibers, challenges exist in providing reliable and low-cost interfaces between MCFs and individual waveguides (such as individual optical fibers) having a pitch and/or orientation that differs from cores arranged in MCFs, particularly when MCFs contain cores arranged in multi-dimensional arrays (e.g., arrays having two or more rows).

SUMMARY

An optical assembly according to certain aspects is configured to provide optical connections between arrays of external optical waveguides (i.e., external to the optical assembly) having differing pitch and/or orientation, with the arrays being two dimensional, and one array of waveguides including non-coplanar groups of waveguides have group member waveguides that are laterally interspersed (i.e., with group member waveguide alternately arranged in a lateral direction). To make these optical connections, the optical assembly includes stacked first and second planar lightwave circuits (PLC) members that include a plurality of first waveguides arranged in a first horizontal plane and a plurality of second waveguides arranged in a second plane, respectively. Respective ends of the plurality of first waveguides are alternately arranged in a lateral direction relative to respective ends of the plurality of second waveguides. In certain implementations, the optical assembly can be used to provide optical connections between a MCF having fiber cores arranged in a first two-dimensional array and a plurality of individual (e.g., single-mode) optical fibers arranged in a second two-dimensional array having a differing core pitch and core orientation relative to the first two-dimensional array. Such an optical assembly can serve as a fanout interface. Methods for fabricating an optical assembly include fabricating first and second PLC members having a plurality of first waveguides and a plurality of second waveguides, respectively, and stacking the PLC members with adjacent inner faces to cause respective ends of the plurality of first waveguides to be alternately arranged in a lateral direction relative to respective ends of the plurality of second waveguides.

In one aspect, the disclosure relates to an optical assembly that comprises: a first PLC member including a first body structure bounded by a first inner face and a first outer face, and defining a plurality of first waveguides in or on the first body structure, wherein the plurality of first waveguides extends from an optical surface of the first body structure and that is in a transverse plane orthogonal to the first inner face and the first outer face; a second PLC member including a second body structure bounded by a second inner face and a second outer face, and defining a plurality of second waveguides in or on the second body structure, wherein the plurality of second waveguides extends from an optical surface of the second body structure and that is in the transverse plane orthogonal to the second inner face and the second outer face; wherein the first and second PLC members are in a stacked arrangement with the first inner face of the first PLC member facing the second inner face of the second PLC member, and with the optical surface of the first PLC member aligned with the optical surface of the second PLC member; and wherein the plurality of first waveguides is arranged in a first horizontal plane, the plurality of second waveguides is arranged in a second horizontal plane that is offset from the first horizontal plane, with the transverse plane including ends of the plurality of first waveguides and ends of the plurality of second waveguide alternately arranged in a lateral direction.

In certain embodiments, the optical surface of the first body structure comprises a first output optical surface; the optical surface of the second body structure comprises a second output optical surface; the first body structure further comprises a first input optical surface that opposes the first output optical surface; the second body structure further comprises a second input optical surface that opposes the second output optical surface; the plurality of first waveguides extends between the first input optical surface and the first output optical surface; and the plurality of second waveguides extends between the second input optical surface and the second output optical surface.

In certain embodiments, at the first output optical surface, the first waveguides of the plurality of first waveguides are spaced at a first pitch; at the second output optical surface, the second waveguides of the plurality of second waveguides are spaced at the first pitch; at the first input optical surface, the first waveguides of the plurality of first waveguides are spaced at a second pitch that differs from the first pitch; at the second input optical surface, the second waveguides of the plurality of second waveguides are spaced at the second pitch.

In certain embodiments, the first body structure comprises a front end and a rear end; and the optical surface of the first body structure is positioned at either the front end or the rear end.

In certain embodiments, the first body structure comprises a front end and a rear end; and the optical surface of the first body structure is arranged at an intermediate position between the front end and the rear end.

In certain embodiments, an array of V-grooves is defined in the first body structure between the intermediate position and either the front end or the rear end, the array of V-grooves supporting (i) a plurality of first optical fibers having optical fiber cores registered with the plurality of first waveguides and (ii) a plurality of second optical fibers having optical fiber cores registered with the plurality of second waveguides.

In certain embodiments, first peripheral alignment grooves are defined in the first inner face of the first body structure; second peripheral alignment grooves are defined in the second inner face of the second body structure; and tubular alignment members are arranged between paired first and second peripheral alignment grooves.

In certain embodiments, a first reference V-groove defined in the first inner face of the first body structure, wherein the first reference V-groove is substantially parallel to, and is shallower than, the first peripheral V-grooves; and a second reference V-groove defined in the second inner face of the second body structure, wherein the second reference V-groove is substantially parallel to, and is shallower than, the second peripheral V-grooves.

In certain embodiments, the tubular alignment members project beyond either (a) front ends of the first and second body structures, or (b) rear ends of the first and second body structures.

In certain embodiments, the plurality of first waveguides comprises a plurality of first ion exchange waveguides or first laser written waveguides that is recessed relative to the first inner face and is positioned closer to the first inner face than the first outer face; and the plurality of second waveguides comprises a plurality of second ion exchange waveguides or second laser written waveguides that is recessed relative to the second inner face and is positioned closer to the second inner face than the second outer face.

In certain embodiments, at least one first fiducial mark on the first inner face; and at least one second fiducial mark on the second inner face; wherein the at least one second fiducial mark is registered with the at least one first fiducial mark.

In certain embodiments, adhesive material and at least one spacer material are arranged between the first inner face and the second inner face.

In certain embodiments, an optical assembly further comprises at least one of the following features (i) or (ii): (i) the first body structure comprises a first substrate and a first overcladding layer, wherein the plurality of first waveguides is arranged between the first substrate and the first overcladding layer; (ii) the second body structure comprises a second substrate and a second overcladding layer, wherein the plurality of second waveguides is arranged between the second substrate and the second overcladding layer.

In certain embodiments, the plurality of first waveguides comprises a plurality of deposited dielectric first waveguides positioned closer to the first inner face than the first outer face; and the plurality of second waveguides comprises a plurality of deposited dielectric second waveguides positioned closer to the second inner face than the second outer face.

In another aspect, the disclosure relates to a method for fabricating an optical assembly, the method comprising: defining a group of waveguides in or on a single body having an inner face and an outer face, the group of waveguides being arranged closer to the inner face than the outer face; dividing the single body to form first and second planar lightwave circuit (PLC) members, wherein (i) the first PLC member has a first body structure bounded by a first inner face and a first outer face, and has a plurality of first waveguides as a first portion of the group of waveguides, the plurality of first waveguides extending from an optical surface of the first body structure that is in a transverse plane orthogonal to the first inner face and the first outer face, and (ii) the second PLC member has a second body structure bounded by a second inner face and a second outer face, and has a plurality of second waveguides as a second portion of the group of waveguides, the plurality of second waveguides extending from an optical surface of the second body structure that is in a transverse plane orthogonal to the second inner face and the second outer face; and stacking the first PLC member and the second PLC member with the first inner face of the first PLC member facing the second inner face of the second PLC member, and with the optical surface of the first PLC member aligned with the optical surface of the second PLC member; wherein the plurality of first waveguides is arranged in a first horizontal plane, the plurality of second waveguides is arranged in a second horizontal plane that is offset from the first horizontal plane, with the transverse plane including ends of the plurality of first waveguides and ends of the plurality of second waveguide alternately arranged in a lateral direction.

In certain embodiments, the method further comprises polishing the optical surface of the first body structure and the optical surface of the second body structure In certain embodiments, the method further comprises defining peripheral alignment grooves in the inner face of the single body, wherein after the dividing of the single body, the first PLC member comprises first peripheral alignment grooves defined in the first inner face, and the second PLC member comprises second peripheral alignment grooves defined in the second inner face; and providing tubular alignment members between pairs of first peripheral alignment grooves and second peripheral alignment grooves.

In certain embodiments, the method further comprises defining a reference V-groove in the inner face of the single body, wherein the reference V-groove is substantially parallel to, and is shallower than, each of the peripheral V-grooves defined in the inner face of the single body.

In certain embodiments, the method further comprises depositing an overcladding layer over the group of waveguides defined in or on the single body.

In certain embodiments, the method further comprises comprising depositing adhesive between the first PLC member and the second PLC member, and the actively aligning the first PLC member and the second PLC member In another aspect, features of any aspects or embodiments disclosed herein may be combined for additional advantage.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8A is an exploded side cross-sectional view of a portion of an optical assembly including two glass overclad PLC members with embedded waveguides and in a separated state, with glass overclad layers of the PLC members having a controlled thickness.

FIG. 8B is a side cross-sectional view showing the optical assembly portion of FIG. 8A with inner faces of the two overclad PLC members abutting one another.

FIG. 9A is an exploded end cross-section view of a portion of an optical assembly including two PLC members having embedded waveguides and fiducial marks for controlling inter-PLC alignment, with the PLC members arranged in a separated state.

FIG. 9B is an end cross-sectional view showing the optical assembly portion of FIG. 9A with inner faces of the two PLC members abutting one another.

FIG. 10A is a partially exploded end cross-sectional view of a portion of an optical assembly including three PLC members having embedded waveguides and fiducial marks for controlling inter-PLC alignment, with one PLC member separated from the two PLC members that abut one another.

FIG. 10B is a cross-sectional view showing the optical assembly portion of FIG. 10A with all three PLC members arranged in a stack abutting one another.

FIG. 11A is an exploded cross-section view of a portion of an optical assembly including two PLC members having glass overcladding layers with rounded ridges of locally increased thickness that are registered with waveguides embedded in the overcladding layers, and with the PLC members arranged in a separated state.

FIG. 11B is a cross-sectional showing the optical assembly portion of FIG. 11A in an assembled state with an adhesive material joining the PLC members.

FIG. 12A is a cross-sectional view of a PLC member having a glass overcladding layer with partially flattened, previously rounded ridges of locally increased thickness that are registered with waveguides embedded therein.

FIG. 12B is a cross-sectional view of two PLC members of FIG. 12A abutting one another during a step of assembling an optical assembly.

FIG. 19A is an exploded cross-sectional view of a portion of an optical assembly including two PLC members having surface deposited waveguides and topside fiducial marks, with the PLC members separated from one another.

FIG. 19B is a cross-sectional view of the optical assembly portion of FIG. 19A with the PLC members proximate to one another and adhesive between the PLC members.

FIG. 20A is a cross-sectional view of a PLC member having embedded waveguides and topside fiducial mark, prior to performance of a backside thinning operation.

FIG. 20B is a cross-sectional view of the PLC member of FIG. 20A following performance of a backside thinning operation to reduce a thickness of the PLC member.

FIG. 29A is a partially exploded cross-sectional view of a portion of an optical assembly including first and second PLC members having waveguides embedded in overcladding material, with multiple segregated groups of bare glass fibers (arranged perpendicular to the waveguides waveguides) and adhesive material arranged between the first and second PLC members.

FIG. 29B is a cross-sectional view of the optical assembly portion of FIG. 29A with the segregated groups of bare glass fibers and adhesive material sandwiched between the first and second PLC members.

FIG. 29C is a cross-sectional view of the optical assembly portion of FIG. 29B following processing (e.g., polishing) of optical surfaces of the first and second PLC members to eliminate projecting portions of the grouped bare glass fibers between the PLC members.

FIG. 30A is a partially exploded cross-sectional view of a portion of an optical assembly including first and second PLC members having waveguides embedded in overcladding material and having fiducial marks, with precision height laser bumps formed on the inner face of the first PLC member.

FIG. 30B is a cross-sectional view of the optical assembly portion of FIG. 30A with the upper PLC member contacting the laser bumps, and with adhesive material sandwiched between the first and second PLC members.

FIG. 31A is a partially exploded cross-sectional view of a portion of an optical assembly including first and second PLC members having embedded waveguides and having peripheral V-grooves defined in inner faces thereof, with the tubular alignment members received within the peripheral V-grooves of the lower PLC member.

FIG. 31B is a cross-sectional view of the optical assembly portion of FIG. 31A with the tubular alignment members received within the peripheral V-grooves of the first and second PLC members, and with adhesive material arranged between the first and second PLC members.

DETAILED DESCRIPTION

Figure 1A:
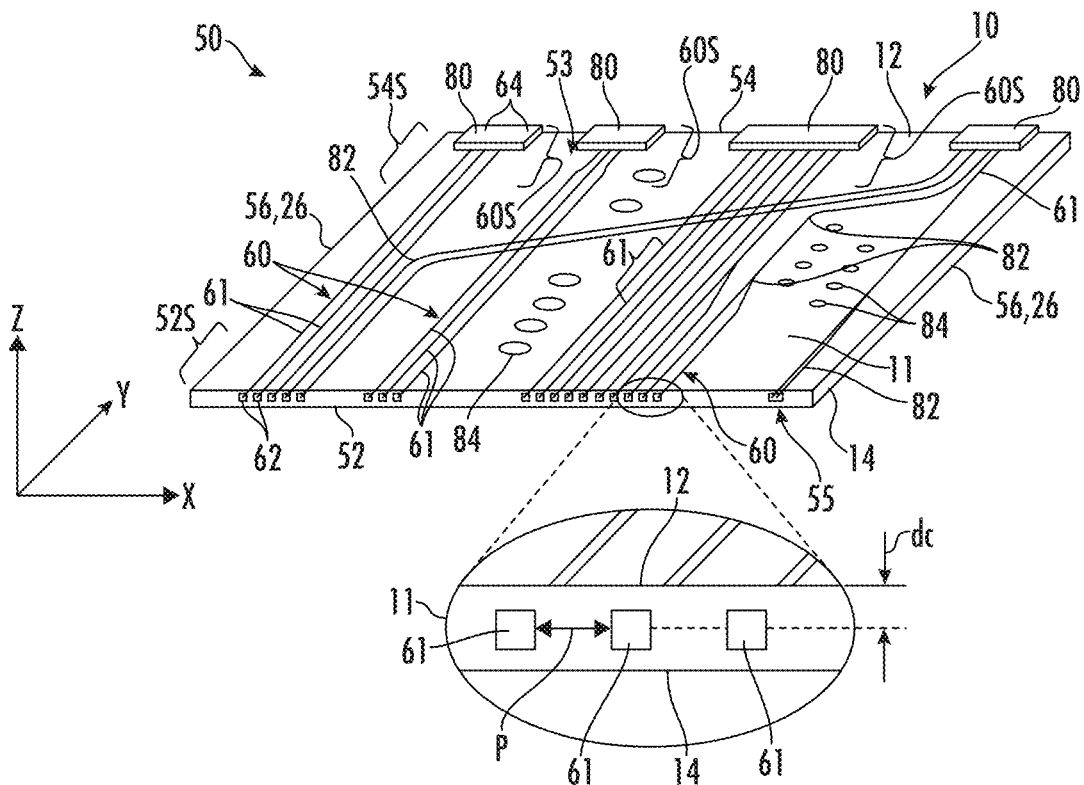
FIG. 1A is a perspective view of a waveguide assembly formed from a glass substrate with multiple glass optical waveguides defined along an upper surface thereof.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As introduced previously, an optical assembly according to certain aspects includes stacked first and second planar lightwave circuits (PLC) members that include, respectively, a plurality of first waveguides arranged in a first horizontal plane and a plurality of second waveguides arranged in a second horizontal plane. Respective ends of the plurality of first waveguides are alternately arranged in a lateral direction relative to respective ends of the plurality of second waveguides. The provision of two stacked PLC members having waveguides therein permits optical connections to external optical waveguides having differing pitch and/or orientation, in a repeatable manner that facilitates groupwise alignment (and therefore good optical coupling) with the external optical waveguides.

Before describing optical assemblies and their fabrication, the formation of glass optical waveguides in or on glass substrates will be introduced.

Figure 1B:
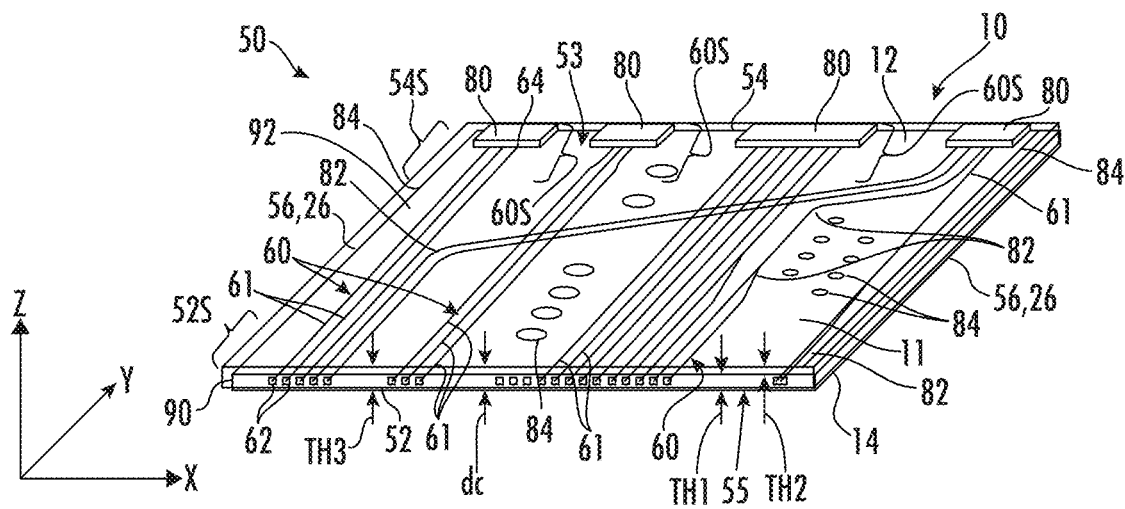
FIG. 1B is a perspective view of the waveguide assembly of FIG. 1A following addition of a protective coating over the upper surface of the glass substrate.

FIG. 1A is a perspective view of a glass waveguide assembly 50 formed from a glass substrate 10 with multiple glass optical waveguides ("waveguides") 61 defined in or on the glass substrate 10 (e.g., proximate to a top surface 12 thereof). FIG. 1B is a perspective view of the waveguide assembly 50 of FIG. 1A following addition of a protective coating 90 over the top surface 12 of the glass substrate 10. The glass waveguide assembly 50 has a front end 52, a back end 54, and sides 56 that respectively correspond to boundaries of the glass substrate 10. The glass waveguide assembly 50 also includes a top side 53 and a bottom side 55. The glass waveguide assembly 50 also includes a front-end assembly section 52S having the front end 52, and a back-end assembly section 54S having the back end 54.

With reference to FIGS. 1A and 1B, waveguides 61 define a waveguide array 60. Reference may be made herein to multiple waveguides 61 as well as to one or more waveguide arrays 60 by way of illustration.

The waveguides 61 are formed within a body 11 of the glass substrate 10 and extend generally in the y-direction from (at or near) the front end 52 to (at or near) the back end 54 of the glass substrate 10. Each waveguide 61 includes a front waveguide end 62 at or adjacent to the front end 52 of glass substrate 10 and a back waveguide end 64 at or near the back end 54 of the glass substrate 10. The waveguide array 60 includes a back-end section 60S that includes back waveguide ends 64. The waveguides 61 can also extend from the front end 52 of the glass substrate 10 or from the back end 54 of the glass substrate 10 to one of sides 56 of the glass substrate 10, e.g., by a combination of straight and/or curved waveguide sections 82.

The waveguides 61 are formed from glass, and in certain examples may be formed within a glass material of the body 11 by modifying the glass composition. In certain examples, this compositional modification may be accomplished by ion diffusion (e.g., electric field-assisted ion diffusion), by laser writing, or by a combination thereof. Thus, in certain examples, waveguides 61 may be formed within the body 11 of the glass substrate 10 without removing any glass from the body 11 or adding any glass to the body 11. In this context, it is noted that ion-diffusion does not result in the removal of glass or the addition of glass, but instead alters the composition of the glass by replacing existing mobile alkali ions in the glass with other alkali ions (e.g., replacing Na+ with K+) from an outside source, such as a molten bath. Likewise, laser writing does not remove any glass from the body 11 or add glass thereto, but instead locally alters the structure of the glass by locally compacting it, which in turn locally increases the refractive index.

In an example, the glass substrate 10 is made of ion-exchangeable glass, i.e., one that contains alkali ions such as $Na^+$. An example material for glass substrate 10 is a chemically strengthened glass (or a glass suitable for chemical strengthening). An example of such a glass is Corning® Gorilla® Glass, available from Corning, Inc., Corning, New York. In an example, glass substrate 10 is made of a $Ag^+$ ion-exchanged glass, e.g., where $Ag^+$ has been exchanged for $Na^+$ in the glass substrate. An ion exchange process for defining waveguides may include a single- or multi-step thermal or field-assisted ion-exchange with or without use of a mask layer for defining the waveguide layout. If desired, a waveguide layout may be defined by a mask layer formed on the top surface 12 of the glass substrate 10 prior to the ion-exchange. Waveguide layouts can be defined through the position of a focused laser by sequential laser writing. The resulting waveguides can be straight waveguides, curved waveguides, etc., and can include optical features or components such as tapers, crossings, splitters, combiners, and arcs, which may be combinable in fan-out or fan-in arrays in certain embodiments. In certain embodiments, a laser-based optical processing system (not shown) including a laser source, a focusing lens, and a movable support stage may be used to perform laser writing, to permit a focused laser beam to move relative to a glass substrate to define waveguides in the glass substrate (e.g., proximate to an upper surface thereof).

The depth dc to which waveguides 61 reside relative to the top surface 12 (or to a bottom surface 14) of the glass substrate 10 can vary, with reference to the magnified inset portion of FIG. 1A). Likewise, the pitch P of a waveguide array 60 can vary with position, and in particular can vary in the y-direction as well as in the z-direction (e.g., in instances case where the body 11 supports different rows of waveguides 61 at different depths within body 11). Each waveguide 61 can include a tapered section and can also vary in size along its length. The path of each waveguide 61 can also vary, i.e., it need not run in a straight line, and as noted above need not run in a given x-y plane. The waveguides 61 can be single mode or multimode. In certain examples, the back waveguide ends 64 may define respective optical quality end faces, which in an example can be formed by polishing (e.g., laser polishing or mechanical polishing) or score and break (e.g., diamond wheel scoring or laser scoring and separation).

The glass waveguide assembly 50 also includes at least one waveguide termination member ("connector") 80 that terminates at least one waveguide 61 (e.g., at or adjacent to the back waveguide end 64) at the back-end assembly section 54S. In an example, a single connector 80 may embody a multi-waveguide connector (e.g., a MT type or MPO type connector) that terminates multiple waveguides 61. In an example, each connector 80 may terminate a corresponding array 60 of one or more waveguides 61. In another example, at least one connector 80 may include waveguides 61 from different waveguide arrays 60. In an example, connector 80 encloses the back-end array section 60S of waveguide array 60 at the back-end assembly section 54S.

The glass waveguide assembly 50 can also include one or more OE-PCB (Opto-Electronic Printed Circuit Board) features or components 84 to facilitate the use of the glass waveguide assembly 50 in forming an OE-PCB, as described below. Exemplary OE-PCB features or components 84 include conducting (e.g., metal-filled) vias, insulating (e.g., polymer-filled) vias, electrical (conducting) contacts, electrical (conducting) wiring, optical vias, slots, cut-outs, polymer-filled cut-outs, open holes, perforations, fiducials, alignment features, etc. In an example, OE-PCB features or components 84 may be formed by drilling, etching, milling, depositing, laser ablation, etc. In particular, cut-outs are relatively large sections removed from glass substrate 10 and that can be used for mounting glass waveguide assembly 50 to a PCB or OE-PCB. If desired, cut-outs can be filled with a non-glass material (e.g., a polymer), some or all of which can be removed later on in the OE-PCB fabrication process. The OE-PCB features or components 84 for alignment are formed where needed to allow for a simple passive alignment process for connectors 80 and for other photonic devices of an OE-PCB.

With reference to FIG. 1B, the glass waveguide assembly 50 includes a protective coating 90 that has an outer surface 92. The protective coating 90 covers at least a substantial portion of top surface 12 of the glass substrate 10. In an example, the protective coating 90 covers substantially the entire top surface 12. In an example, the protective coating 90 covers at least a portion of bottom surface 14. Further in the example, the protective coating 90 also covers at least a portion of sides 56. In an example, protective coating 90 is applied to the entire glass substrate 10 except optionally for select regions (e.g., one or more connector regions 15) so that the glass substrate is substantially encapsulated. Thus, the protective coating 90 may or may not include the one or more connector regions 15. In another example, the protective coating 90 runs the length in the y-direction of top surface 12 except for the one or more connector regions 15 and further in the example does not extend to sides 56. In an example, the protective coating 90 is selectively applied to some or all of the OE-PCB features or components 84 of glass waveguide assembly 50. In an example, the protective coating 90 is applied to the same portion of top surface 12 of glass substrate 10 below which, or at which, the waveguide array 60 is supported. In an example, the protective coating 90 may include a mechanically and thermally reliable material such as resin, polymer, acrylate, silicone, benzocyclobutene, ormocer or siloxane that can withstand thermal processes such as PCB lamination.

In an example, the protective coating 90 is a dielectric material compatible with conventional PCB processing, such as a polymer or a resin. If connectors 80 are formed prior to applying protective coating 90, the connector regions 15 can be left uncoated, e.g., by using a masking process or a selective deposition or coating process or lift-off process. In other examples, connectors 80 include a portion of protective coating 90 as formed on connector regions 15.

The protective coating 90 may function to protect the glass substrate 10 and any other OE-PCB features or components 84 of the glass waveguide assembly 50 during subsequent PCB processing, which can involve relatively high temperatures. A related function of the protective coating 90 is to facilitate the use of PCB processing techniques forming the glass waveguide assembly 50 as well as for forming an OE-PCB as described below. Thus, in an example, the protective coating 90 may be made of a thermally stable material, including such materials that are optically transparent. In an example, the protective coating 90 has a thickness TH2 in the range from 1μη to 200μη. Thus, in an example, glass waveguide assembly 50 has a thickness TH3=TH1+2(TH2) when top and bottom surfaces 12 and 14 of glass substrate 10 are coated, or has a thickness TH3=TH1+TH2 when only the top surface of the glass substrate is coated. In certain instances, less than all OE-PCB features or components 84 of the glass waveguide assembly 50 are encapsulated within the protective coating 90. For example, some of the OE-PCB features or components 84 (e.g., conductive vias 110) can extend through protective coating 90. Likewise, connectors 80 as well as some of the optical features or components (e.g., straight and/or curved waveguide sections 82) and the OE-PCB features or components 84 can also extend from or otherwise not be coated with protective coating 90. In an example, OE-PCB features or components 84 in the form of electrical wiring can be formed on an outer surface 92 of the protective coating 90.

Figure 2A:
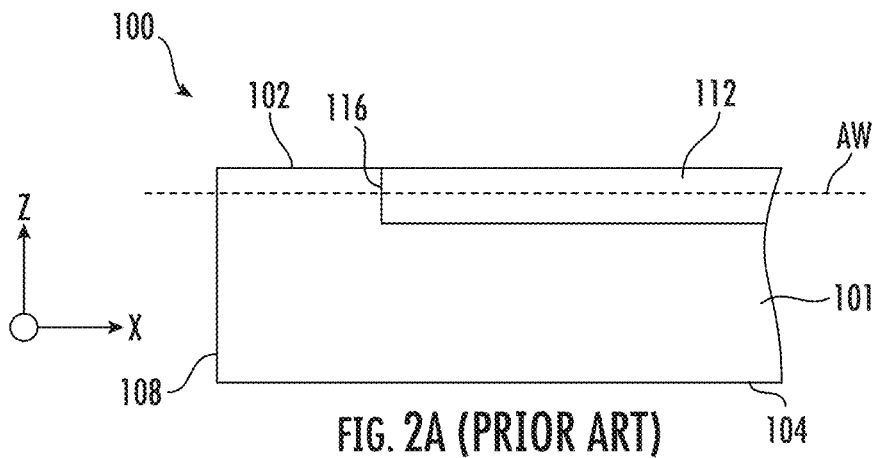
FIG. 2A is a magnified side (x-z) cross-sectional view of a peripheral portion of a waveguide assembly showing a glass optical waveguide defined along an upper surface of a glass substrate, with the glass optical waveguide terminating prior to reaching an edge of the substrate.

FIG. 2A is a magnified side (x-z) cross-sectional view of a peripheral portion of a waveguide assembly 100 showing a waveguide 112 defined along an upper surface 102 of a glass substrate 101, with the waveguide 112 terminating prior to reaching an edge 108 of the glass substrate 101. In an example, the substrate 101 may comprises a glass-based material, such as a glass, a glass-ceramic or a crystal. Example glasses can include soda-lime, borosilicate, germanosilicate, aluminosilicate ion-exchanged glasses, non-ion-exchanged glasses, chalcogenide glasses, or fused silica. Example crystals can include sapphire, diamond, lithium niobate, lithium tantalite, lithium triborate, barium borate, silicon, InP, and GaAs. In certain examples, the substrate 101 can be chemically strengthened, wherein the chemical strengthening can be localized or can extend over the entire volume of the substrate 101. As shown, the waveguide 112 has a waveguide axis AW and an end surface (facet) 116. The example waveguide 112 has an end surface 116 that resides with the glass substrate 101.

Figure 2B:
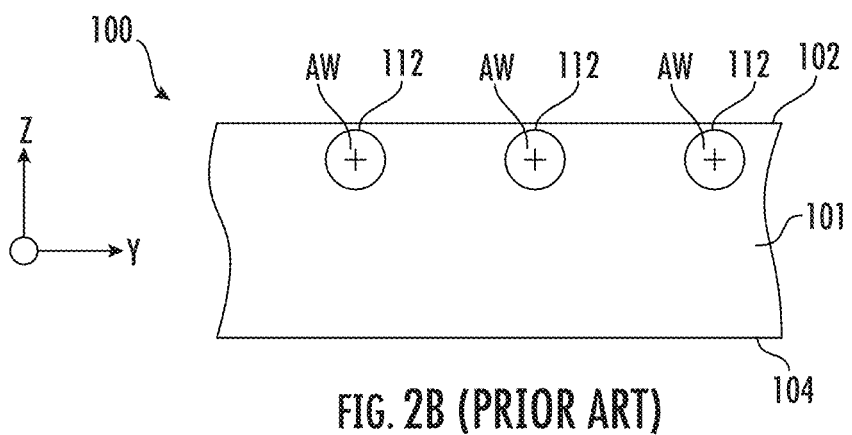
FIG. 2B is a magnified side (y-z) cross-sectional view of the waveguide assembly of FIG. 2A showing glass optical waveguides defined along the upper surface of the glass substrate.

FIG. 2B is a magnified side (y-z) cross-sectional view of the waveguide assembly 100 of FIG. 2A showing three waveguides 112 defined along the upper surface 102 of the glass substrate. In an example, the waveguides 112 can be formed by an ion-exchange process. In another example, the waveguides 112 can be formed using a laser-writing process. In other examples, the waveguides 112 can be formed using an ion-beam milling process, a photolithography process, an electron-beam lithography process, a thin-film deposition process, a lamination process, etching, deposition, and any other waveguide-forming process known in the art.

Generally, the waveguides 112 define localized regions of increased refractive index relative to remainder of the glass substrate 101. Two example techniques for forming the waveguides 112 include ion exchange and laser writing. For waveguides 112 formed within the glass substrate 101, the surrounding portion of the glass substrate 101 and the region immediately adjacent to the upper surface 102 (when the waveguide is at or near the upper surface) define a cladding for the waveguide 112. For ease of illustration and discussion, waveguides 112 considered herein are shown as formed within the substrate 101 and having a definite boundary with the substrate 101.

Figure 2C:
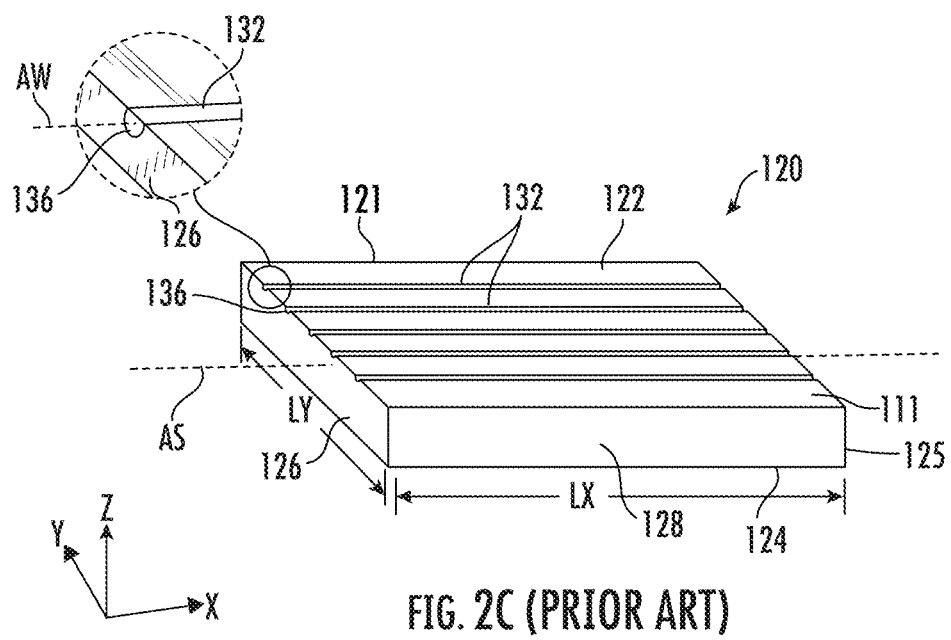
FIG. 2C is a perspective view of a waveguide assembly similar to the waveguide assembly shown in FIGS. 2A-2B, but with glass optical waveguides extending to edges of the glass substrate.

FIG. 2C is a perspective view of a waveguide assembly 120 similar to the waveguide assembly 100 shown in FIGS. 2A-2B, but with glass optical waveguides ("waveguides") 132 extending to front and rear faces 125, 126 of a glass substrate 121. The glass substrate 121 further includes an upper surface 122, a lower surface 124, and side edges 128. The glass substrate 121 has central substrate axis AS that runs through a center of the glass substrate 121 in the x-direction, as well as a length LX in the x-direction and a length LY in the y-direction. As illustrated, the waveguides 132 run in the x-direction and comprise sections of the glass substrate 121 that have been processed to change one or more optical properties thereof. As shown, each waveguide 132 includes an end surface 136 (facet) that resides at the front face 126 of the glass substrate 121, and may include another end surface (not shown) residing at the rear face 125.

Although the preceding figures illustrate formation of waveguides within body structures in the form glass substrates, in certain embodiments waveguides may be deposited on or over substrates, overcladding layers, or undercladding layers, each independently selected from glass, silicon, fused silica, sapphire, silicon carbide, lithium niobate, or other crystalline or non-crystalline materials as disclosed herein, in the course of fabricating planar lightwave circuit (PLC) members. Examples of processes that may be used to deposit waveguides on or over substrates, overcladding layers, or undercladding layers include chemical vapor deposition (CVD) and flame hydrolysis deposition (FHD). Deposited waveguides may comprise dielectric material in certain embodiments. In certain embodiments, deposited waveguides may be covered with one or more overcladding layers (of glass or other material) to cause the resulting waveguides to be arranged below a surface of cladding material. Additionally, PLC members as disclosed herein may include one or more undercladding layers optionally in combination with overcladding layers, in addition to substrates. A PLC member according to various embodiments may be broadly construed as having a body structure, with waveguides arranged in or on the body structure, wherein a body structure may comprise a substrate, optionally in combination with one or more overcladding and/or undercladding layers.

Individual waveguide assemblies such as described in connection with FIGS. 1A to 2C may be mated with one-dimensional arrays of waveguides. However, it is more challenging to provide optical connections with multi-dimensional arrays of optical waveguides, such as may be embodied in a multi-core fiber (MCF) or a fiber array unit (FAU) with waveguides (e.g., fiber cores) arranged in a two-dimensional array.

Figure 3:
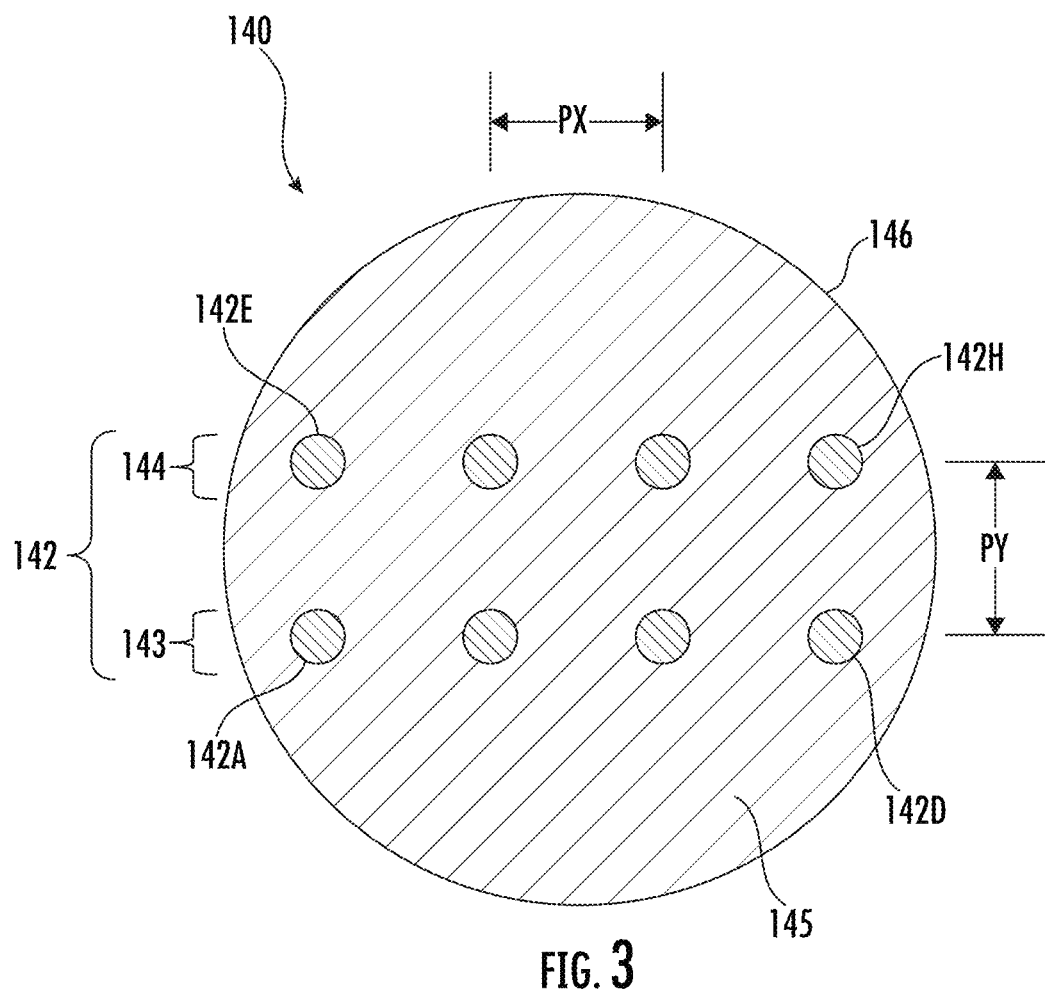
FIG. 3 is a cross-sectional view of a multi-core fiber (MCF) including eight cores arranged in two rows of four cores within a single cladding.

FIG. 3 illustrates one example of a MCF 140 having eight cores 142A-142H (collectively, cores 142) disposed within a single cladding 145, with four cores 142A-142D arranged in a lower row 143 and four cores 142E-142H arranged in an upper row 144. A spacing between the lower row 143 and the upper row 144 of cores 142 embodies a Y-axis pitch (or PY, measured from core center to core center), and a lateral spacing between cores 142 in each row 143, 144 embodies an X-axis pitch (or PX). Although eight cores 142A-142H are shown, it is to be appreciated that a MCF useable with optical assemblies described herein may include any suitable number of four, six, eight, ten, twelve, fourteen, sixteen, eighteen, twenty, twenty-two, twenty-four, thirty, thirty-six, or more cores arranged in multiple rows according to certain embodiments.

Having described methods for providing substrates with waveguides, and multi-core fibers, optical assemblies for providing optical connections between two-dimensional arrays of external optical waveguides having different pitch and orientation, including one array of group member waveguides that are interspersed, will now be described.

Figure 4A:
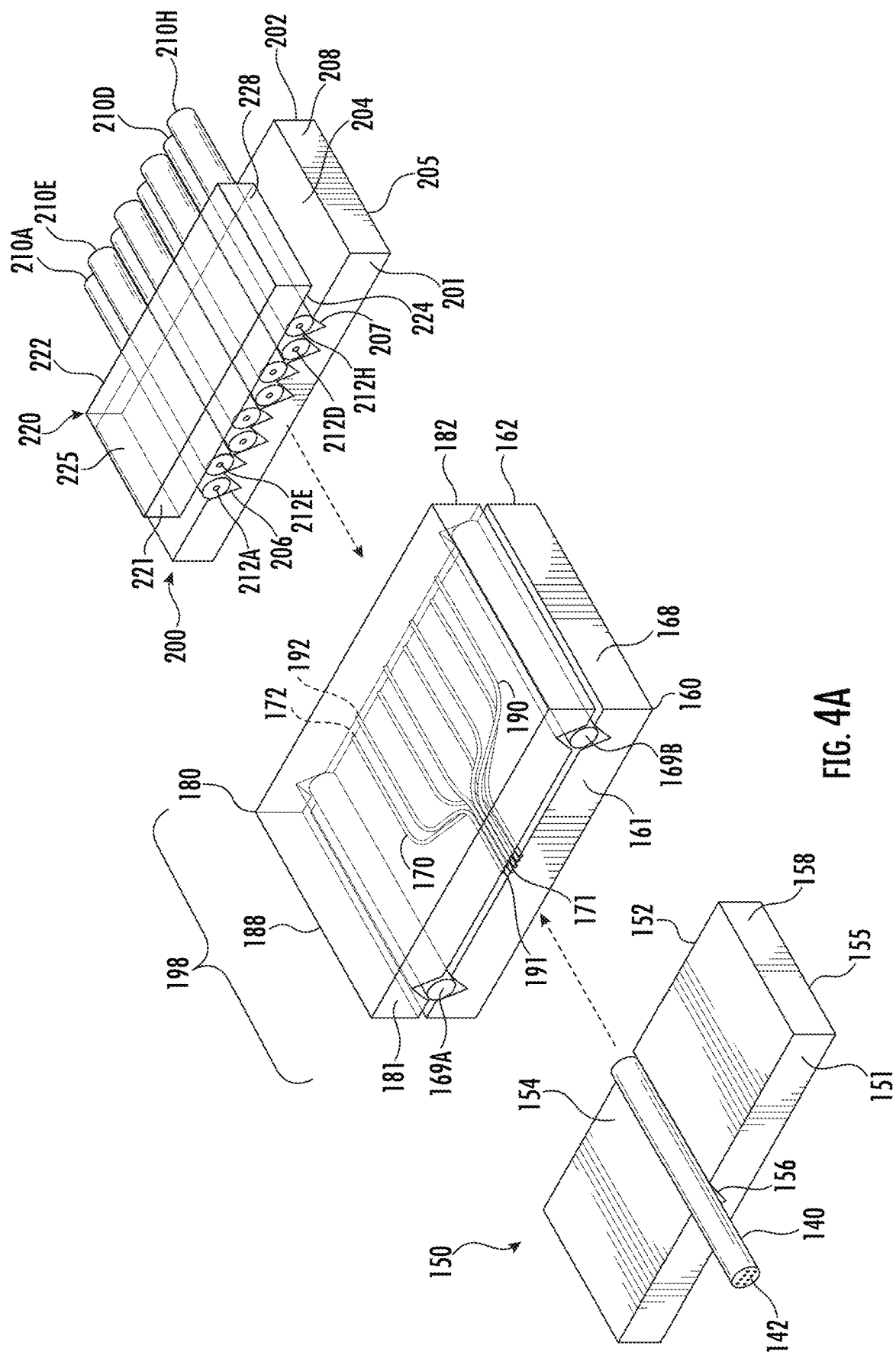
FIG. 4A is a partially exploded perspective view of an optical interconnect system including an optical assembly (e.g., an optical interface assembly) according to one embodiment arranged between (i) a lidless, first fiber array unit (FAU) supporting one multi-core fiber having cores arranged in a first two-dimensional array and (ii) a lidded, second FAU supporting a plurality of individual (e.g., single-mode) optical fibers arranged in a second two-dimensional array having a core pitch and core orientation that differ relative to the core pitch and core orientation of the first two-dimensional array.
Figure 4B:
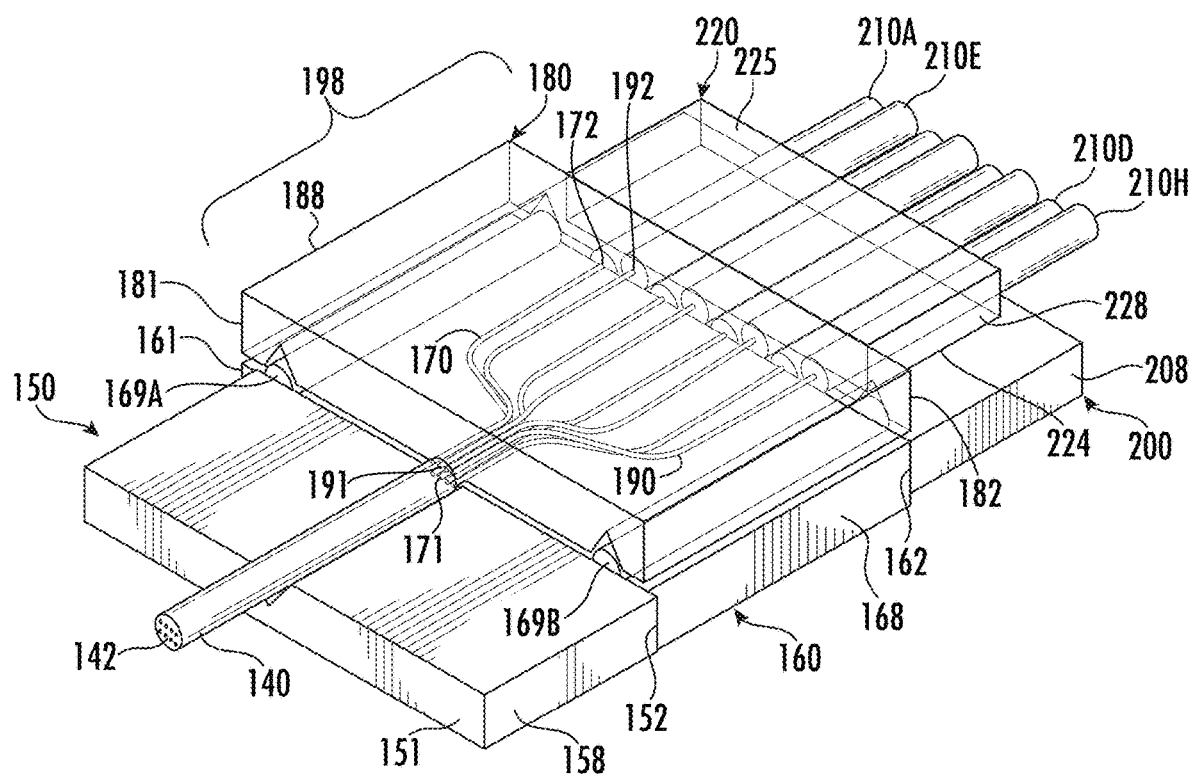
FIG. 4B is a perspective view of the optical interconnect system of FIG. 4A in an assembled state.

FIG. 4A is a partially exploded perspective view, and FIG. 4B is an assembled perspective view, of an optical interconnect system including an optical assembly 198 (e.g., an optical interface assembly) according to one embodiment, with the optical assembly 198 arranged between (i) a lidless, first fiber array unit (FAU) 150 supporting one multi-core fiber (MCF) 140 having cores 142 arranged in a first two-dimensional array and (ii) a lidded, second FAU 200 supporting a plurality of individual (e.g., single-mode) optical fibers 210A-210H arranged in a second two-dimensional array having a core pitch and core orientation that differ relative to the core pitch and core orientation of the first two-dimensional array. The first FAU 150 may embody a substrate (e.g., of glass or other suitable material) that includes a front (or first) end 151, a rear (or second) end 152, opposing inner and outer faces 154, 155, and sides 158, wherein the MCF 140 is at least partially received in a V-groove 156 defined in the inner face 154. The second FAU 200 may embody a substrate (e.g., of glass or other suitable material) that includes a front (or first) end 201, a rear (or second) end 202, opposing inner and outer faces 204, 205, and sides 208, with an array of V-grooves (including alternating V grooves 206 of a first depth and V-grooves 207 of a second depth) defined in the inner face 204. As shown, optical fibers 210A-210D of a first group (with corresponding fiber cores 212A-212D) are received in the V-grooves 206 of the first depth, and optical fibers 210E-210H of a second group (with corresponding fiber cores 212E-212H) are received in the V-grooves 207 of the second depth, with the optical fibers 210A-210H as a group (collectively) forming a two-dimensional array having a zig-zag configuration. All of the optical fibers 210A-201D of the first group and all of the optical fibers of the second group 210E-210H have respective proximal ends substantially flush with the front end 201 of the second FAU 200, and extend beyond the rear end 202 of the second FAU 200. A cover 220 (e.g., of glass or other suitable material) is arranged over the optical fibers 210A-201H, with the cover 220 having a front (or first) end 221, a rear (or second) end 222, opposing inner and outer faces 224, 225, and sides 228. The inner face 224 of the cover 220 is arranged proximate to the optical fibers 210A-201H, and preferably in contact with the optical fibers 210E-210H. It is to be appreciated that each substrate described above may embody a body structure with any suitable layers disclosed herein As shown in FIG. 4A, the optical assembly 198 includes a first (e.g., lower) PLC member 160 and a second (e.g., upper) PLC member 180, with tubular alignment members 169A, 169B arranged therebetween. In certain embodiments, the tubular alignment members 169A, 169B may embody cylindrical glass members, such as glass optical fiber segments, and may be solid (e.g., solid cylindrical rods) or hollow in character. The first PLC member 160 has a front (or first) end 161, a rear (or second) end 162, sides 168, and a plurality of first waveguides 170 having first and second waveguide ends 171, 172 that are flush with the front and rear ends 161, 162 of the first PLC member 160. The front and rear ends 161, 162 may be termed optical surfaces (e.g., an input optical surface and an output optical surface, or vice-versa), and extend in planes transverse to the plurality of first waveguides 170. The second PLC member 180 has a front (or first) end 181, a rear (or second) end 182, sides 188, and a plurality of second waveguides 190 having waveguide ends 191, 192 that are flush with the front and rear ends 181, 182 of the second PLC member 180. The front and rear ends 181, 182 may be termed optical surfaces (e.g., an input optical surface and an output optical surface, or vice-versa), and extend in planes transverse to the plurality of second waveguides 190. Waveguides of the plurality of first waveguides 170 are arranged in a first horizontal plane (e.g., within the first PLC member 180), and waveguides of the plurality of second waveguides 190 are arranged in a second horizontal plane (e.g., within the second PLC member 180) that is offset from the first horizontal plane.

Referring to FIG. 4B, in use, the optical assembly 198 is positioned between, and in contact with, the first FAU 150 and the second FAU 200. Individual cores 142 of the MCF 140 are registered with individual first waveguide ends 171, 191 at the front ends 161, 181 of the first and second PLC members 160, 180. At the rear end 162 of the first PLC member 160, individual waveguide ends 172 are registered with cores 212A-212D (shown in FIG. 4A) of individual optical fibers 210A-210D. Likewise, at the rear end 182 of the second PLC member 180, individual waveguide ends 192 are registered with cores 212E-212H (shown in FIG. 4A) of individual optical fibers 210E-210H.

FIGS. 5A-5D show various steps in fabrication of the optical assembly 198 depicted in FIGS. 4A-4B.

Figure 5A:
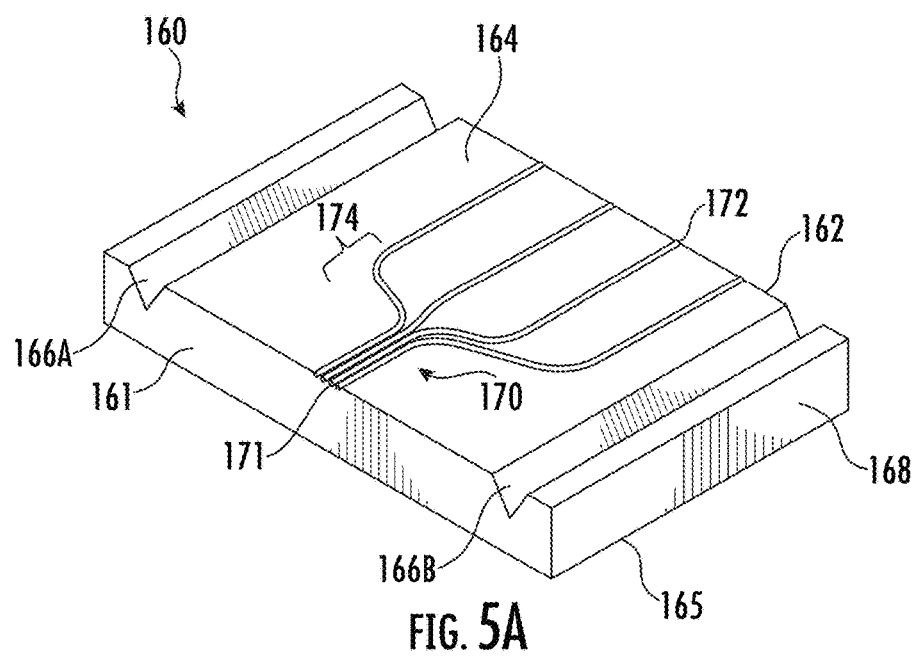
FIG. 5A is a perspective view of a first planar lightwave circuit (PLC) member of the optical assembly shown in FIGS. 4A-4B.

FIG. 5A is a perspective view of the first PLC member 160, showing the front end 161, a rear end 162, sides 168, inner face 164, and outer face 165. Two peripheral V-grooves 166A, 166B are defined in the inner face 164 and extend from the front end 161 to the rear end 162 proximate to the sides 168. A plurality of first waveguides 170 is defined in the first PLC member 160 proximate to the inner face 164, with the first waveguides 170 including first ends 171 having a first pitch at the front end 161, the first waveguides 170 including second ends 172 having a second, larger pitch at the rear end 162, and the first waveguides 170 including a transition region 174 in which the first waveguides 170 transition from the first pitch to the second pitch. The front and rear ends 161, 162 (which serve as optical surfaces) extend in planes that are transverse to the inner and outer faces 164, 165 and the plurality of first waveguides 170.

Figure 5B:
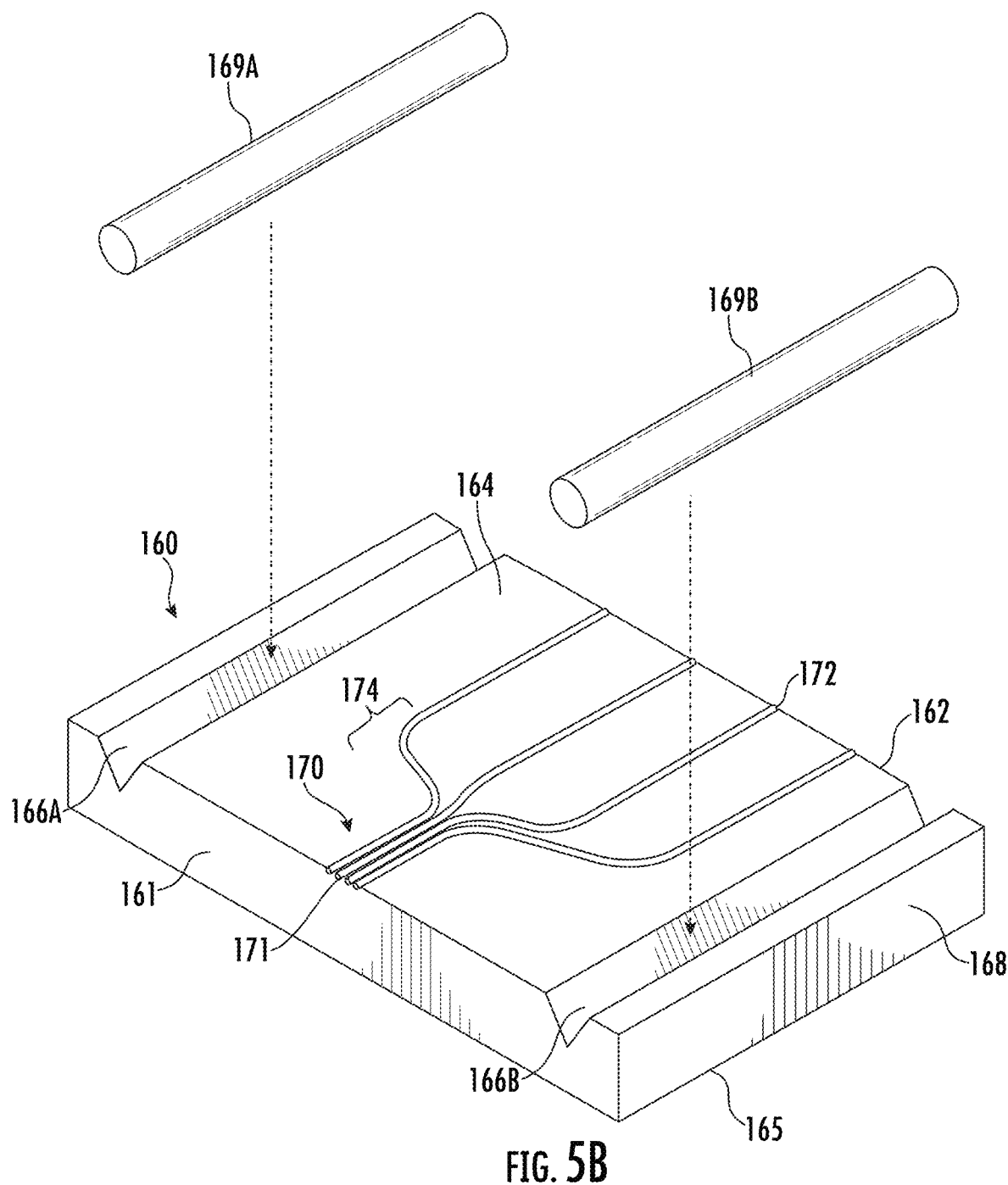
FIG. 5B is a perspective view of the first PLC member of FIG. 5A, with superimposed tubular alignment members arranged to be received by two peripheral V-grooves defined in a body structure of the first PLC member proximate to two edges thereof.

FIG. 5B is a perspective view of the first PLC member 160 of FIG. 5A, with superimposed tubular alignment members 169A, 169B arranged to be received by the two peripheral V-grooves 166A, 166B.

Figure 5C:
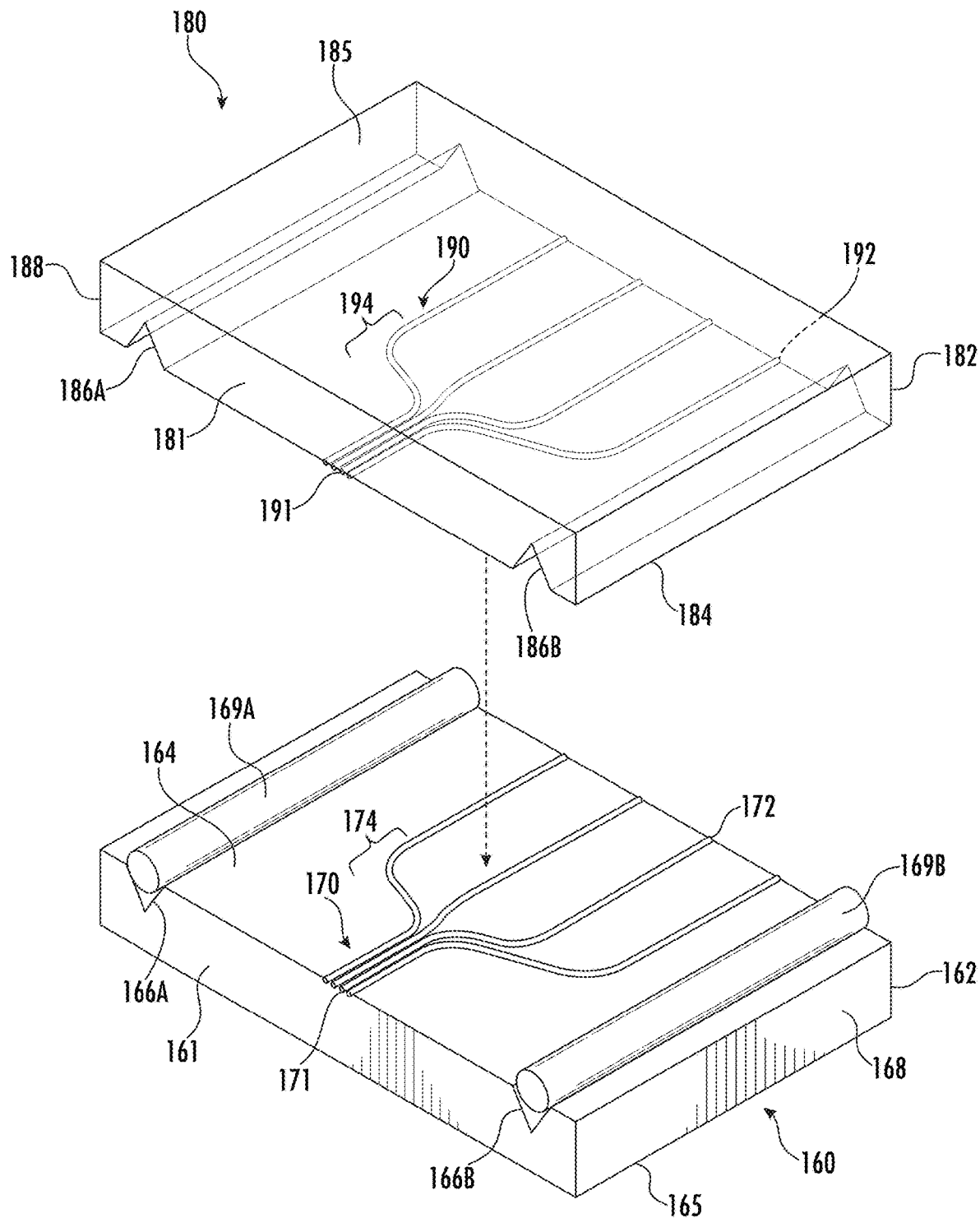
FIG. 5C is a partially exploded perspective view of the optical assembly shown in FIGS. 4A-4B, showing the two tubular alignment members received in the peripheral V-grooves of the first PLC member of FIG. 5B, and showing a second PLC member superimposed over the first PLC member and tubular alignment members.

FIG. 5C is a partially exploded perspective view of the optical assembly 198 of FIGS. 4A-4B, showing the two tubular alignment members 169A, 169B received in the peripheral V-grooves 166A, 166B of the first PLC member, and showing the second PLC member 180 superimposed over the first PLC member 160 and the tubular alignment members 169A, 169B. In a manner similar to the first PLC member 160, the second PLC member 180 includes a front end 181, rear end 182, sides 188, inner face 184, and outer face 185. Two peripheral V-grooves 186A, 186B are defined in the inner face 184 and extend from the front end 181 to the second end 182 proximate to the sides 188, to receive portions of the tubular alignment members 169A, 169B. A plurality of second waveguides 190 is defined in the second PLC member 180 proximate to the inner face 184, with the second waveguides 190 including first ends 191 having a first pitch at the front end 181, the second waveguides 190 including second ends 192 having a second, larger pitch at the rear end 182, and the second waveguides 190 including a transition region 194 in which the second waveguides 190 transition from the first pitch to the second pitch. The front and rear ends 181, 182 extend in planes that are transverse to the inner and outer faces 184, 185 and the plurality of second waveguides 190.

Figure 5D:
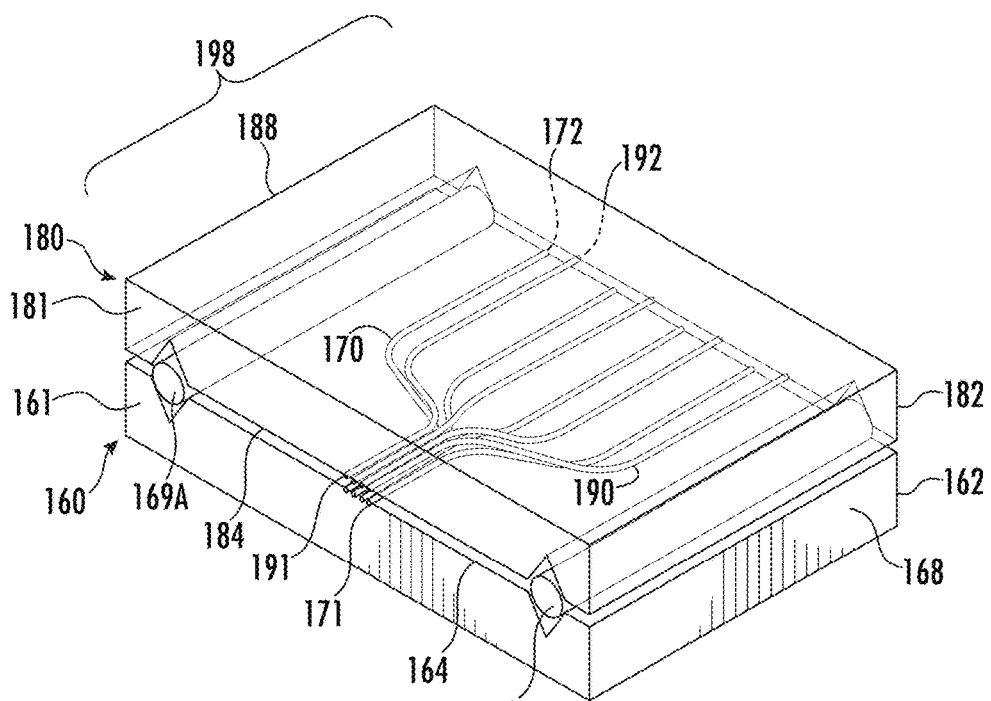
FIG. 5D is a perspective view of the optical assembly of FIGS. 4A-4B including the PLC members and alignment members of FIG. 5C in an assembled state.

FIG. 5D is a perspective view of the optical assembly of FIGS. 4A-4B including the PLC members and alignment members of FIG. 5C in an assembled state. As shown, inner faces 164, 184 of the first and second PLC members 160, 180 are positioned adjacent to one another, and the tubular alignment members 169A, 169B are arranged to promote lateral alignment between the PLC members 160, 180. The first ends 171, 191 of the first and second waveguides 170, 190 are positioned adjacent to one another in a two-dimensional array having a first pitch (i.e., spacing between adjacent waveguides), and the second ends 172, 192 of the first and second waveguides 170, 190 are arranged in another two-dimensional array (embodying a zig-zag shape) having a second pitch that is greater than the first pitch.

Figure 5E:
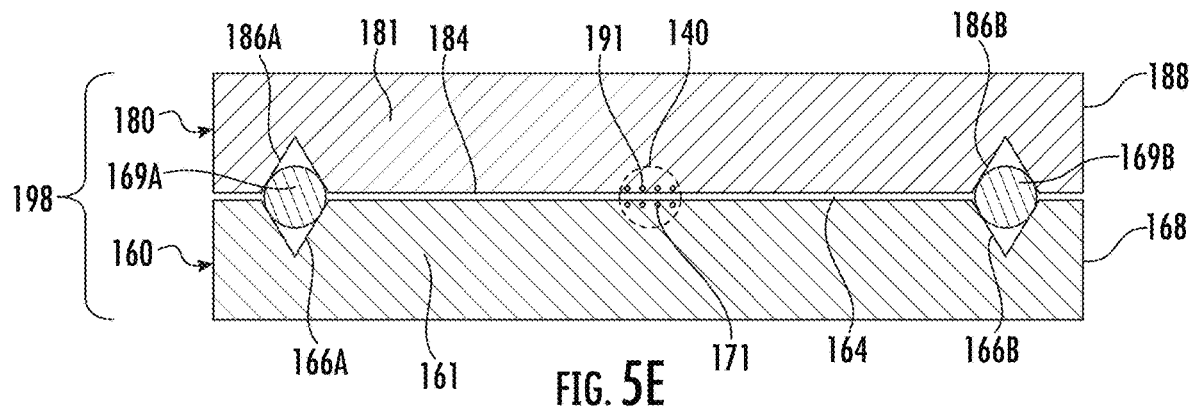
FIG. 5E is a front elevational view of the optical assembly of FIG. 5D.

FIG. 5E is a front elevational view of the optical assembly 198 of FIG. 5D, showing the first ends 171, 191 of the plurality of first waveguides (170 in FIG. 5D) and of the plurality of second waveguides (190 in FIG. 5D). The first ends 171, 191 of the first and second waveguides 170, 190 are recessed relative to the inner surfaces 164, 184 of the first PLC member 160 and the second PLC member 180, respectively. The first waveguide ends 171 are arranged in a first plane, and the second waveguide ends 191 are arranged in a second plane that is offset from the first plane. As shown, the inner surface 164 of the first PLC member 160 is adjacent to the inner face 184 of the second PLC member 180, but the inner faces 164, 184 may be spaced apart by a small gap, wherein the distance therebetween may be adjusted (i.e., to match spacing between rows of cores of cores 142 of the MCF 140 shown in FIGS. 4A-4B) by use of tubular alignment members 169A, 169B of different diameters and/or by adjusting dimensions of the peripheral V-grooves 166A, 166B, 186A, 186B defined in the first PLC member 160 and the second PLC member 180, respectively.

Figure 5F:
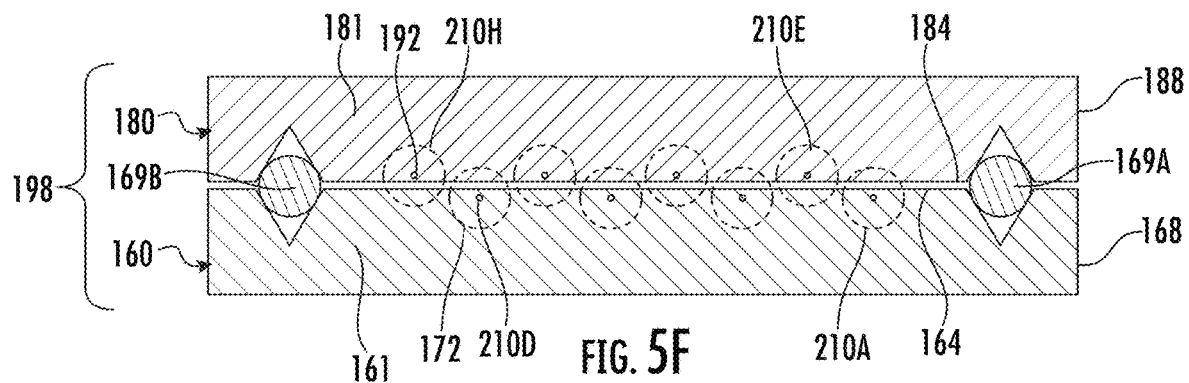
FIG. 5F is a rear elevational view of the optical assembly of FIGS. 5D-5E.

FIG. 5F is a rear elevational view of the optical assembly 198 of FIGS. 5D-5E, showing the second ends 172 of the plurality of first waveguides (170 in FIG. 5D) and the second ends 192 of the plurality of second waveguides (190 in FIG. 5D). The second waveguide ends 172, 192 are recessed relative to the inner surfaces 164, 184 of the first PLC member 160 and the second PLC member 180, respectively, with the second waveguide ends 172 being arranged in a first plane, and the second waveguide ends 192 being arranged in a second plane that is offset from the first plane. The second waveguide ends 172, 192 are laterally interspersed in an alternating manner to form a two-dimensional array having a zig-zag configuration. FIG. 5F further shows the outlines of optical fibers 210A-210D having cores (212A-212D in FIG. 4B) registered with the second waveguide ends 172 and the outlines of optical fibers 210E-210H having cores (212E-212H in FIG. 4B) registered with the second waveguide ends 192.

In certain embodiments, PLC members may be affixed to one another (e.g., along inner faces thereof) by any suitable methods such as: adhesive bonding, alloy soldering (which entails low temperature and low force requirements), gold-to-gold or copper-to-copper wafer bonding (which entail high temperature and high force requirements), aluminum-to-aluminum wafer bonding (which requires a reducing atmosphere, and entails high temperature and high force requirements), anodic bonding (which entails high temperature, high vacuum, and high voltage requirements), silicon direct bonding (SDB) (which requires an ultra-clean bonding environment), and polymer bonding (which entails low temperature, low force, and high vacuum requirements). If adhesive material is used in locations proximate to waveguides (and particularly deposited dielectric waveguides), then in certain embodiments, the adhesive material may have an index of refraction that is lower than an index of refraction of the adjacent waveguide(s) to ensure that light stays in the waveguides; additionally, an adhesive material may have a low optical absorption to minimize propagation losses in any adjacent waveguides.

In certain embodiments, an array of V-grooves for supporting optical fibers may be integrated with a PLC of an optical assembly to avoid the need for a fiber array unit (FAU) that is separate from the PLC.

Figure 6A:
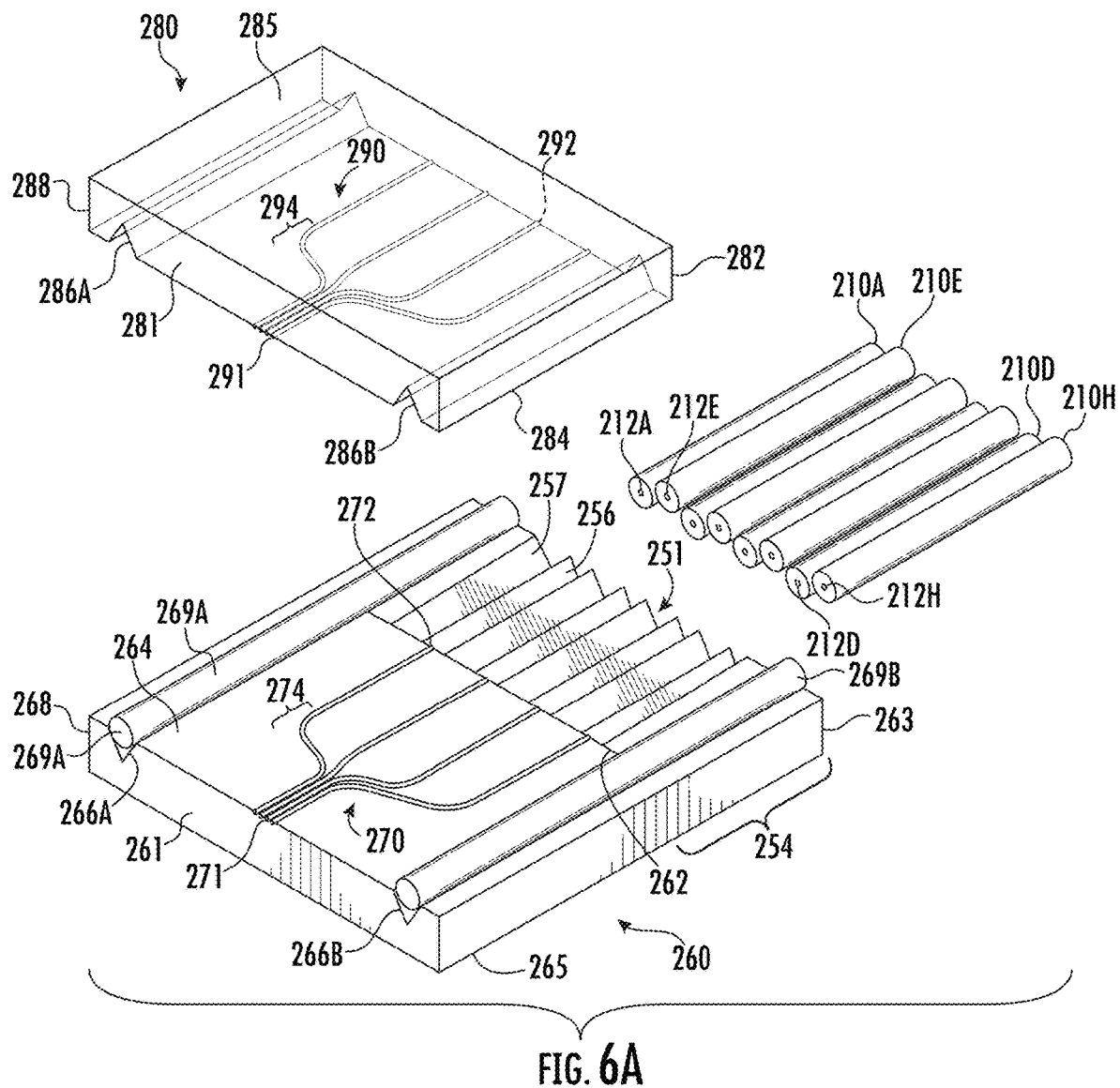
FIG. 6A is a partially exploded perspective view of first and second PLC members of an optical assembly according to one embodiment, with two tubular alignment members received in peripheral V-grooves of the first PLC member, and with the first PLC member further defining a V-groove array configured to receive a two-dimensional array of individual (e.g., single-mode) optical fibers.
Figure 6B:
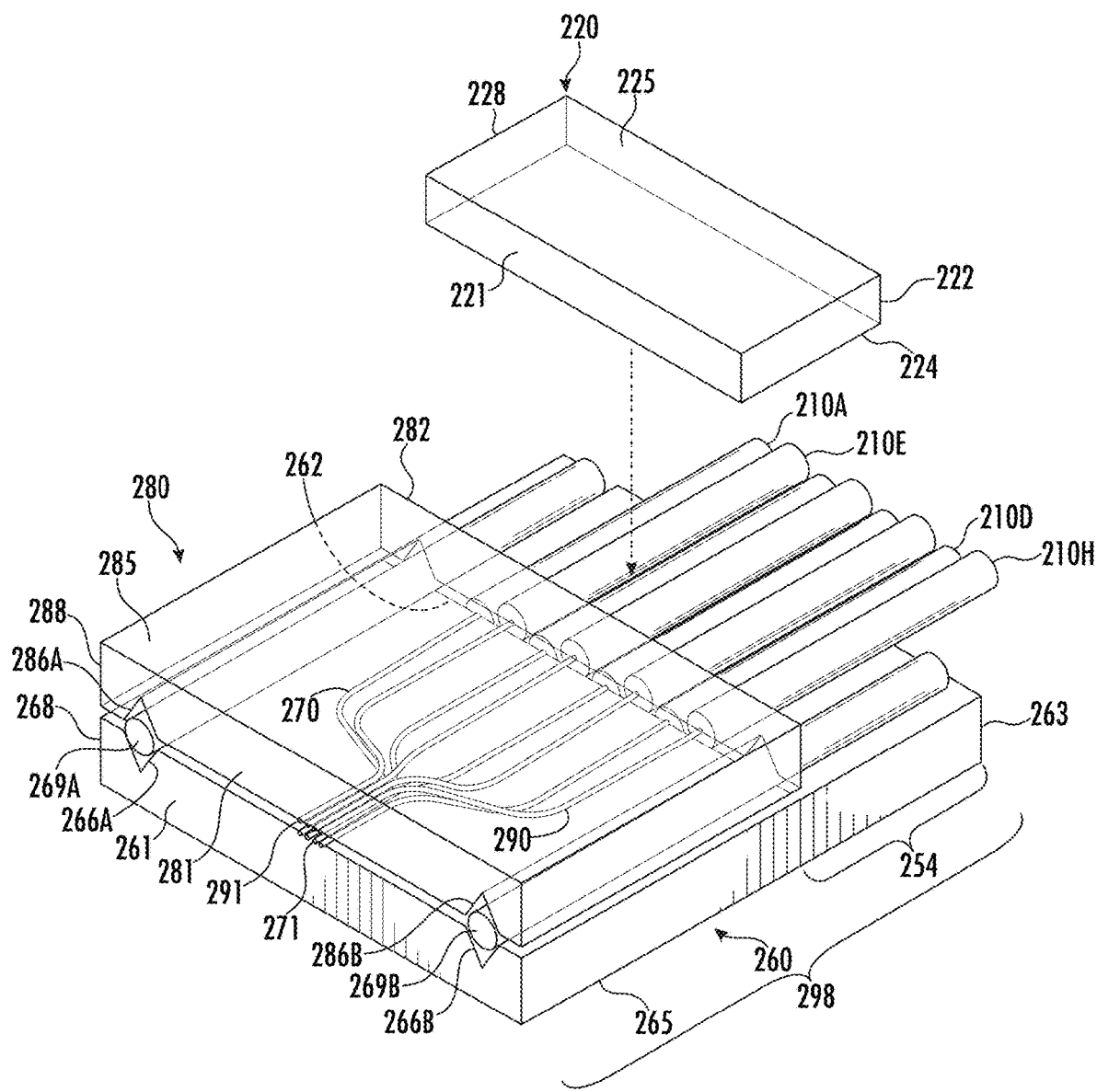
FIG. 6B is a perspective view of the PLC members and alignment members of FIG. 6A to form an optical assembly, with the two-dimensional array of individual optical fibers of FIG. 6A received in the V-groove array, and with a cover superimposed over the individual optical fibers.

FIG. 6A is a partially exploded perspective view, and FIG. 6B is an assembled perspective view, of an optical assembly 298 including first and second PLC members 260, 280 and two tubular alignment members 269A, 269B, with the first PLC member 260 defining an array of V-grooves 251 (including V-grooves of a first depth 256 alternating with V-grooves of a second depth 257) configured to receive a two-dimensional array of individual (e.g., single mode) optical fibers 210A-210H arranged in a zig-zag configuration. The first PLC member 260 has a front end 261, a rear end 263, an inner face 264, an outer face 265, and sides 268, with two peripheral V-grooves 266A, 266B being defined in the inner face 264 and extending from the front end 261 to the rear end 263 proximate to the sides 268. A plurality of first waveguides 270 is defined in the first PLC member 260 proximate to the inner face 264 and extending from the front end 261 to an intermediate optical surface 262. The first waveguides 270 including first ends 271 having a first pitch at the front end 261, including second ends 272 having a second, larger pitch at the intermediate optical surface 262, and including a transition region 274 in which the first waveguides 270 transition from the first pitch to the second pitch. The front end 261 may also be referred to as an optical surface, with the front end (optical surface) 261 and the intermediate optical surface 262 extending in planes that are transverse to the inner and outer faces 264, 265 and the plurality of first waveguides 270. The arrayed V-grooves 256, 257 are defined in an extension portion 254 of the first PLC member 260 that extends between the intermediate optical surface 262 and the rear end 263. The second PLC member 280 includes a front end 281, a rear end 282, sides 288, an inner face 284, and an outer face 285. Two peripheral V-grooves 286A, 286B are defined in the inner face 284 and extend from the front end 281 to the second end 282 proximate to the sides 288, to receive portions of the tubular alignment members 269A, 269B. A plurality of second waveguides 290 is defined in the second PLC member 280 proximate to the inner face 284, with the second waveguides 290 including first ends 291 having a first pitch at the front end 281, the second waveguides 290 including second ends 292 having a second, larger pitch at the rear end 282, and the second waveguides 290 including a transition region 294 in which the second waveguides 290 transition from the first pitch to the second pitch. The front and rear ends 281, 282 extend in planes that are transverse to the inner and outer faces 284, 285 and the plurality of second waveguides 290. As shown in FIG. 6B, the rear end 282 of the second PLC member 280 is substantially coplanar with the intermediate optical surface 262 of the first PLC member 260, and a cover 220 (having a front end 221, a rear end 222, an inner face 224, an outer face 225, and sides 228) may be arranged over the optical fibers 210A-210H, with the inner face 224 of the cover arranged in contact with optical fibers 210E-210H, and with the front end 221 of the cover arranged proximate to (and preferable in contact with) the rear end 282 of the second PLC member 280.

Figure 7A:
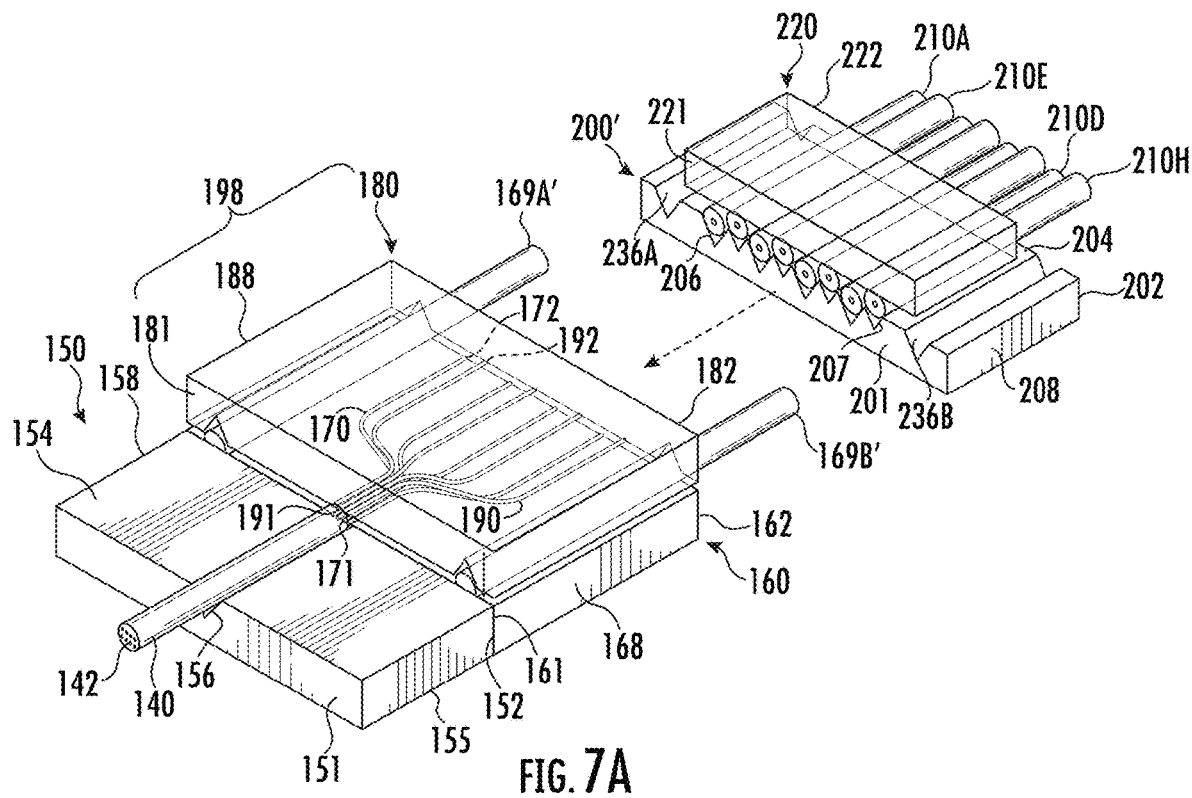
FIG. 7A is a perspective view of an optical interconnect system in a partially assembled state, including an optical assembly according to one embodiment abutting a lidless, first FAU supporting a MCF at a first end of the optical assembly, with two tubular alignment members projecting from a second end of the optical assembly to receive a two-dimensional fiber array assembly, and showing a lidded, second FAU supporting a two-dimensional array of individual optical fibers and having peripheral V-grooves configured to receive projecting portions of the tubular alignment members.
Figure 7B:
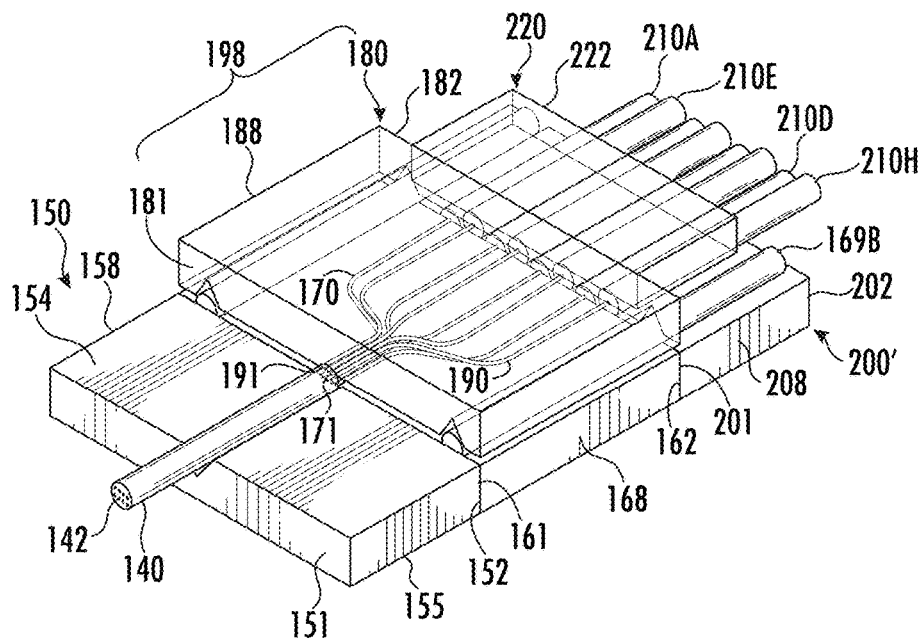
FIG. 7B is a perspective view of the optical interconnect system of FIG. 7A in a fully assembled state, with the first and second FAUs abutting first and second ends, respectively, of the optical assembly.

In certain embodiments, tubular alignment members may protrude from an optical assembly to facilitate alignment between an optical assembly and one or more FAUs. An example of such an embodiment is shown in FIGS. 7A-7B, which is substantially identical to the embodiment shown in FIGS. 4A-4B except for the presence of extended length tubular alignment members 169A', 169B' and the presence of peripheral V-grooves 236A, 236B in a second FAU 200'. FIG. 7A is a perspective view of an optical interconnect system in a partially assembled state, and FIG. 7B is a perspective view of the optical interconnect system in a fully assembled state, with the optical interconnect system including an optical assembly 198 arranged between a first FAU 150 supporting a MCF 140 (having an array of cores 142) and a second FAU 200' supporting a two-dimensional array of individual optical fibers 210A-210H arranged in a zig-zag configuration. All elements of the first FAU 150 and the optical assembly 198 are identical to those described in connection with FIGS. 4A-4B, and will not be described again. The second FAU 200' may embody a substrate (e.g., of glass or other suitable material) that includes a front (or first) end 201, a rear (or second) end 202, opposing inner and outer faces 204, 205, and sides 208, with an array of V-grooves (including alternating V grooves 206 of a first depth and V-grooves 207 of a second depth) defined in the inner face 204. As shown, optical fibers 210A-210D of a first group (with corresponding fiber cores 212A-212D) are received in the V-grooves 206 of the first depth, and optical fibers 210E-210H of a second group (with corresponding fiber cores 212E-212H) are received in the V-grooves 207 of the second depth, with the optical fibers 210A-210H as a group forming a two-dimensional array having a zig-zag configuration. All of the optical fibers 210A-201D, 210E-210H of the first and second groups have proximal ends substantially flush with the front end 201 of the second FAU 200', and extend beyond the rear end 202 of the second FAU 200'. Peripheral V-grooves 236A, 236B are also defined in the inner face 204, between the sides 208 and the arrayed V-grooves 207, 208, to receive portions of the tubular alignment members 169A', 169B' protruding from the optical assembly 198 to promote alignment between the second FAU 200' and the optical assembly 198. A cover 220 (e.g., of glass or other suitable material) is arranged over the optical fibers 210A-201H, with the cover 220 having a front (or first) end 221, a rear (or second) end 222, opposing inner and outer faces 224, 225 (see FIG. 6B), and sides 228 (see FIG. 6B). The inner face 224 of the cover 220 is arranged proximate to the optical fibers 210A-201D, 210E-210H, and preferably in contact with the optical fibers 210E-210H. A width of the cover 220 may be smaller than the second FAU 200', so that when the tubular alignment members 169A', 169B' are received by the peripheral V-grooves 236A, 236B of the second FAU 200', the cover 220 does not overlie the tubular alignment members 169A', 169B'.

As described hereinafter, various methods and techniques may be used to promote alignment (e.g., vertical spacing, lateral alignment, and/or parallel planarity) of PLC members, and/or promote alignment between PLC waveguides and external arrays of fiber cores (e.g., cores of a MCF, or cores of an array of single-mode optical fibers).

FIG. 8A is an exploded side cross-sectional view of a portion of an optical assembly including two glass overclad PLC members 300, 310 in a separated state. Each PLC member 300, 310 includes waveguides 304, 314 arranged between a substrate 302, 312 and an overcladding layer 305, 315, with the waveguides 304, 314 extending between optical surfaces (e.g., ends) 301A, 301B, 311A, 311B of the PLC members 300, 310. Each substrate 302, 312 and overcladding layer 305, 315 may be fabricated of glass or another suitable material. Each PLC member 300, 310 has an inner face 306, 316 defined by the overcladding layer 305, 315, and has an opposing outer face 307, 317 defined by the substrate 302, 312. The overcladding layers 305, 315 may have a controlled thickness, which may be controlled by deposition (e.g., by chemical vapor deposition or flame hydrolysis deposition) and/or surface removal (e.g., by mechanical or chemical-mechanical polishing), to adjust spacing between the waveguides 304, 314 and the inner face 306, 316 of each PLC member 300, 310. For each PLC member 300, 310, a distance d between the waveguides 304, 314 and the inner face 306, 316 equals half of the Y-axis pitch (namely, PY/2) between rows of optical fibers in a MCF (see FIG. 3) or rows of fiber cores supported by a FAU (e.g., FAU 200 shown in FIG. 4A). FIG. 8B is a side cross-sectional view showing the optical assembly portion 318 upon assembly, with inner faces 306, 316 of the two PLC members 300, 310 abutting one another at an interface 319, which may include a thin layer of adhesive material. In the optical assembly portion 318, a vertical distance 2d between the waveguides 304, 314 equals the Y-axis pitch PY.

In certain embodiments, fiducial marks may be provided in or on PLC members and used to control lateral alignment of the PLC members. When fiducial marks are provided, inter-PLC alignment can be carried out using one or more of the following approaches: (1) optical microscope observation on two different PLC members, wherein at least one of the PLC members is substantially transparent; (2) infrared illumination to permit fiducial marks to be viewed through multiple PLC members; (3) utilization of through-hole vias to permit a fiducial mark for one PLC member to be observed through an opening in another PLC member; and (4) separate imaging of PLC member fiducials and utilization of precision stages to allow movement of PLC members to an aligned position.

As an alternative to using fiducial marks, raised features (e.g., defined by photolithographic patterning) or recessed features (e.g., defined by etching) may be provided on inner faces (e.g., substrates or overcladding layers) of adjacent PLC members to promote lateral alignment between PLC members. For example, a raised region formed on a face one a PLC member provide a precise edge that aligns with (and optionally makes contact with) a mating raised alignment feature on another PLC member to provide precise lateral alignment between PLC members during fabrication of an optical assembly. In certain embodiments, raised alignment features may embody overcladding material that is patterned to create a raised boss or mesa, or such features may embody photoresist material that is patterned to an appropriate shape. If heights of raised alignment features are controlled, then can provide both lateral alignment and a desires vertical offset between adjacent PLC members. In certain embodiments, raised alignment features on one PLC member may be configured to mate with one or more alignment recesses (e.g., troughs, depressions, or pits) in an adjacent PLC member. In another example, etched features may be provided on facing features of PLC members to form depressions that may be used to receive one or more alignment elements such as a sphere, rod, or mating post to facilitate alignment between adjacent PLC members.

FIG. 9A is an exploded end cross-section view of a portion of an optical assembly including two PLC members 320, 330 having fiducial marks 325, 335 for controlling inter-PLC alignment, with the PLC members 320, 330 arranged in a separated state. Each PLC member 320, 330 includes a substrate 322, 332 with embedded waveguides 324, 334 that extend parallel to sides 323, 333 of the substrate 322, 332, and includes an inner face 326, 336 and an opposing outer face 327, 337. Each fiducial mark 325, 335 is arranged on an inner face 326, 336 of the respective substrate 322, 332, wherein registration between the fiducial marks 325, 335 may be used to promote lateral alignment between the PLC members 320, 330, as shown in FIG. 9B.

For each PLC member 320, 330, a distance d between the waveguides 324, 334 and the inner face 326, 336 equals half of the Y-axis pitch (namely, PY/2) between rows of optical fibers in a MCF (see FIG. 3). FIG. 9B is a side cross-sectional view showing the optical assembly portion 338 with inner faces 326, 336 of the two PLC members 320, 330 abutting one another at an interface 339 and the fiducial marks 325, 335 being registered with one another, wherein the interface 339 may include a thin layer of adhesive material. In certain embodiments, the fiducial marks 325, 335 can be fabricated on inner faces 326, 336 of the PLC members 320, 330 so that they are photolithographically aligned to the waveguides 324, 334. The fiducial marks 325, 335 can be formed in the same plane (or layer) in which the waveguides 324, 334 are formed, or they can be formed in a separate plane or layer that is precisely aligned to the waveguide 324, 334. In certain embodiments, inner faces 326, 336 of the PLC members 320, 330 contact one other, allowing the fiducial marks 325, 335 to fall in the same plane. In other embodiments, a small vertical separation may be provided between the fiducial marks 325, 335, but the distance may be sufficiently small enough to allow high-precision alignment (e.g., <0.5 um lateral misalignment) between the PLC members 320, 330. In the optical assembly portion 338, a vertical distance 2d between the waveguides 324, 334 equals the Y-axis pitch PY.

In certain embodiments (such as the embodiments shown in FIGS. 8A to 9B), waveguides of two adjacent PLC members may be substantially equidistant from an interface between the PLC members. Alternatively, in certain embodiments, waveguides of a first PLC member may be arranged a first distance from an interface between PLCs, which waveguides of a second PLC member may be arranged a second distance (that differs from the first distance) from the interface between PLC members.

In certain embodiments, fiducial marks may be used to promote alignment between three or more PLC members, as described in connection with FIGS. 10A-10B. FIG. 10A is a partially exploded cross-sectional view of a portion of an optical assembly including three PLC members 340, 350, 360 each having embedded waveguides 344, 354, 364 and each having a fiducial mark 345, 355, 365 on a first (e.g., upper) face 347, 357, 367 that opposes a second (e.g., lower) face 346, 356, 366 thereof. For each PLC member 340, 350, 360, the waveguides 344, 354, 364 are embedded in a substrate 342, 352, 362 (i.e., at a depth S relative to the first face 347, 357, 367). Each substrate 342, 352 has a thickness equal to a Y-axis pitch PY between rows of optical fibers in an external MCF or FAU (not shown). The embedded waveguides 344, 354, 364 may formed in the substrates 342, 352, 362 by any suitable method such as ion exchange processing. A fiducial mark 345, 355, 365 is provided on or along the first face 347, 357, 367 of each PLC member 340, 350, 360, wherein the fiducial marks 345, 355, 365 may be used to facilitate lateral alignment between the PLC members 340, 350, 360 and the waveguides 344, 354, 364 embedded therein. An interface 359 between two PLC members 350, 360 may include a thin layer of adhesive material.

FIG. 10B is a cross-sectional view showing the optical assembly portion 368 of FIG. 10A with all three PLC members 340, 350, 360 arranged in a stack abutting one another, with interfaces 349, 359 each provided between a different pair of PLC members 340, 350, 360. The optical waveguides 344 of a first PLC member 340 are separated from the optical waveguides 354 of a second PLC member 350, and the optical waveguides 354 of the second PLC member 350 are separated from the optical waveguides 364 of a third PLC member 360, by a distance equal to the Y-axis pitch PY, while laterally adjacent waveguides 344, 354, 364 within each PLC member 340, 350, 360 are separated from one another by a distance equal to the X-axis pitch PX, to match the pitch of cores of an external MCF or cores of optical fibers supported by an external FAU (not shown). Thickness of the substrates 342, 352 of the PLC members 340, 350 may be controlled and/or adjusted (e.g., by polishing, etching, or other methods) to control the Y-axis pitch PY.

In certain embodiments, an overcladding layer arranged over a deposited waveguide may have a locally increased thickness.

FIG. 11A is an exploded cross-section view of a portion of an optical assembly including two PLC members 370, 380 having overcladding layers 375, 385 with regions (e.g., rounded ridges 376A, 386A) of locally increased thickness over waveguides 374, 384 embedded in the overcladding layers 375, 385, with the PLC members 370, 380 arranged in a separated state. Each PLC member 370, 380 has an inner face 376, 386 defined by an overcladding layer 375, 385, and has an opposing outer face 377, 387 defined by a substrate 372, 382, with sides 373, 383 extending between the inner faces 376, 386 and the outer faces 377, 387. The waveguides 374, 384 may be initially deposited on the substrates 372, 382 and then covered by the overcladding layers 375, 385. For each PLC member 370, 380, a vertical distance between the waveguides 374, 384 and a distal point of the rounded ridges 376A, 386A equals half of the Y-axis pitch (namely, PY/2) between rows of optical fibers in an external MCF or rows of fiber cores supported by a FAU (not shown).

FIG. 11B is a cross-sectional showing the optical assembly portion 388 of FIG. 11A in an assembled state, with the rounded ridges 376A, 386A of the two PLC members 370, 380 abutting one another at an interface 389, which includes adhesive material between the inner faces 376, 386. In the optical assembly portion 338, a vertical distance between the waveguides 374, 384 of the PLC members 370, 380 equals the Y-axis pitch PY, while laterally adjacent waveguides 374, 384 within each PLC member 370, 380 are separated from one another by a distance equal to the X-axis pitch PX, to match the pitch of cores of an external MCF or cores of optical fibers supported by an external FAU (not shown).

In certain embodiments, locally increased thickness regions of an overcladding layer may be selectively thinned (e.g., by polishing, etching, etc.) to control a Y-axis pitch PY between optical fibers of adjacent PLCs.

FIG. 12A is a cross-sectional view of a PLC member 380' having an overcladding layer 383' with partially flattened, previously rounded ridges 386A' of locally increased thickness that are registered with waveguides 384' embedded in the overcladding layer 385'. The PLC member 380' has an inner face 386' defined by the overcladding layer 385', and has an opposing outer face 387' defined by a substrate 382', with sides 383 extending between the inner face 386' and the outer face 387'. A vertical distance between the waveguides 384' and a distal point of the partially flattened ridges 386A' equals half of the Y-axis pitch (namely, PY/2) between rows of optical fibers in an external MCF or rows of fiber cores supported by a FAU (not shown).

FIG. 12B is a cross-sectional view of an optical assembly 388' including two PLC members 370', 380' each according to FIG. 12A with partially flattened ridges 376A', 386A' thereof abutting one another at an interface 389'. Each PLC member 370', 380' has an inner face 376', 386' defined by an overcladding layer 375', 385', and has an opposing outer face 377', 387' defined by a substrate 372', 382', with sides 373', 383' extending between the inner faces 376', 386' and the outer faces 377', 387'. A vertical distance between the waveguides 374' of the first PLC member 370' and the waveguides 384' of the second PLC member 380' equals the Y-axis pitch (namely, PY) between rows of optical fibers in an external MCF or rows of fiber cores supported by a FAU (not shown), while laterally adjacent waveguides 374', 384' within each PLC member 370', 380' are separated from one another by a distance equal to the X-axis pitch PX, to match the pitch of cores of an external MCF or cores of optical fibers supported by an external FAU.

In certain embodiments, positional depth of waveguides within a PLC member embedded in a substrate may be adjusted by thinning an inner surface of the substrate.

Figure 13A:
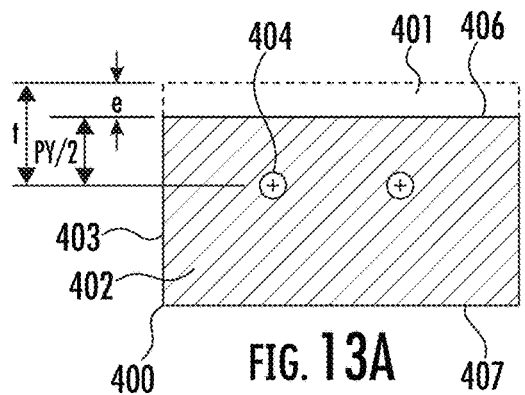
FIG. 13A is a cross-sectional view of a first PLC member having embedded waveguides following thinning of substrate material of the PLC member.

FIG. 13A is a cross-sectional view of a PLC member 400 having embedded waveguides 404 following thinning of a substrate 402 to remove an initial face portion 401 thereof to expose an inner face 406 of the substrate 402 that opposes an outer face 407, with sides 403 extending between the inner face 406 and the outer face 407. A vertical distance between the waveguides 404 and the inner face 406 equals half of the Y-axis pitch (namely, PY/2) between rows of optical fibers in an external MCF or rows of fiber cores supported by a FAU (not shown).

Figure 13B:
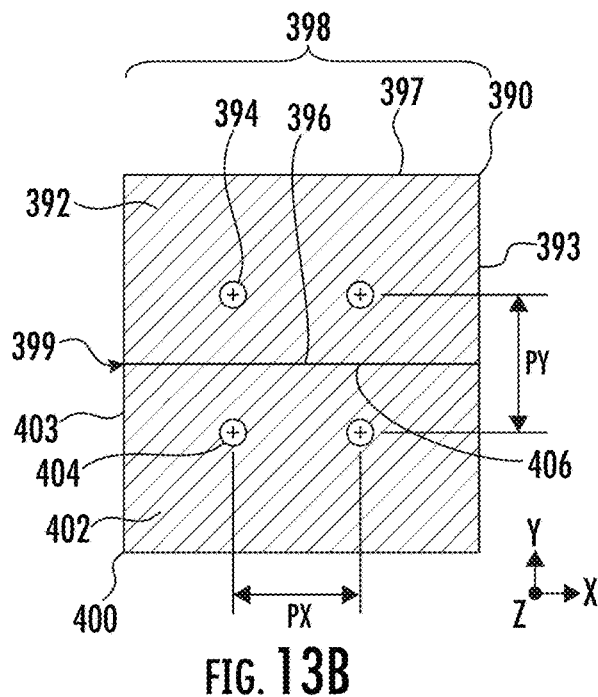
FIG. 13B is a cross-sectional view of a portion of an optical assembly including a second PLC member arranged over the first PLC member of FIG. 13A.

FIG. 13B is a cross-sectional view of a portion of an optical assembly 398 including a second PLC member 390 arranged over the PLC member 400 of FIG. 13A. Each PLC member 390, 400 has an inner face 396, 406 and an opposing outer face 397, 407 defined by a substrate 392, 402, with sides 393, 403 extending between the inner faces 396, 406 and the outer faces 397, 407. The PLC members 390, 400 are joined together along the inner faces 396, 406 at an interface 399, which may involve adhesive bonding or bonding by another method. The waveguides 394 of the first PLC member 390, and the waveguides 404 of the second PLC member 400, are arranged substantially the same distance from the interface 399. A vertical distance between the waveguides 394 of the second PLC member 390 and the waveguides 404 of the first PLC member 400 equals the Y-axis pitch (namely, PY) between rows of optical fibers in an external MCF or rows of fiber cores supported by a FAU (not shown), while laterally adjacent waveguides 394, 404 within each PLC member 390, 400 are separated from one another by a distance equal to the X-axis pitch PX, to match the pitch of cores of an external MCF or cores of optical fibers supported by an external FAU.

In certain embodiments, one PLC member having overcladding with regions of locally increased thickness may be matched with another PLC member having overcladding of a substantially uniform thickness to control vertical spacing between waveguides of the differing PLC members.

Figure 14A:
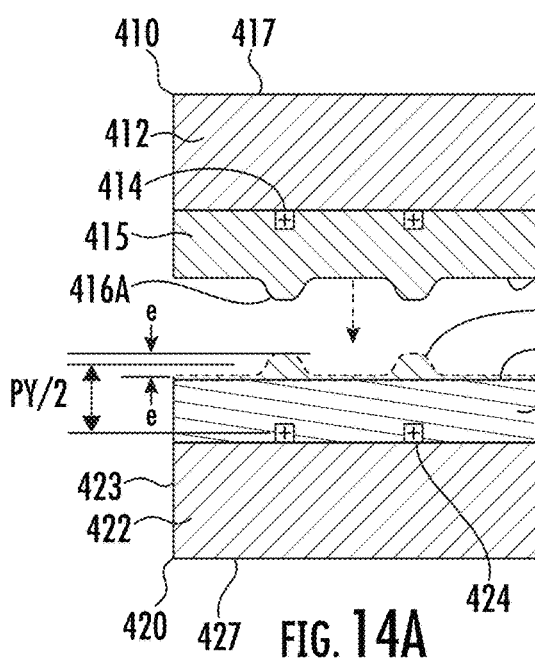
FIG. 14A is an exploded cross-sectional view of a portion of an optical assembly including first and second PLC members initially having glass overcladding layers with rounded ridges of locally increased thickness that are registered with waveguides embedded in the overcladding layers, with dashed lines showing portions to be removed from the lower PLC member to be removed.
Figure 14B:
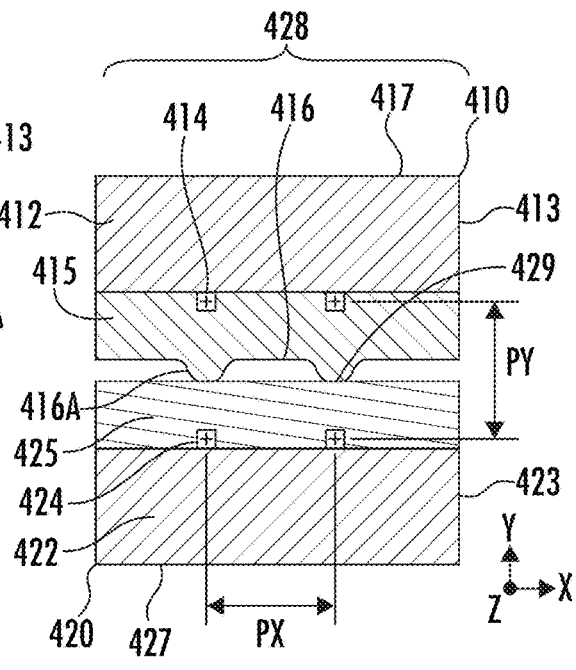
FIG. 14B is a cross-sectional view of the optical assembly portion of FIG. 14A following removal of a portion of the first PLC member, and abutment of the first and second PLC members against one another.

FIG. 14A is an exploded cross-sectional view of a portion of an optical assembly including first and second PLC members 410, 420 initially having overcladding layers 415, 425 with rounded ridges 416A, 426A of locally increased thickness (extending from inner faces 416, 426) that are registered with waveguides 414, 424 embedded in the overcladding layers 415, 425. Dashed lines along the inner face 426 show portions (having a thickness e) of the lower (second) PLC member 420 to be removed (e.g., by polishing, etching, etc.). Each PLC member 410, 420 has an inner face 416, 426 defined by an overcladding layer 415, 425, and an opposing outer face 417, 427 defined by a substrate 412, 422, with sides 413, 423 extending between the inner faces 416, 426 and the outer faces 417, 427. FIG. 14B is a cross-sectional view of the optical assembly portion 428 of FIG. 14A following removal of an upper layer of the overcladding layer 425 of second PLC member 420, and abutment of the rounded ridges 416A of the first PLC member 410 against the inner face 426 of the second PLC member 420 at an interface 429. An adhesive (not shown) may be provided between the inner surfaces 416, 426 at the interface 429. A vertical distance between the waveguides 424 of the second PLC member 420 and the waveguides 414 of the first PLC member 410 equals the Y-axis pitch (namely, PY) between rows of optical fibers in an external MCF or rows of fiber cores supported by a FAU (not shown), while laterally adjacent waveguides 414, 424 within each PLC member 410, 420 are separated from one another by a distance equal to the X-axis pitch PX, to match the pitch of cores of an external MCF or cores of optical fibers supported by an external FAU.

In certain embodiments, vertical distance between embedded waveguides of an optical assembly may be adjusted by removing backside material from a substrate of a PLC member.

Figure 15A:
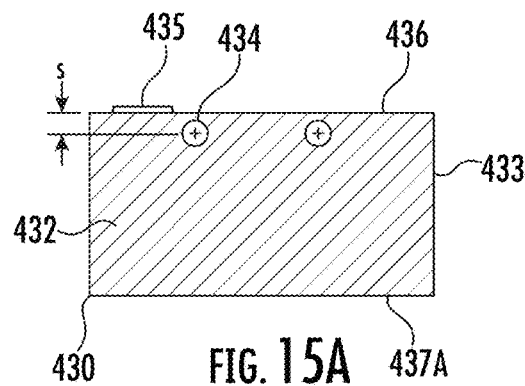
FIG. 15A is cross-sectional view of a PLC member having embedded waveguides and a topside fiducial mark during fabrication, prior to removal of a backside portion of the PLC member.
Figure 15B:
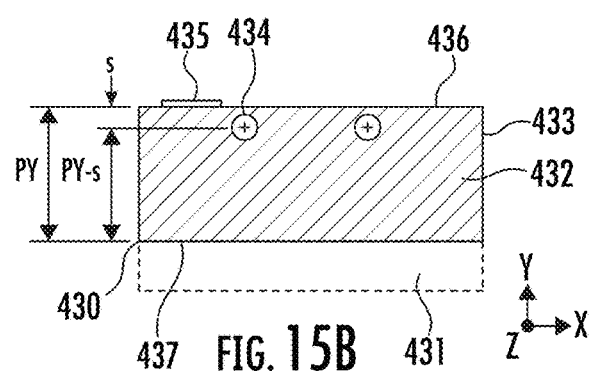
FIG. 15B is a cross-sectional view of the PLC member of FIG. 15A, following removal of a backside portion thereof.

FIG. 15A is a cross-sectional view of a PLC member 430 having waveguides 434 embedded in a substrate 432 having a top face 436, an initial bottom face 437A, sides 433, and a fiducial mark 435 on the top face 436. The waveguides 434 are embedded within the substrate at a distance S below the top face 436. FIG. 15B is a cross-sectional view of the PLC member 430 of FIG. 15A, following removal of a backside portion 431 (e.g., by polishing, etching, etc.) to expose a bottom face 437. Following removal of the backside portion 431, the substrate 432 has a thickness PY, with the waveguides 434 remaining a distance S below the top face 436, so that a distance from the waveguides to the bottom face 437 is PY-S.

Figure 16A:
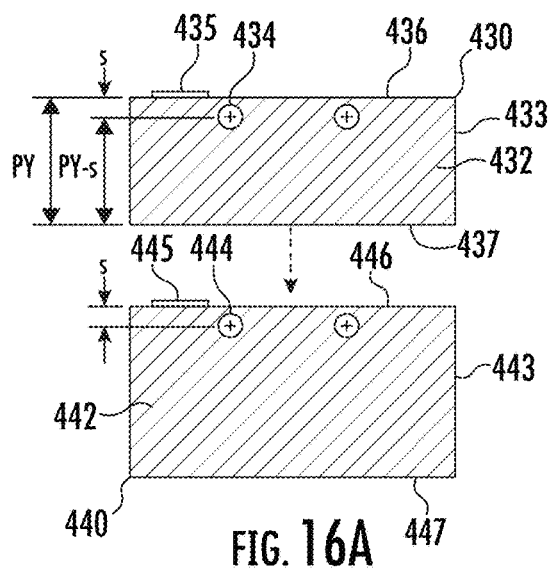
FIG. 16A is an exploded cross-sectional view of a portion of an optical assembly including the backside-thinned PLC member of FIG. 15B arranged over another similar PLC member having a topside fiducial mark.
Figure 16B:
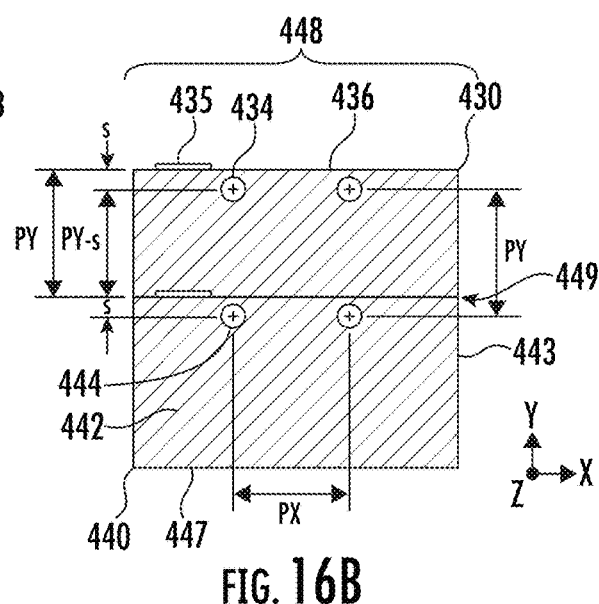
FIG. 16B is a cross-sectional view of the optical assembly portion of FIG. 16A with the PLC members abutting one another and registration of the fiducial marks.

FIG. 16A is an exploded cross-sectional view of a portion of an optical assembly including the backside-thinned PLC member 430 of FIG. 15B arranged over a second, similar (but not thinned) PLC member 440 having a topside fiducial mark 445. The second PLC member 440 has a top (or inner) face 446, an opposing bottom (or outer) face 447, sides 443, and embedded waveguides 444 arranged a distance S below the top face 446. FIG. 16B is a cross-sectional view of the optical assembly 448 of FIG. 16A with the bottom face 437 of the first PLC member 430 abutting the top (or inner) face 446 of the second PLC members 440, and with the fiducial marks 435, 445 of the PLC members 430, 440 being registered (e.g., aligned, such as in the x-direction and/or the z-direction). An interface 449 between the PLC members 430, 440 may be formed by adhesive bonding or another suitable bonding method. Waveguides 434 of the first PLC member 430 are spaced a greater distance from the interface 449 than waveguides 444 of the second PLC 440. A vertical distance between the waveguides 434 of the first PLC member 430 and the waveguides 444 of the second PLC member 440 equals the Y-axis pitch (namely, PY) between rows of optical fibers in an external MCF or rows of fiber cores supported by a FAU (not shown), while laterally adjacent waveguides 434, 444 within each PLC member 430, 440 are separated from one another by a distance equal to the X-axis pitch PX, to match the pitch of cores of an external MCF or cores of optical fibers supported by an external FAU.

In certain embodiments, vertical distance between surface deposited waveguides of an optical assembly may be adjusted by removing backside material from a substrate of a PLC member.

Figure 17A:
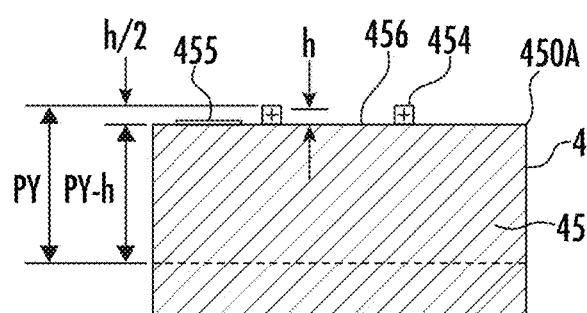
FIG. 17A is cross-sectional view of a PLC member having surface deposited waveguides and a topside fiducial mark during fabrication, prior to removal of a backside portion of the PLC member.
Figure 17B:
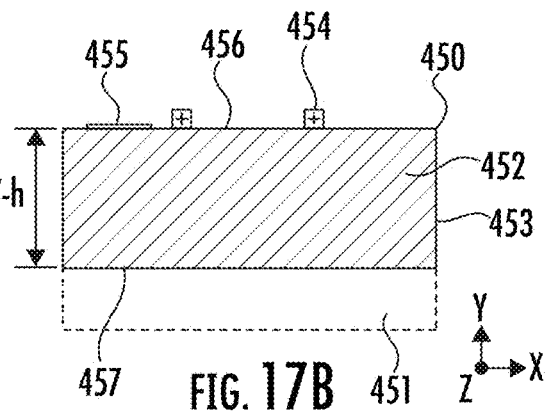
FIG. 17B is a cross-sectional view of the PLC member of FIG. 17A, following removal of a backside portion thereof.

FIG. 17A is cross-sectional view of a PLC member 450A having surface deposited waveguides 454 and a fiducial mark 455 that is arranged on a top face 456 of a substrate 452, with the PLC member 450A further including an initial bottom face 457A, sides 453, and a fiducial mark 455 on the top face 456. An upper boundary of each waveguide 454 is arranged a distance h from the top face 456, such that a horizontal centerline of each waveguide 454 is arranged a distance h/2 from the top face 456. FIG. 17B is a cross-sectional view of the PLC member 450 of FIG. 17A, following removal of a backside portion 451 (e.g., by polishing, etching, etc.) to expose a bottom face 457. Following removal of the backside portion 451, the PLC member 450 has a thickness PY including the thickness of the waveguides 454, with the top face 456 and the bottom face 457 of substrate 452 being separated by a distance PY-h.

Figure 18A:
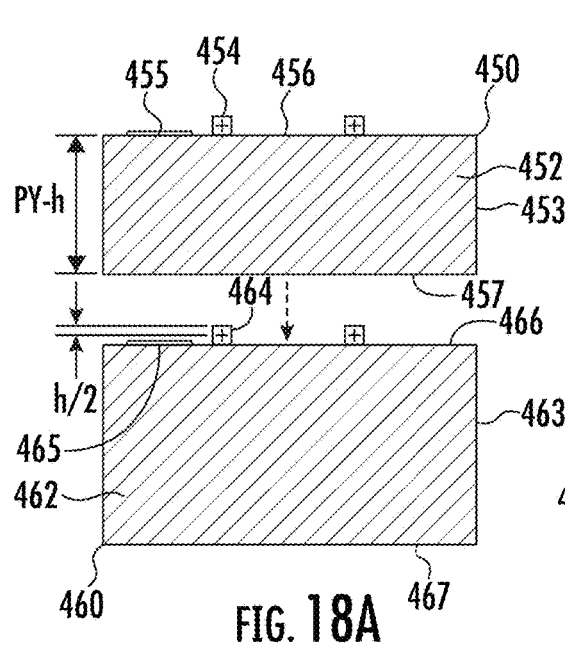
FIG. 18A is an exploded cross-sectional view of a portion of an optical assembly including the backside-thinned PLC member of FIG. 17B arranged over another similar PLC member having a topside fiducial mark.

FIG. 18A is an exploded cross-sectional view of a portion of an optical assembly including the backside-thinned PLC member 450 of FIG. 17B (serving as a first PLC member 450) arranged over a second, similar (but not thinned) PLC member 460 having a topside fiducial mark 465. The second PLC member 460 has a top (or inner) face 466, an opposing bottom (or outer) face 467, sides 463, and surface deposited waveguides 464 arranged on the top face 466. An upper boundary of each waveguide 464 is arranged a distance h from the top face 466, such that a horizontal centerline of each waveguide 464 is arranged a distance h/2 from the top face 466.

Figure 18B:
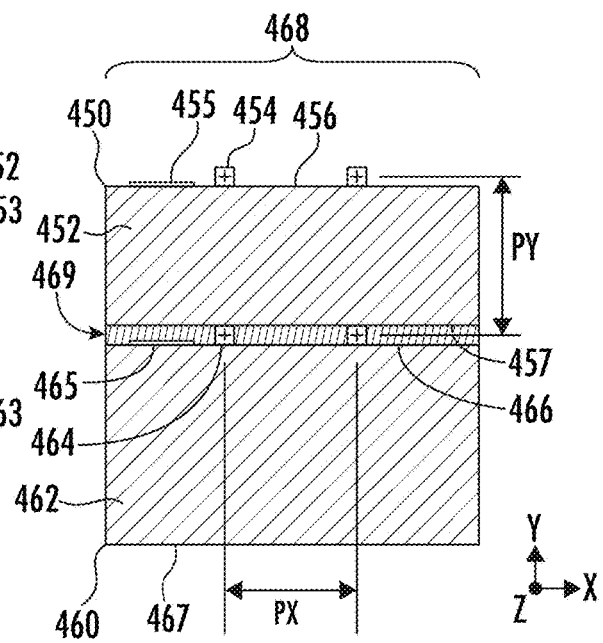
FIG. 18B is a cross-sectional view of the optical assembly portion of FIG. 18A with the PLC members proximate to one another and adhesive between the PLC members.

FIG. 18B is a cross-sectional view of the optical assembly 468 of FIG. 18A with the bottom face 457 of the first PLC member 450 abutting the waveguides 464 (proximate to the top face 466) of the second PLC member 460, and with the fiducial marks 455, 465 of the PLC members 450, 460 being registered (e.g., aligned, such as in the x-direction). An interface 469 between the PLC members 450, 460 may include a layer of adhesive material extending around the waveguides 464 and filling an area between the lower face 457 of the first PLC member 450 and the upper face 466 of the second PLC member 460. A vertical distance between the waveguides 454 of the first PLC member 450 and the waveguides 464 of the second PLC member 460 equals the Y-axis pitch (namely, PY) between rows of optical fibers in an external MCF or rows of fiber cores supported by a FAU (not shown), while laterally adjacent waveguides 454, 464 within each PLC member 450, 460 are separated from one another by a distance equal to the X-axis pitch PX, to match the pitch of cores of an external MCF or cores of optical fibers supported by an external FAU.

In certain embodiments, waveguides may be defined in or on precision thickness substrates (e.g., of glass or other materials) and stacked to form an optical assembly. In certain embodiments, a fusion forming process may be used to form glass sheets having a thickness PY with a thickness tolerance of less than ±0.5 μm, wherein such sheets may be used as substrates of PLC members.

FIG. 19A is an exploded cross-sectional view of a portion of an optical assembly including two PLC members 450, 470 having surface deposited waveguides 454, 474 and topside fiducial marks 455, 475 arranged on substrates 452, 472, with the PLC members 450, 470 separated from one another. The first PLC member 450 is identical to the one shown in FIG. 17B, but may be fabricated on a substrate 452 of a precise thickness instead of requiring removal of substrate material to achieve a desired overall thickness. Each PLC member 450, 470 includes a top face 456, 476, a bottom face 457, 477, and sides 453, 473. Each waveguide 454, 474 has a height h, and each substrate has a thickness of PY-h. FIG. 19B is a cross-sectional view of the optical assembly 478 of FIG. 19A with the bottom face 457 of the first PLC member 450 abutting the waveguides 474 of the second PLC member 470, and with adhesive between the PLC members 450, 470 at an interface 479. A vertical distance between the waveguides 454 of the first PLC member 450 and the waveguides 474 of the second PLC member 470 equals the Y-axis pitch (namely, PY) between rows of optical fibers in an external MCF or rows of fiber cores supported by a FAU (not shown), while laterally adjacent waveguides 454, 474 within each PLC member 450, 470 are separated from one another by a distance equal to the X-axis pitch PX, to match the pitch of cores of an external MCF or cores of optical fibers supported by an external FAU.

In certain embodiments, PLC members having waveguides arranged proximate to an upper or outer face may be backside thinned, and joined in a back-to-back relationship to provide controlled vertical spacing between groups of waveguides.

FIG. 20A is a cross-sectional view of a PLC member 480 having waveguides 484 embedded in a substrate 382 having a top (or outer) face 486, a bottom (or inner) initial face 487A, and sides 483, with a topside fiducial mark 485, with the PLC member 480 in a state prior to performance of a backside thinning operation. Each waveguide 484 is arranged a distance S relative to the upper or outer face 486. FIG. 20B is a cross-sectional view of the PLC member 480 of FIG. 20A following removal of a backside portion 481 (e.g., by polishing, etching, etc.) to expose a bottom (or inner) face 487. Following removal of the backside portion 481, the substrate 482 has a thickness PY/2+S, with the top face 486 and the bottom face 487 being separated by a distance PY/2+S.

Figure 21A:
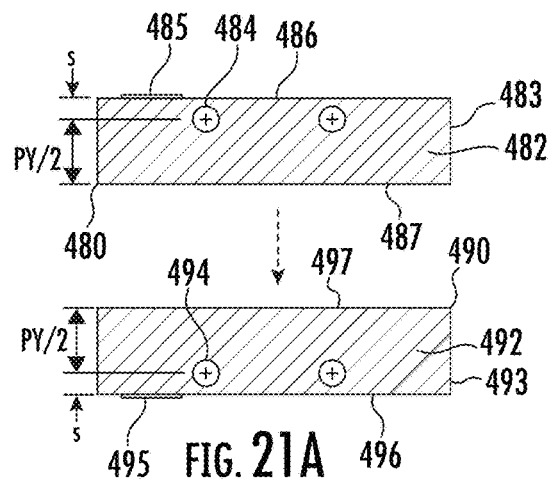
FIG. 21A is an exploded cross-sectional view of a portion of an optical assembly including first and second backside-thinned PLC members each having embedded waveguides and a topside fiducial mark, aligned in a back-to-back orientation.
Figure 21B:
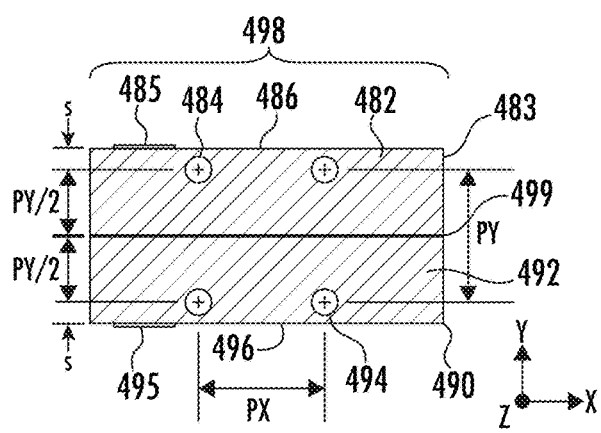
FIG. 21B is a cross-sectional view of the optical assembly portion of FIG. 21A with the PLC members arranged proximate to one another and with the fiducial marks being registered with and distal from one another.

FIG. 21A is an exploded cross-sectional view of a portion of an optical assembly including first and second backside-thinned PLC members 480, 490 each according to the PLC member illustrated in FIG. 20B, in a separated state but aligned in a back-to-back orientation. Each PLC member 480, 490 includes waveguides 484, 494 embedded in a substrate 482, 492 having an outer face 486, 496, an inner face 487, 497, sides 483, and fiducial marks 485, 495 on the outer face 486, 496. FIG. 21B is a cross-sectional view of the optical assembly 498 of FIG. 21A with the PLC members 480, 490 being are joined along abutting inner faces 487, 497 at an interface 499, by adhesive joining or another joining method described herein. A vertical distance between the waveguides 484 of the first PLC member 480 and the waveguides 494 of the second PLC member 490 equals the Y-axis pitch (namely, PY) between rows of optical fibers in an external MCF or rows of fiber cores supported by a FAU (not shown), while laterally adjacent waveguides 484, 494 within each PLC member 480, 490 are separated from one another by a distance equal to the X-axis pitch PX, to match the pitch of cores of an external MCF or cores of optical fibers supported by an external FAU.

In certain embodiments, a group of first waveguides may be deposited on a substrate, an overcladding layer may be deposited on the first waveguides and planarized, an undercladding layer may be deposited over the overcladding layer, a group of second waveguides may be deposited over the undercladding layer, and a second overcladding layer may be deposited over the group of second waveguides, such as described in connection with FIGS. 22A to 23B. In certain embodiments, the substrate, overcladding layers, and undercladding layers may comprise glass.

Figure 22A:
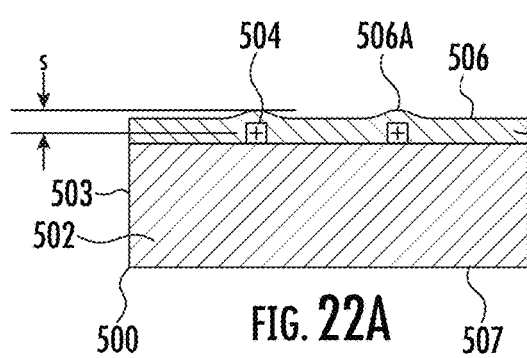
FIG. 22A is a cross-sectional view of a PLC member having waveguides deposited over a substrate and embedded in a first overcladding layer with rounded ridges of locally increased thickness that are registered with the waveguides.
Figure 22B:
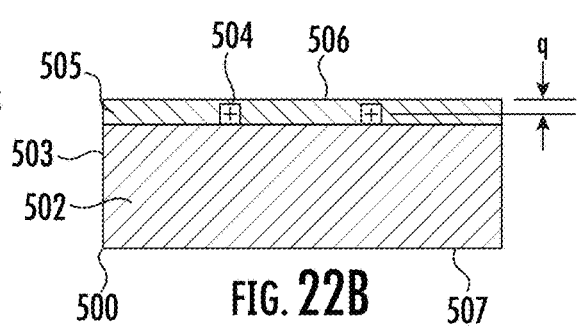
FIG. 22B is a cross-sectional view of the PLC member of FIG. 22A following planarization of the first overcladding layer to cause such layer to have a uniform thickness.

FIG. 22A is a cross-sectional view of a PLC member 500 having a group of first waveguides 504 deposited over a substrate 502, following application of a first overcladding layer 505 over the first waveguides 504 and the substrate 502, with the first overcladding layer 505 having rounded ridges 506A of locally increased thickness that are registered with the first waveguides 504. The PLC member includes a top (or inner) face 506, a bottom (or outer) face 507, and sides 503. Peaks of the rounded ridges 506A are elevated a distance s relative to the center of each first waveguide 504. FIG. 22B is a cross-sectional view of the PLC member 500 of FIG. 22A following planarization (e.g., by polishing) of the first overcladding layer 505 to eliminate the rounded ridges and cause such the first overcladding layer 505 to have a uniform thickness, wherein a center of each first waveguide 504 is arranged a distance q from the top (or inner) face 506 defined by the first overcladding layer 505.

Figures 23A, 23B:
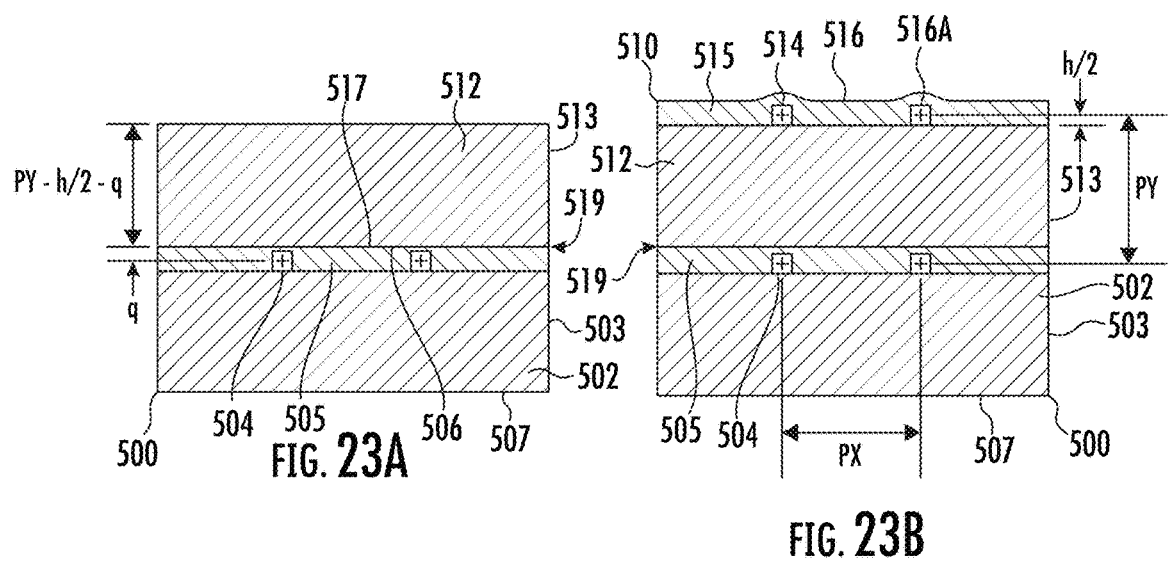
FIG. 23A is a cross-sectional view of the PLC member of FIG. 22B following deposition of an undercladding layer over the first overcladding layer and embedded waveguides.
FIG. 23B is a cross-sectional view of the optical assembly portion of FIG. 23A following deposition of additional waveguides and an additional overcladding layer over the undercladding layer.

FIG. 23A is a cross-sectional view of the PLC member 500 of FIG. 22B following deposition of an undercladding layer 512 over the first overcladding layer 505 and the first waveguides 504. The undercladding layer 512 has an inner face 517, a height PY-h/2-q, and sides 513. FIG. 23B is a cross-sectional view of an optical assembly portion including the structure of FIG. 23A following deposition of a group of second waveguides 514 and a second overcladding layer 515 over the undercladding layer 512. The second overcladding layer 515 includes rounded ridges 516A of locally increased thickness that are registered with the second waveguides 514. The resulting optical assembly of FIG. 23B includes a first PLC member 500 (including the substrate 502, first waveguides 504, first overcladding layer 505, inner face 506, and outer face 507) and a second PLC member 510 (including the undercladding layer 512, second waveguides 514, second overcladding layer 515, inner face 517, and outer face 516) joined at the interface 519. A vertical distance between the second waveguides 514 of the second PLC member 510 and the first waveguides 504 of the first PLC member 500 equals the Y-axis pitch (namely, PY) between rows of optical fibers in an external MCF or rows of fiber cores supported by a FAU (not shown), while laterally adjacent waveguides 504, 514 within each PLC member 500, 510 are separated from one another by a distance equal to the X-axis pitch PX, to match the pitch of cores of an external MCF or cores of optical fibers supported by an external FAU.

In certain embodiments, precisely dimensioned spacer elements may be arranged between PLCs and surrounded by adhesive material. In certain embodiments, adhesive material may have low optical absorption with an index of refraction that is lower than adjacent waveguide materials. Examples of spacer elements that may be used in various embodiments include precision diameter microspheres (e.g., of polymer or inorganic materials), precision thickness glass sheets or glass sheet segments, and precision thickness arrays of optical fibers, which may or may not be grouped into contacting arrays (also known as "rafts"), and which may be distributed over an entire substrate or may be arranged at an inter-substrate interface primarily at positions proximate to edges of the substrates.

Figures 24A, 24B:
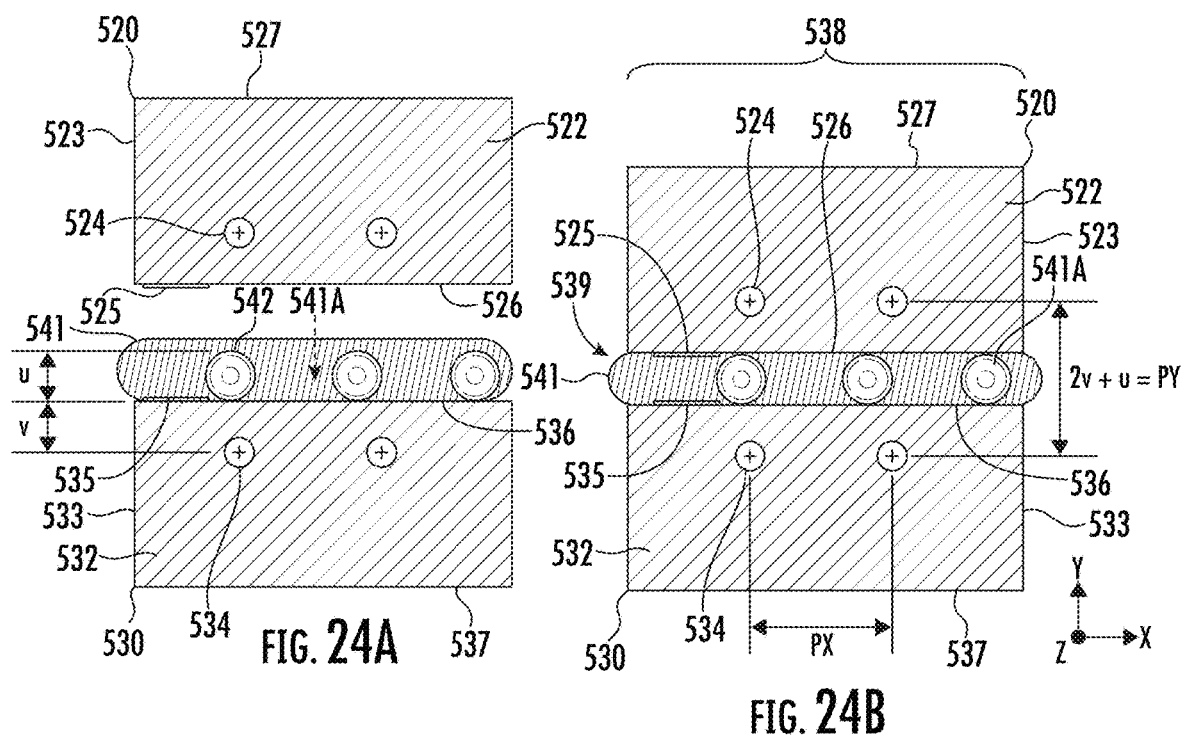
FIG. 24A is a partially exploded cross-sectional view of a portion of an optical assembly including first and second PLC members having embedded waveguides and fiducial marks, with precision diameter microspheres and adhesive arranged between the first and second PLC members.
FIG. 24B is a cross-sectional view of the optical assembly portion of FIG. 24A with the precision microspheres and adhesive arranged in contact with and sandwiched between the first and second PLC members.

FIG. 24A is a partially exploded cross-sectional view of a portion of an optical assembly including first and second PLC members 520, 530 having waveguides 524, 534 embedded in substrates 522, 532 thereof and fiducial marks 525, 535 on inner faces 526, 536 that oppose outer faces 527, 537 of the substrates 522, 532. The waveguides 524, 534 are positioned at a depth v relative to the inner faces 526, 536. Microspheres 541A having a diameter u and adhesive material 541 are arranged between the inner faces 526, 536 of the PLC members 520, 530, wherein a lateral extent of the adhesive material 541 may extend past sides 523, 533 of the PLC members 520, 530. FIG. 24B is a cross-sectional view of the optical assembly 538 of FIG. 24A with the precision microspheres 541A and adhesive material 541 arranged in contact with and sandwiched between the inner faces 526, 536 to serve as an interface 539 between the first and second PLC members 520, 530. If desired, portions of the adhesive material 541 extending past the sides 523, 533 of the PLC members 520, 530 may be removed by polishing or another suitable method. A vertical distance between the waveguides 524 of the first PLC member 520 and the waveguides 534 of the second PLC member 530 equals 2v+u, corresponding to the Y-axis pitch (namely, PY) between rows of optical fibers in an external MCF or rows of fiber cores supported by a FAU (not shown), while laterally adjacent waveguides 524, 534 within each PLC member 520, 530 are separated from one another by a distance equal to the X-axis pitch PX, to match the pitch of cores of an external MCF or cores of optical fibers supported by an external FAU.

Figure 25A:
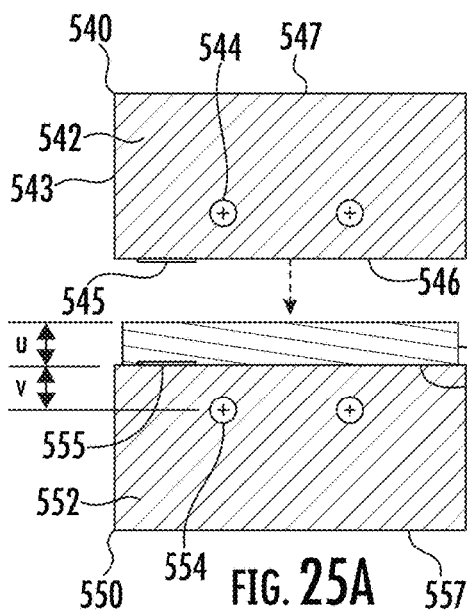
FIG. 25A is a partially exploded cross-sectional view of a portion of an optical assembly including first and second PLC members having embedded waveguides and fiducial marks, with a precision thickness glass sheet arranged between the first and second PLC members.
Figure 25B:
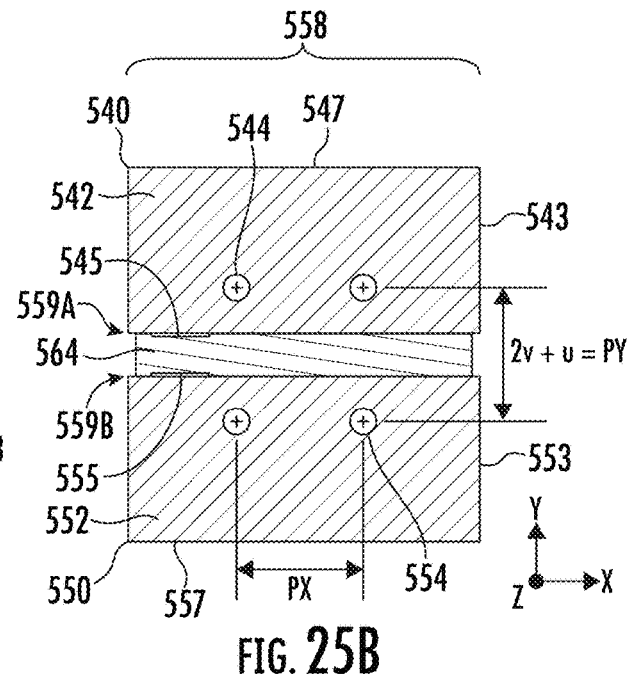
FIG. 25B is a cross-sectional view of the optical assembly portion of FIG. 25A with the precision thickness glass sheet sandwiched between the first and second PLC members.

FIG. 25A is a partially exploded cross-sectional view of a portion of an optical assembly including first and second PLC members 540, 550 having waveguides 544, 554 embedded in substates 542, 552 thereof and fiducial marks 545, 555 (registered with one another) on inner faces 546, 556 that oppose outer faces 547, 557 of the substrates 542, 552. The waveguides 544, 554 are positioned at a depth v relative to the inner faces 546, 556, and a precision thickness glass sheet 564 having a thickness u is arranged between the first and second PLC members 540, 550. FIG. 25B is a cross-sectional view of the optical assembly 558 of FIG. 25A with the precision thickness glass sheet 564 sandwiched between the first and second PLC members 540, 550. Bonding between the PLC members 540, 550 and the glass sheet 564 along interfaces 559A, 559B may be accomplished by adhesive bonding or other bonding methods. A vertical distance between the waveguides 544 of the first PLC member 540 and the waveguides 554 of the second PLC member 550 equals 2v+u, corresponding to the Y-axis pitch (namely, PY) between rows of optical fibers in an external MCF or rows of fiber cores supported by a FAU (not shown), while laterally adjacent waveguides 544, 554 within each PLC member 540, 550 are separated from one another by a distance equal to the X-axis pitch PX, to match the pitch of cores of an external MCF or cores of optical fibers supported by an external FAU.

Figure 26A:
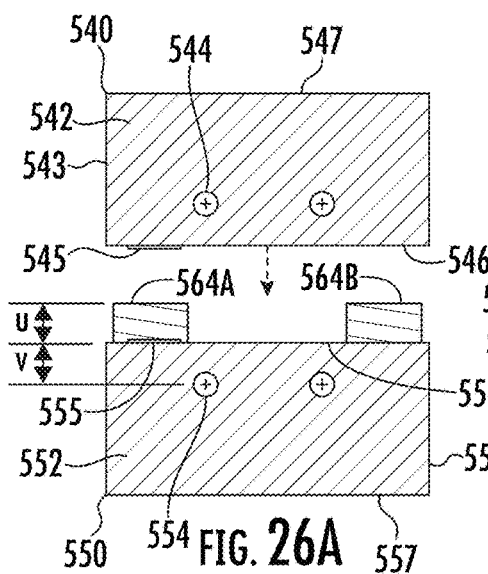
FIG. 26A is a partially exploded cross-sectional view of a portion of an optical assembly including first and second PLC members having embedded waveguides and fiducial marks, with multiple precision thickness glass sheet segments arranged between the first and second PLC members.
Figure 26B:
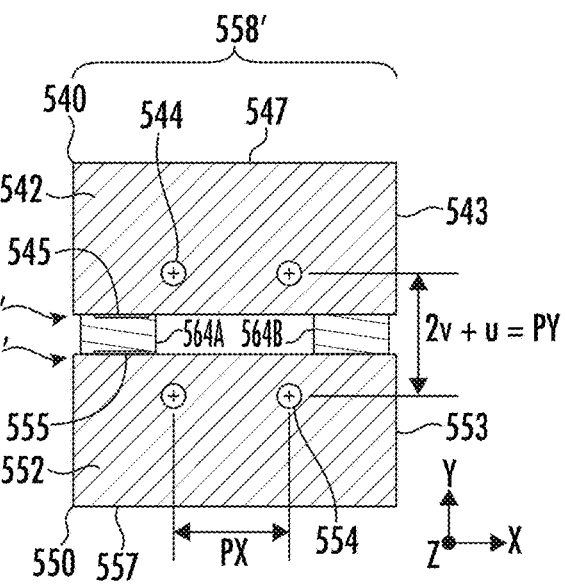
FIG. 26B is a cross-sectional view of the optical assembly portion of FIG. 26A with the precision thickness glass sheet segments sandwiched between the first and second PLC members.

FIGS. 26A-26B is a partially exploded cross-sectional view of a portion of an optical assembly including PLC members 540, 550 identical to those shown in FIGS. 25A-25B, but with precision thickness glass sheet segments 564A, 564B arranged between the PLC members 540, 550. By reducing the contact area between the glass sheet segments 564A, 564B and the substrates 542, 552 (relative to use of a single glass sheet 564), it may be possible to allow adhesive (not shown) to flow more easily into areas devoid of any spacer. Elements of the PLC members 540, 550 are the same as described in connection with FIGS. 25A-25B and will not be described again. Referring to FIGS. 26A-26B, first and second a precision thickness glass sheet segments 564A, 564B each having a thickness u are arranged between the first and second PLC members 540, 550, and offset laterally relative to the waveguides 544, 554. FIG. 26B is a cross-sectional view of the optical assembly 558' of FIG. 26A with the precision thickness glass sheet segments 564A, 564B sandwiched between the first and second PLC members 540, 550. Bonding between the PLC members 540, 550 and the glass sheet segments 564A, 564B along interfaces 559A', 559B' may be accomplished by adhesive bonding or other bonding methods. A vertical distance between the waveguides 544 of the first PLC member 540 and the waveguides 554 of the second PLC member 550 equals 2v+u, corresponding to the Y-axis pitch (namely, PY) between rows of optical fibers in an external MCF or rows of fiber cores supported by a FAU (not shown), while laterally adjacent waveguides 544, 554 within each PLC member 540, 550 are separated from one another by a distance equal to the X-axis pitch PX, to match the pitch of cores of an external MCF or cores of optical fibers supported by an external FAU.

In certain embodiments, an array of optical fibers may be used as a spacer between PLC members of an optical assembly. Optical fibers can be drawn with precise cladding diameters, allowing them to be grouped together in arrays to form a "raft." A raft can be fabricated made by stripping the coatings from two fiber ribbon arrays, and then interdigitating the stripped portions while squeezing them together from the sides so that neighboring optical fibers come into contact with each other. One potential advantage of using a fiber array raft in lieu of a precision thickness glass sheet as a spacer between PLC members is that a fiber array raft only makes contact with PLC members along parallel lines of contact, thereby leaving remaining regions between fibers available for directing excess adhesive out of a gap between PLC members.

Figure 27A:
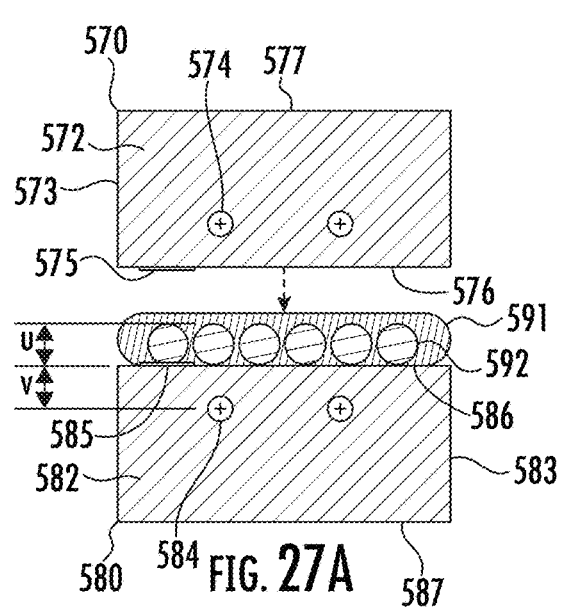
FIG. 27A is a partially exploded cross-sectional view of a portion of an optical assembly including first and second PLC members having embedded waveguides and fiducial marks, with an array (or "raft") of contacting bare glass fibers (arranged parallel to the embedded waveguides) derived from an optical fiber ribbon, plus adhesive material, arranged between the first and second PLC members.
Figure 27B:
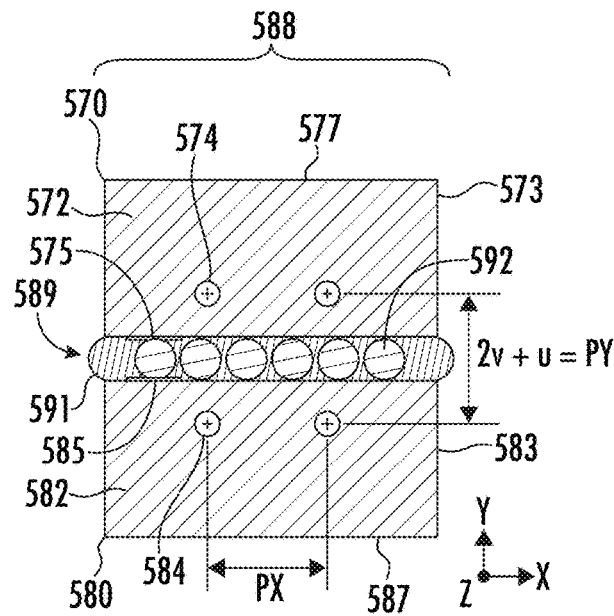
FIG. 27B is a cross-sectional view of the optical assembly portion of FIG. 27A with the array of bare glass fibers and adhesive material sandwiched between the first and second PLC members.

FIG. 27A is a partially exploded cross-sectional view of a portion of an optical assembly including first and second PLC members 570, 580 having waveguides 574, 584 embedded within substrates 572, 582, with the waveguides 574, 584 arranged at a depth v relative to inner surfaces 576, 586 of the substrates 572, 582 that oppose outer surfaces 577, 587 thereof. Each PLC member 570, 580 includes fiducial marks 575, 585 along the inner surface 576, 586 that are registered with one another, and includes sides 573, 583 extending between the inner surfaces 576, 586 and outer surfaces 577, 587. A raft 592 of contacting bare glass fibers (arranged parallel to the embedded waveguides 574, 584, and having a diameter u) and adhesive material 591 are arranged between the first and second PLC members 570, 580. FIG. 27B is a cross-sectional view of the optical assembly 588 of FIG. 27A with the raft 592 of bare glass fibers and adhesive material 591 sandwiched between the inner faces 576, 586 of the PLC members 570, 580 along an interface 589. If desired, portions of the adhesive material 591 extending past the sides 573, 583 of the PLC members 570, 580 may be removed by polishing or another suitable method. A vertical distance between the waveguides 574 of the first PLC member 570 and the waveguides 584 of the second PLC member 580 equals 2v+u, corresponding to the Y-axis pitch (namely, PY) between rows of optical fibers in an external MCF or rows of fiber cores supported by a FAU (not shown), while laterally adjacent waveguides 574, 584 within each PLC member 570, 580 are separated from one another by a distance equal to the X-axis pitch PX, to match the pitch of cores of an external MCF or cores of optical fibers supported by an external FAU.

In certain embodiments, a variation on the fiber array raft approach may involve stripping a single fiber ribbon to expose an array of bare fibers that are laterally spaced apart from one another, wherein the bare fiber array may be used as a spacer between PLC members of an optical assembly. In certain embodiments, a bare fiber array may include bare fibers (either contacting one another, or in a non-contacting relationship) distributed evenly across faces of adjacent PLC members, whereas in other embodiments, first and second bare fiber arrays may be arranged at such an interface solely at locations proximate to edges of PLC members.

Figure 28A:
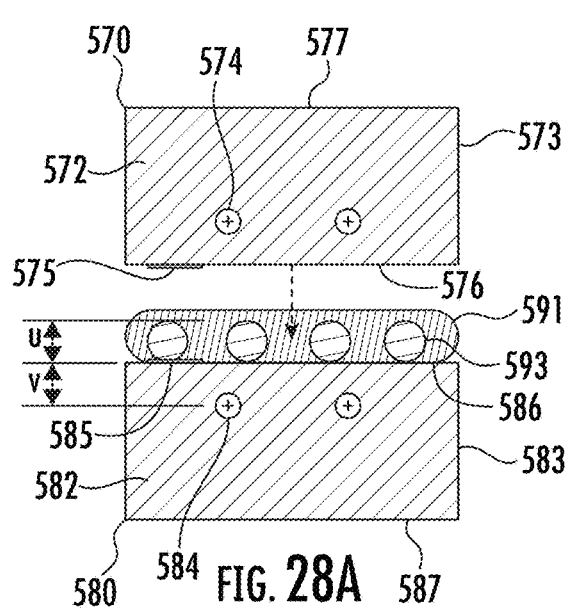
FIG. 28A is a partially exploded cross-sectional view of a portion of an optical assembly including first and second PLC members having embedded waveguides and fiducial marks, with multiple bare glass fibers (arranged parallel to the embedded waveguides) and adhesive material arranged between the first and second PLC members.
Figure 28B:
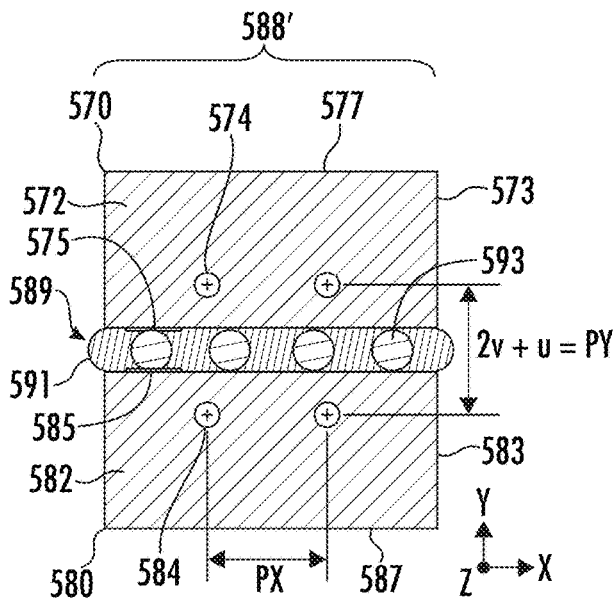
FIG. 28B is a cross-sectional view of the optical assembly portion of FIG. 28A with the bare glass fibers and adhesive material sandwiched between the first and second PLC members.

FIG. 28A is a partially exploded cross-sectional view of a portion of an optical assembly including first and second PLC members 570, 580 having waveguides 574, 584 embedded within substrates 572, 582, with the waveguides 574, 584 arranged at a depth v relative to inner surfaces 576, 586 of the substrates 572, 582 that oppose outer surfaces 577, 587 thereof. Each PLC member 570, 580 includes fiducial marks 575, 585 along the inner surface 576, 586 that are registered with one another, and includes sides 573, 583 extending between the inner surfaces 576, 586 and outer surfaces 577, 587. An array 593 of non-contacting bare glass fibers (arranged parallel to the embedded waveguides 574, 584, and having a diameter u) and adhesive material 591 are arranged between the first and second PLC members 570, 580. FIG. 28B is a cross-sectional view of the optical assembly 588 of FIG. 28A with the array 593 of bare glass fibers and adhesive material 591 sandwiched between the inner faces 576, 586 of the PLC members 570, 580 along an interface 589. If desired, portions of the adhesive material 591 extending past the sides 573, 583 of the PLC members 570, 580 may be removed by polishing or another suitable method. A vertical distance between the waveguides 574 of the first PLC member 570 and the waveguides 584 of the second PLC member 580 equals 2v+u, corresponding to the Y-axis pitch (namely, PY) between rows of optical fibers in an external MCF or rows of fiber cores supported by a FAU (not shown), while laterally adjacent waveguides 574, 584 within each PLC member 570, 580 are separated from one another by a distance equal to the X-axis pitch PX, to match the pitch of cores of an external MCF or cores of optical fibers supported by an external FAU.

One potential concern with use of fiber array rafts as a spacers between PLC members is that regions between the fibers that are filled with adhesive may produce local variations in end face polishing quality and profile. To address this problem, the fiber array rafts may be oriented parallel to the end faces (or optical surfaces) of PLC members and perpendicular to waveguides defined by the PLCs near the end faces to minimize the amount of adhesive exposed during end face polishing.

FIG. 29A is a partially exploded cross-sectional view of a portion of an optical assembly including first and second PLC members 600, 610 having waveguides 604, 614 arranged between substrates 602, 612 and overcladding layers 605, 615. The waveguides 604, 614 are arranged at a depth v relative to inner surfaces 606, 616 of the PLC members 600, 610 (formed by the overcladding layers 605, 615) that oppose outer surfaces 607, 617 of the PLC members 600, 610 (formed by the substrates 602, 612). Each PLC member 600, 610 includes a front end 601A, 611A and an opposing rear end 601B, 611B that serve as optical surfaces. First and second arrays 594A, 594B of contacting bare glass fibers (arranged perpendicular to the embedded waveguides 604, 614, and having a diameter u) and adhesive material 591 are arranged between the first and second PLC members 600, 610. FIG. 29B is a cross-sectional view of the optical assembly 618' of FIG. 29A with the first and second arrays 594A, 594B of bare glass fibers and adhesive material 591 sandwiched between the inner faces 606, 616 of the PLC members 600, 610 along an interface 619, with the first array 594A of bare glass fibers arranged proximate to the front ends 601A, 611A, and with the second array 594B of bare glass fibers arranged proximate to the rear ends 601B, 611B. A vertical distance between the waveguides 604 of the first PLC member 600 and the waveguides 614 of the second PLC member 610 equals 2v+u, corresponding to the Y-axis pitch (namely, PY) between rows of optical fibers in an external MCF or rows of fiber cores supported by a FAU (not shown), while laterally adjacent waveguides 604, 614 within each PLC member 600, 610 are separated from one another by a distance equal to the X-axis pitch PX, to match the pitch of cores of an external MCF or cores of optical fibers supported by an external FAU. FIG. 29C is a cross-sectional view of the optical assembly 618 of FIG. 29B after processing (e.g., by polishing or another suitable method) to remove portions of the adhesive material 591 and optical fibers of the arrays 594A, 594B extending past the respective ends 601A, 611A, 601B, 611B of the PLC members 600, 610.

In certain embodiments, precision height laser bumps may be used as spacers between PLC members of an optical assembly. Laser bumps are formed on glass sheets by focusing infrared (IR) laser radiation briefly at a location on the surface of the sheet. Glass swells rapidly upon laser heating and melting, such that when a laser pulse stops, the resulting bump cools rapidly and causes the swollen bump shape to persist. Laser bumps have been formed on a variety of glasses with heights as high as 10% of the glass sheet thickness, and laser bump heights can be controlled to less than 1 µm. Any suitable number of three or more laser bumps may be provided on an inner surface of a PLC member to be joined to another PLC member, and adhesive material may be used to fill in gaps between the laser bumps.

FIG. 30A is a partially exploded cross-sectional view of a portion of an optical assembly including first and second PLC members 620, 630 having waveguides 624, 634 arranged between substrates 622, 632 and overcladding material 625, 635, with the waveguides 624, 634. Each PLC member 620, 630 includes an inner face 626, 636 defined by the overcladding material 625, 635, and includes an outer face 627, 637 defined by the substrate 622, 632. Each PLC member 620, 630 includes at least one fiducial mark 623, 633 along the inner face 626, 636 that are registered with one another, and includes a front end 621A, 631A and an opposing rear end 621B, 631B that serve as optical surfaces. The second PLC member 630 includes laser bumps 636A that are elevated by a height u relative to the inner surface 636 thereof, and the waveguides 624, 634 are arranged at a depth v relative to the inner surfaces 626, 636. FIG. 30B is a cross-sectional view of the optical assembly 638 of FIG. 30A with the inner surface 626 of the first PLC member 620 contacting the laser bumps 636A, and with adhesive material 591 sandwiched between the first and second PLC members 620, 630 at an interface 639. A vertical distance between the waveguides 624 of the first PLC member 620 and the waveguides 634 of the second PLC member 630 equals 2v+u, corresponding to the Y-axis pitch (namely, PY) between rows of optical fibers in an external MCF or rows of fiber cores supported by a FAU (not shown), while laterally adjacent waveguides 624, 634 within each PLC member 620, 630 are separated from one another by an X-axis pitch to match the pitch of cores of an external MCF or cores of optical fibers supported by an external FAU.

In certain embodiments, spacing between waveguides of adjacent PLC members in an optical assembly may be adjusted using precision diameter tubular members (e.g., bare glass fibers) in precisely defined grooves (e.g., V-grooves or U-spaced grooves), wherein the tubular members may also be used to promote lateral alignment between PLC members. To facilitate control of vertical spacing between PLC members, the grooves should be fabricated at a precise depth relative to surfaces of the PLC members facing one another. In certain embodiments, grooves (e.g., V-grooves) may be formed by sawing (e.g., diamond) in glass substrates and/or overclad or underclad layers, or grooves (e.g., U-grooves) may be anisotropically etched in silicon substrates. If etching is used for groove formation, the depth can be precisely controlled by stopping the depth at a predetermined time, or by incorporating an etch stop layer to terminate etching at a predefined depth. An etch stop layer can be a silicon or silicon nitride layer deposited on a glass substrate or on a bulk silicon substrate. Cladding material deposited over an etch stop layer or substrate can be removed at a rapid rate, but once the etch stop layer is reached, the etching rate slows considerably, such that stopping the etching upon an etchant reaching the etch stop layer will cause the depth of a U-groove to be well controlled. In one embodiment, a glass substrate may be overlaid with an etch stop layer, an underclad material, and waveguides contained in an overclad layer, and etching may define a U-groove penetrating through an entire depth of sequentially arranged overclad and underclad layers to terminate at the etch stop layer. In certain embodiments, a silicon substrate (which itself serves as an etch stop) may be covered with an underclad layer and waveguides contained in an overclad layer, and etching may define a U-groove penetrating through an entire depth of sequentially arranged overclad and underclad layers to terminate at the silicon substrate. Thicknesses of the underclad layer and the overclad layer may be precisely controlled to avoid undue variation in vertical spacing between waveguides defined in adjacent PLC members. One potential advantage of using U-grooves (with or without etch stops) is that a lateral offset between waveguides of a PLC member and a U-groove etch can be precisely controlled by photolithographic patterning and mask layer alignment.

FIG. 31A is a partially exploded cross-sectional view of a portion of an optical assembly including first and second PLC members 640, 650 having waveguides 644, 654 embedded in a substrate 642, 652 having an inner face 646, 656 and an outer face 647, 657 with sides 643, 653 extending therebetween. Peripheral V-grooves 641, 651 are defined in the inner faces 646, 656, and tubular alignment members 599 (optionally embodied in bare glass fibers) received within the peripheral V-grooves 656 of the lower PLC member 654. For each substrate 642, 652, each inner face 646, 656 is separated from a horizontal centerline of the waveguides 644, 654 embedded in the substrate 642, 642 by a distance v, and the tubular alignment members 599 in the V-grooves 651 have a horizontal centerline spaced from the inner face 656 by a distance u. FIG. 31B is a cross-sectional view of the optical assembly 658 of FIG. 31A with the tubular alignment members 599 received within opposing peripheral V-grooves 641, 651 of the first and second PLC members 640, 650, and with adhesive material 591 arranged between the inner faces 646, 656 at an interface 659 between the PLC members 640, 650. A vertical distance between the waveguides 644 of the first PLC member 640 and the waveguides 654 of the second PLC member 650 equals 2v+2u, corresponding to the Y-axis pitch (namely, PY) between rows of optical fibers in an external MCF or rows of fiber cores supported by a FAU (not shown), while laterally adjacent waveguides 644, 654 within each PLC member 640, 650 are separated from one another by an X-axis pitch to match the pitch of cores of an external MCF or cores of optical fibers supported by an external FAU.

Figure 32:
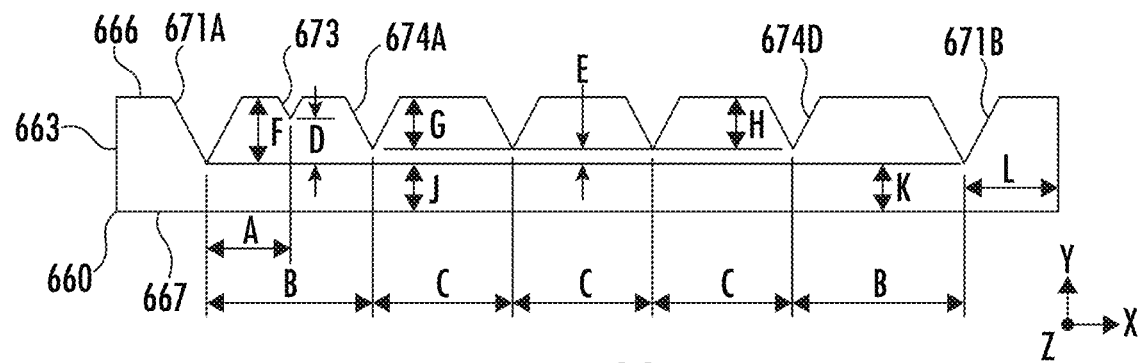
FIG. 32 is a cross-sectional view of a glass substrate with sawed V-grooves useful for producing a PLC member.

Fabrication of V-grooves at a precise offset away from waveguides of a PLC member may be challenging, depending on the substrate type and the V-groove fabrication method. A sawing process is capable of producing multiple V-grooves with precise lateral (X-axis) and vertical (Y-axis) offsets relative to one another. FIG. 32 is an example of a glass substrate 660 with various V-grooves defined therein, including peripheral V-grooves 671A, 671B, central V-grooves 674A-647D, and a reference V-groove 673. Dimensions that can be controlled include: (i) X-axis lateral spacing of V-grooves relative to one another (i.e., dimensions A, B, and C); (ii) Y-axis depth of V-grooves relative to one another (i.e., dimensions D and E). However, precise V-groove alignment relative to pre-existing surface features and edges (e.g., top face 666, bottom face 667, and sides 663) on a glass substrate 660 is more difficult. For example, it is more difficult to produce sawed V-grooves at a precise depth relative to a top face 666 of the substrate 660 (or an overclad layer), since glass substrates are not generally fabricated with precise thicknesses, and their thickness can vary with position (e.g., with respect to change in position along the X-axis). Therefore, the following dimensions shown in FIG. 32 may be difficult to control using conventional methods: (i) Y-axis V-groove depth relative to the top surface 666 of the substrate 660, namely, dimensions F, G, and H; (ii) Y-axis distance between the bottom of a V-groove (e.g., peripheral V-grooves 67A, 671B) and the bottom face 667 of the substrate 660, namely, dimensions J and K; and (iii) X-axis distance to a pre-existing feature, such as a side 663 of the substrate 660, namely, dimension L.

Since it is difficult to a precisely align sawed V-grooves to existing features or alignment marks, sawed V-grooves should be fabricated in a glass substrate prior to PLC waveguides. After V-groove sawing, a photolithographic mask layer can be aligned to visible V-groove features, including: (a) the top edge where a V-groove sidewall meets the top surface of a substrate (note that this edge may have some chipping, but it is possible to define a line that extends along the edge via digital image processing techniques), and (b) the bottom of the V-groove, where the two V-groove sidewalls meet (noting that even if the visible line along the bottom of the V-groove has chipping or roughness, it is possible to define a line along it via digital image processing). Both of the foregoing alignment approaches (a) and (b) have challenges. For top edge alignment, if the substrate thickness varies, the lateral (X-axis) distance to the bottom of the V-groove will also vary, making it difficult to precisely determine the lateral offset distance w required for spacing the V-groove relative to a subsequent PLC waveguide features. Further, for V-groove bottom alignment, the feature is located at the bottom of the V-groove, which may be tens of micrometers below the surface of the glass substrate. This makes the process of accurately determining the lateral offset of the V-groove bottom relative to a subsequent PLC waveguide feature more difficult, as the two datum features (the V-groove bottom and a fiducial or alignment mark on the photolithographic mask that defines the PLC waveguide) lie in different depth focal planes.

One method to address the above-identified challenges in V-groove alignment is to provide a shallow reference V-groove (i.e., V-groove 673 shown in FIG. 32) at a precise lateral (i.e., X-axis) offset relative to deeper V-grooves (e.g., peripheral V-grooves 671A, 671B). This reference V-groove 673 only needs to be several micrometers (e.g., 3 to 10 μm) deep—that is, sufficiently deep to produce a clear-V-groove bottom feature across a face of the substrate (e.g., substrate 602), considering any top face variations and substrate thickness variations. Since the reference V-groove 673 is shallow, the bottom of the V-groove 673 lies in a plane that is close to a focal plane of fiducial or alignment marks of a photolithographic mask that defines the waveguides (not shown) of a PLC member produced from the substrate 660. As a result, the reference V-groove 673 can serve as a precision fiducial or reference for the deeper peripheral V-grooves 671A, 671B groove during fabrication of waveguides (not shown) on or in the substrate 660.

In certain embodiments, V-grooves may be formed in crystalline materials using anisotropic etching. Examples of substrate materials suitable for being etched in this manner include silicon and $LiNbO_3$. Exposure to chemical etchants preferentially removes material in the direction of specific crystallographic planes, forming precision V-groove features. Examples of wet etchants suitable for use with silicon include KOH (potassium hydroxide), TMAH (tetramethyl ammonium hydroxide $((CH_3)_4NOH)$, and TMAH:IPA (a combination of TMAH and isopropyl alcohol). Dry anisotropic etching is also possible. For example, $LiNbO_3$ can be anisotropically etched using $SF_6/Ar$ in an inductively coupled plasma etching apparatus.

Substrate etching occurs in regions unprotected by an etch-resistant mask layer. Etch mask materials for KOH include silicon nitride, hafnium oxide, PECVD SiC and SiCN, boron-doped Si, PDMS (polydimethylsiloxane), Ni, Mo, and Pt, while etch mask materials for TMAH include $SiO_2$, Al, Ag, Au, and Ta. To prevent excessive mask undercut etching, an etch mask should be well-adhered to a substrate, and a joining interface between a mask and substrate should be free of contamination.

A first process option for forming V-grooves and waveguides in a PLC member includes etching V-grooves before the waveguides are formed. An advantage of this approach is that if V-grooves are fabricated so that they are misaligned or incorrectly sized due to the various distortion conditions (e.g., errors in crystallographic plane orientation relative to a polished surface, spatial variations in etchant concentration within an etch bath, temporal variation in etchant concentration during an etching process, temperature variation of the etchant with respect to time and spatial location, misalignment of an etch mask relative to crystallographic planes of the material to be etched, incorrect shape of an etch mash due to patterning and mask etching variations), then a the PLC waveguide mask step alignment process can compensate and adjust the placement of waveguides in a PLC member. Utilization of a shallow reference V-groove as outlined above can be used to ensure that the reference feature (V-groove bottom) is close to the depth plane of waveguide mask alignment features. One concern is that deep V-grooves can produce challenges in photolithography (e.g., uneven photoresist coverage over profiled surfaces), but in certain embodiments deep features may be filled and planarized by optimizing photoresist spin-on conditions or applying additional temporary planarizing fill layers. Another concern is that fabrication of waveguides in a PLC member may involve deposition of glass underclad and overclad layers into V-groove features unless such features are masked. Glass underclad deposition rates and resulting underclad layer thicknesses may be different on sloped V-groove sidewalls versus flat surfaces in the vicinity of waveguides defined on a PLC member. As a result, the contributions of glass underclad and overclad layer thickness to multi-core fiber PLC substrate spacing will need to be considered if these layers are deposited over the V-grooves. Ion exchange waveguides have an advantage in that they do not require deposition of glass underclad layers or overclad layers A second process option for forming V-grooves and waveguides in a PLC member includes etching V-grooves after the waveguides are formed. Using this approach, etched V-grooves can be precisely aligned to PLC waveguides. Problems with photolithography over non-planar surfaces are avoided, but it may be more difficult to image waveguide locations, especially if they are buried beneath overclad layers. Glass underclad and overclad layers may need to be masked in regions where V-grooves will be etched later, or the underclad and overclad material may need to be removed prior to V-groove etching. The contributions of glass underclad thickness variation will also influence MCF PLC substrate spacing requirements, as the vertical pitch between PLC waveguides will change as the underclad thickness changes.

In certain embodiments, lateral alignment between first and second PLC members may be aided by forming items such as V-grooves and waveguides on or over a single substrate, then dicing (cutting) the substrate and placing (by an operation akin to folding) one cut substrate section over another.

Figure 33A:
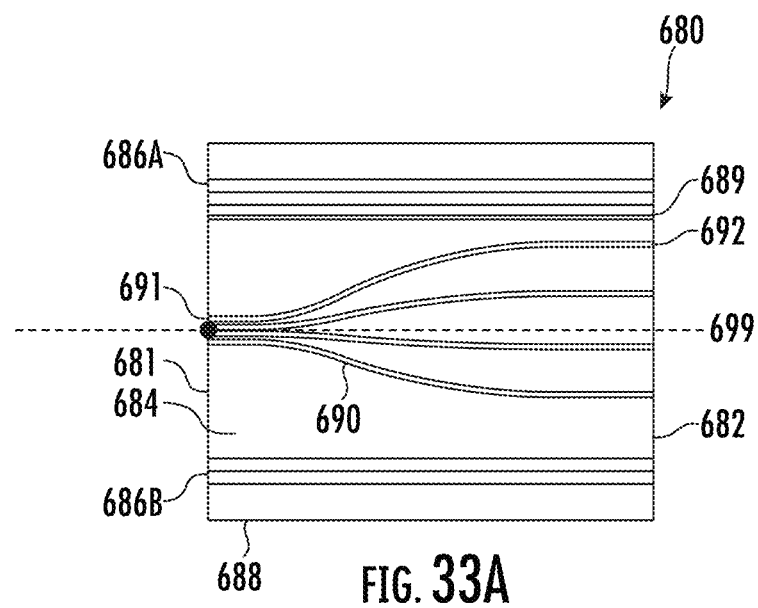
FIG. 33A is a top plan view of a PLC member with peripheral V-grooves, a reference V-groove, and embedded waveguides.

FIG. 33A is a top plan view of a first PLC member 680 defining peripheral V-grooves 686A, 686B, a reference V-groove 689, and a plurality of first waveguides 690 that extend from a front end 681 to a rear end 682 of a substrate 684, wherein each end 681, 682 serves as an optical surface. The V-grooves 686A, 686B, 689 are defined in the substrate 684 and extend parallel to sides 688 of the substrate 684. The plurality of first waveguides 690 includes first ends 691 having a first pitch at the front end 681, and includes second ends 692 having a second, larger pitch at the rear end 682. As shown, a centerline 699 extends through a point centered on the plurality of first waveguides 690 at the front end 681 of the PLC member 680.

Figure 33B:
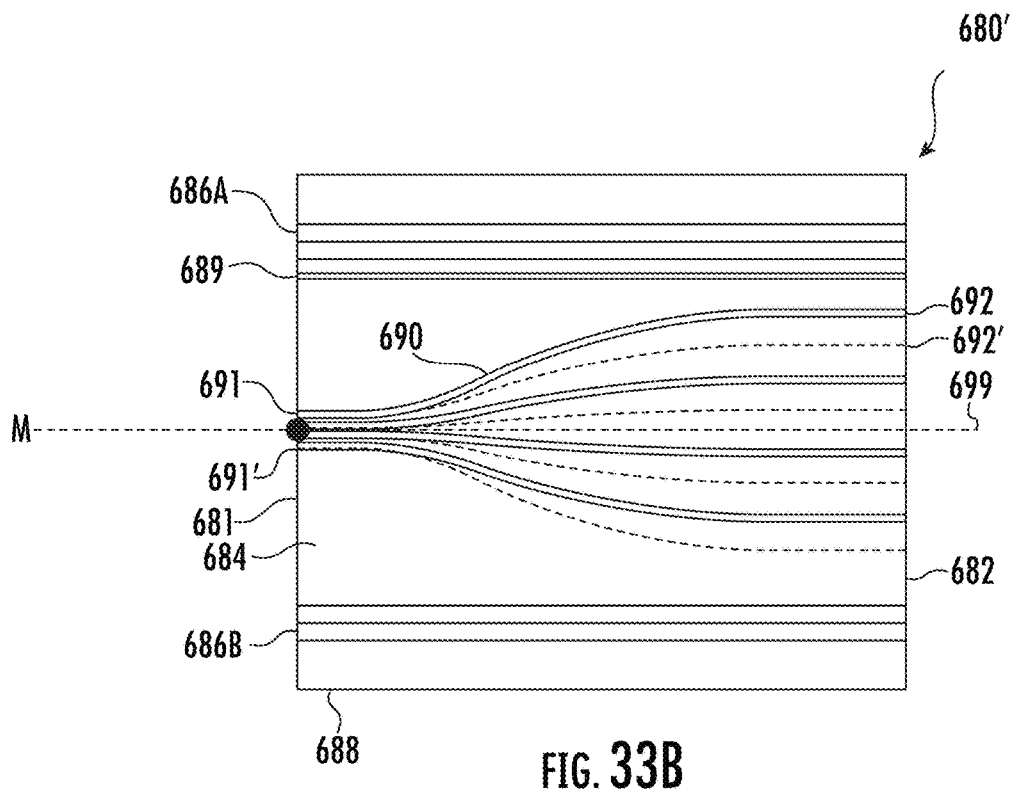
FIG. 33B is a top plan view of the PLC member of FIG. 33A with addition of dashed lines showing hypothetical positions of the embedded waveguides if the PLC member were flipped vertically about a horizontal centerline.

FIG. 33B is a top plan view of the first PLC member 680 of FIG. 33A with addition of dashed lines representing positions of the plurality of first waveguides 690 if the substrate 690 were flipped vertically around the horizontal centerline 699, with the dashed lines extending from first ends 691' to second ends 692' that coincide with the front and rear ends 681, 682 of the substrate 684. As shown, the first ends 691' overlap the first ends 691 of the plurality of first waveguides 690, and the second ends 692' are laterally interspersed with the second ends of a plurality of first waveguides 690. The remaining features of FIG. 33B are identical to those shown and described in connection with FIG. 33A.

Figure 34A:
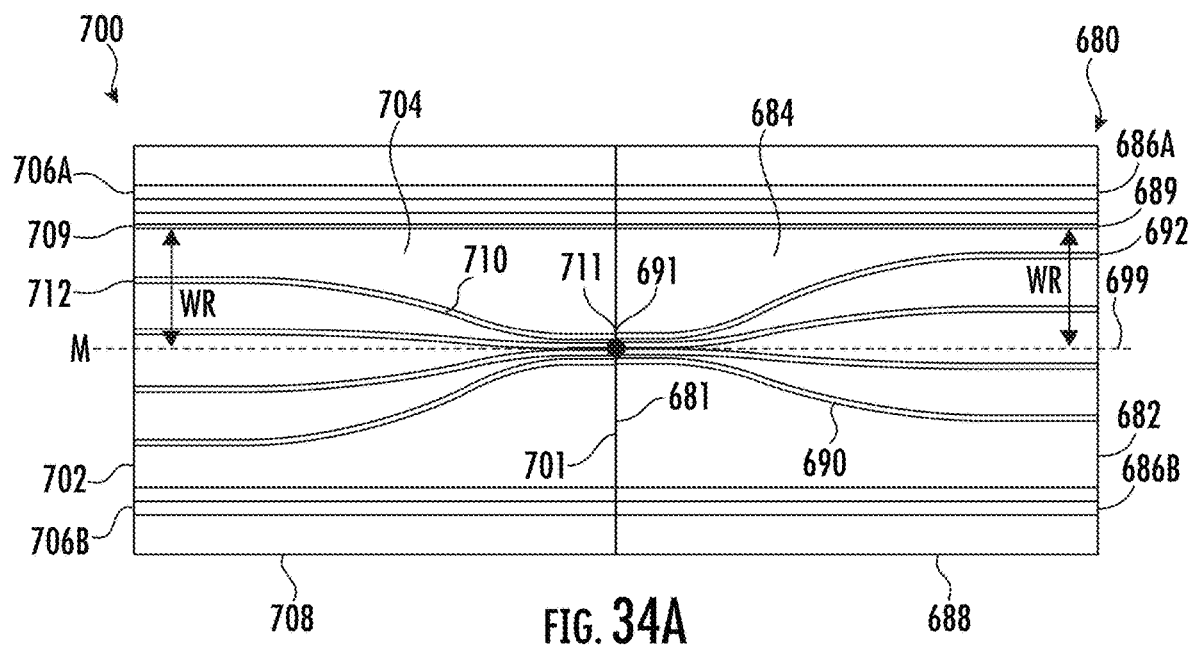
FIG. 34A is a top plan view of first and second PLC members arranged side-by-side showing positions of V-grooves and waveguides of the respective PLC members.

FIG. 34A is a top plan view of first and second PLC members 680, 700 arranged side-by-side, with the first and second PLC members 680, 700 respectively defining peripheral V-grooves 686A, 686B, 706A, 706B, a reference V-groove 689, 709, a plurality of first waveguides 690, and a plurality of second waveguides 690, 710. Each PLC member 680, 700 includes a substrate 684, 704 having a front end 681, 701, a rear end 682, 702, and sides 688, 708. The plurality of first waveguides 690 includes first ends 691 at the front end 681 of the first substrate 684, and includes second ends 692 at the rear end 682 of the first substrate 684. Similarly, the plurality of second waveguides 710 includes first ends 711 at the front end 701 of the first substrate 704, and includes second ends 712 at the rear end 702 of the second substrate 704. The reference V-groove 689, 709 are separated from the horizontal centerline 699 by a constant distance WR. The first and second PLC members 680, 700 may be fabricated on a single (e.g., glass) body member, and then divided (e.g., diced or cut) to define the front ends 681, 701 separating the substrates 684, 704. Such an approach permits the peripheral V-grooves 686A, 686B, 706A, 706B and the reference V-groove 689, 709 to be aligned, as well as alignment between the first ends 691, 701 of the pluralities of first and second waveguides 690, 700.

Figure 34B:
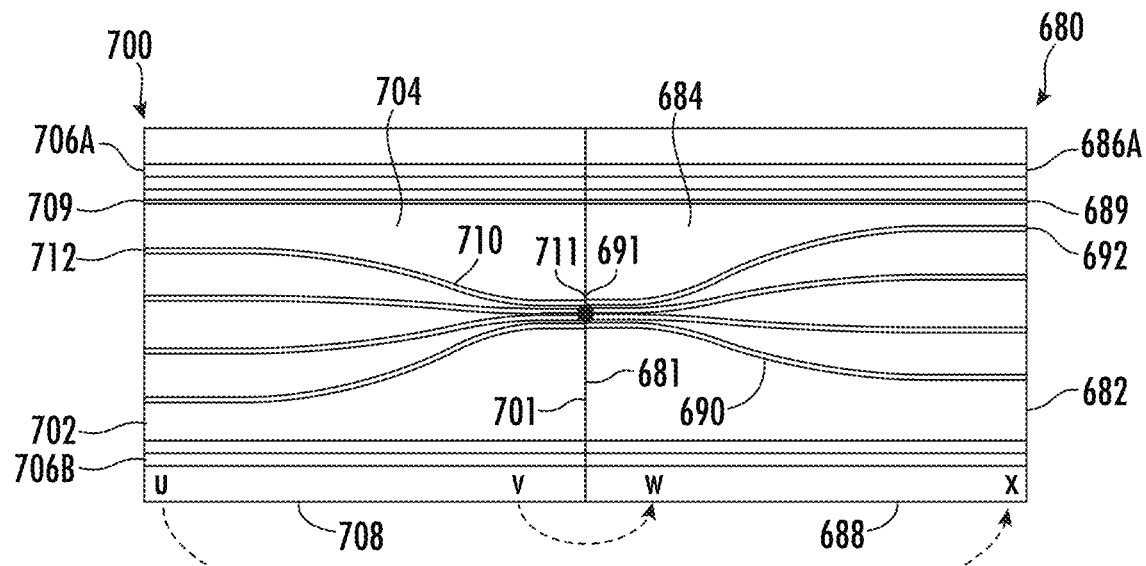
FIG. 34B is a top plan view of the first and second PLC members of FIG. 34A, with superimposed dashed line arrows showing a left-to-right folding pattern for causing the left (second) PLC member to overlie and be stacked over the right (first) PLC member.
Figure 34C:
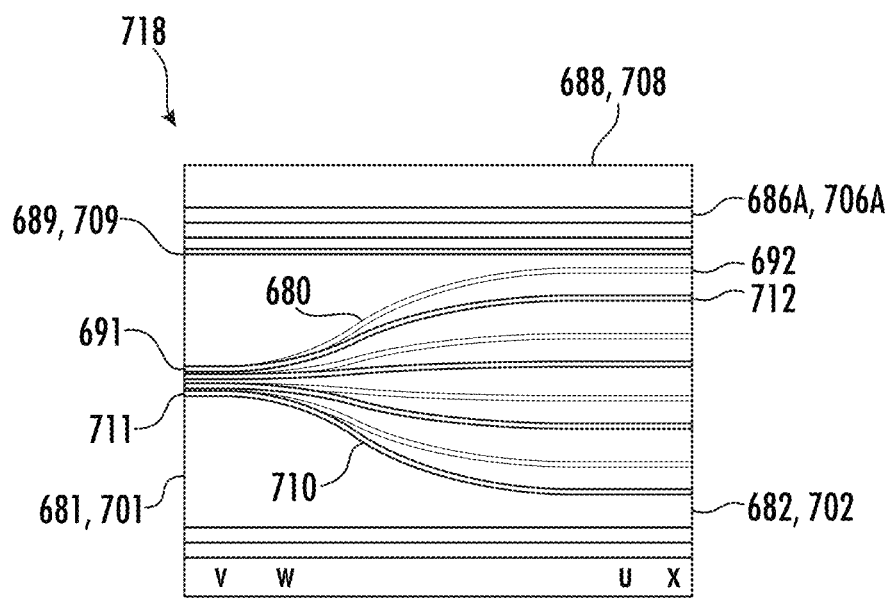
FIG. 34C is a top plan view of the first and second PLC members of FIG. 34B in a stacked configuration after folding according to the left-to-right folding pattern shown in FIG. 34B.

FIG. 34B is a top plan view of the first and second PLC members 680, 701 of FIG. 34A, with superimposed dashed line arrows (from points u and v to points w and x, respectively) showing a left-to-right folding pattern for causing the left (second) PLC member 700 to overlie and be stacked over the right (first) PLC member 680 (i.e., with the front end of 681 of the first substrate 684 being registered with the front end 701 of the second substrate 704. FIG. 34C is a top plan view of the first and second PLC members 680, 700 of FIG. 34B in a stacked configuration (after folding according to the left-to-right folding pattern shown in FIG. 34B) to form an optical assembly 718. As shown, peripheral grooves 686A, 706A are registered with one another, as are reference grooves 689, 709 and first ends 691, 701 of the pluralities of first and second waveguides 690, 710 at the front ends 681, 701 that serve as an optical surface with the waveguide ends 691, 701 arranged in a two-dimensional array having a small pitch. At the rear ends 682, 702 (that serves as another optical surface), the second ends 692, 702 of the pluralities of first and second waveguides 690, 710 are laterally interspersed with one another in an alternating manner to form a two-dimensional array having a zig-zag configuration with a larger pitch.

In certain embodiments, PLC members can be actively aligned, according to which waveguide locations on upper and lower PLC members end faces may be measured, and then one PLC member is moved relative to the other until the waveguides of the respective PLC members are in a desired orientation. Active alignment may be performed in one dimension, such as laterally (e.g., along the x-axis), or in multiple dimensions (e.g., x, y, and angular z directions). Feedback on waveguide position can be provided by various measurements, such as: (i) optical coupling into MCF cores and single-mode fiber FAUs positioned proximate to respective optical surfaces of an optical assembly; (ii) far field camera measurement of relative waveguide locations subjected to backside illumination (whereby aligning both sides may entail alternating between illuminating a single-mode fiber FAI end face and observing a MCF end face, and vice-versa); (iii) optical microscope observation of stacked waveguide locations from above or below stacked PLC members (e.g., using laser confocal microscopy or laser scanning confocal microscopy), or (iv) interferometric wavefront measurement (e.g., via a Nomarscki microscope or Phasics measurement system (commercially available from Phasics Corp., San Francisco, CA)), whereby two PLC members having associated waveguides are laterally displaced relative to one another until they overlap, producing a maximum value in a measured phase shift). During an active alignment process, adhesive may be displaced in a gap between upper and lower PLC members to allow the PLC members to be aligned.

Figure 35A:
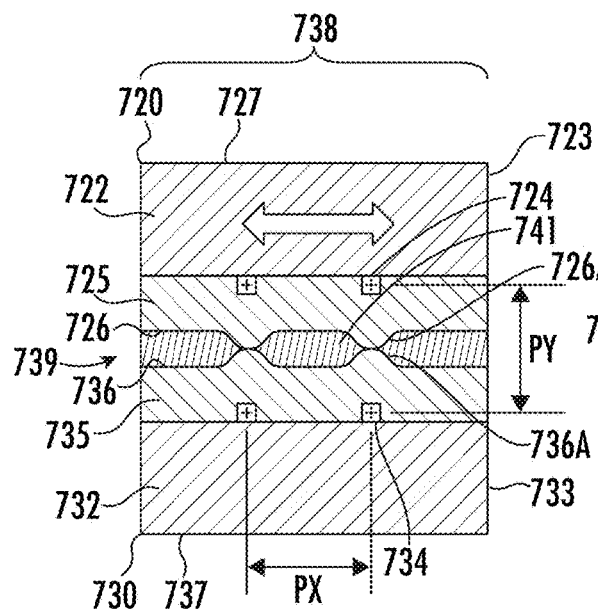
FIG. 35A is a cross-sectional view of a portion of an optical assembly including first and second PLC members each having a glass substrate and deposited waveguides embedded in glass overcladding material with rounded ridges of locally increased thickness that are registered with the waveguides, with adhesive material arranged between the PLC members, and with left-right arrows showing a direction of lateral (X-axis) active alignment between the PLC members.

FIG. 35A is a cross-sectional view of a portion of an optical assembly 738 including first and second PLC members 720, 730 subject to lateral (x-axis) alignment. Each PLC member 720, 730 has a glass substrate 722, 732 and deposited waveguides 724, 734 embedded in overcladding material 725, 735 with rounded ridges 726A, 736A of locally increased thickness that are registered with the waveguides 724, 734 and that contact one another. Adhesive material 741 is arranged between the PLC members 720, 730 at an inter-PLC interface, with the adhesive material 741 contacting inner faces 726, 736 that oppose outer faces 727, 737 of the PLC members 720, 730, and with sides 723, 733 extending between the inner faces 726, 736 and the outer faces 727, 737. Left-right arrows (superimposed over the substrate 722) show a direction of lateral (X-axis) active alignment between the PLC members 720, 730.

Figure 35B:
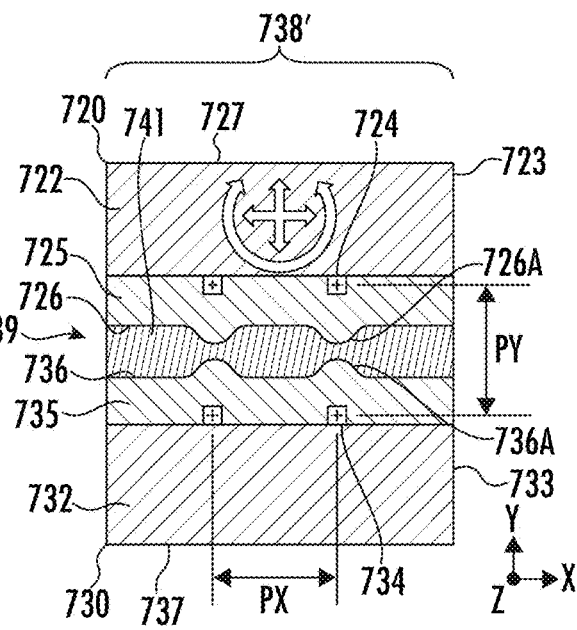
FIG. 35B is a cross-sectional view of a portion of an optical assembly including first and second PLC members each having a glass substrate and deposited waveguides embedded in glass overcladding material with rounded ridges of locally increased thickness that are registered with the waveguides, with adhesive material arranged between the PLC members, and with multiple arrows showing directions (i.e., X-axis displacement, Y-axis displacement, and Z-axis rotation) of active alignment between the PLC members.

FIG. 35B is a cross-sectional view of a portion of an optical assembly 738' including first and second PLC members 720, 730 that are identical to those shown in FIG. 35A (and therefore will not be described again), but with the rounded ridges 726A, 736A being displaced from one another in a non-contacting relationship, with a thicker layer of adhesive material 741 arranged between inner surfaces 726, 736 of the PLC members 720, 730. Such arrangement permits a greater degree of freedom of movement of the PLC members 720, 730 relative to one another. Multiple arrows (superimposed over the substrate 722 of the first PLC member 720) show directions (i.e., X-axis displacement, Y-axis displacement, and Z-axis rotational degree) in which the PLC members 720, 730 may be active aligned relative to one another.

Figure 36A:
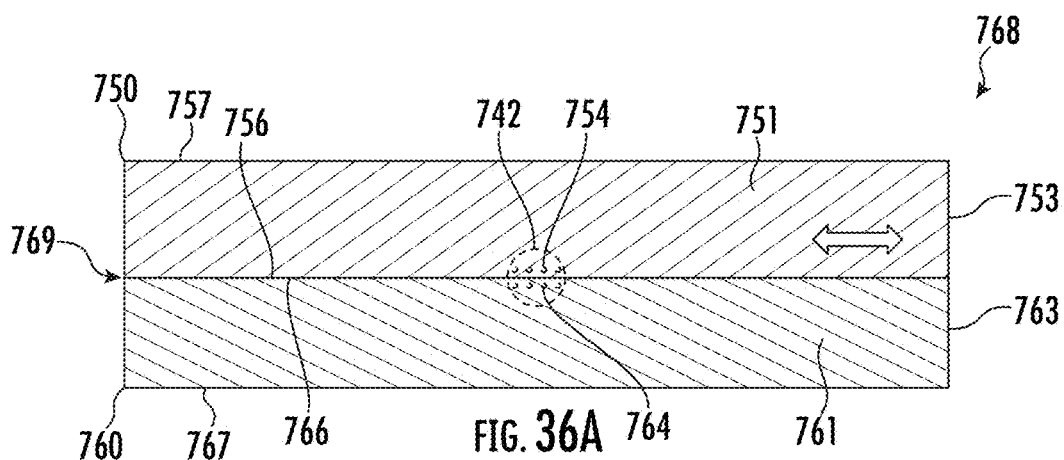
FIG. 36A is an elevational view of a front end of an optical assembly including first and second PLC members each having four embedded waveguides forming a two-dimensional array having a first pitch suitable for making optical connections with cores of a MCF, with left-right arrows showing directions of active alignment between the PLC members.
Figure 36B:
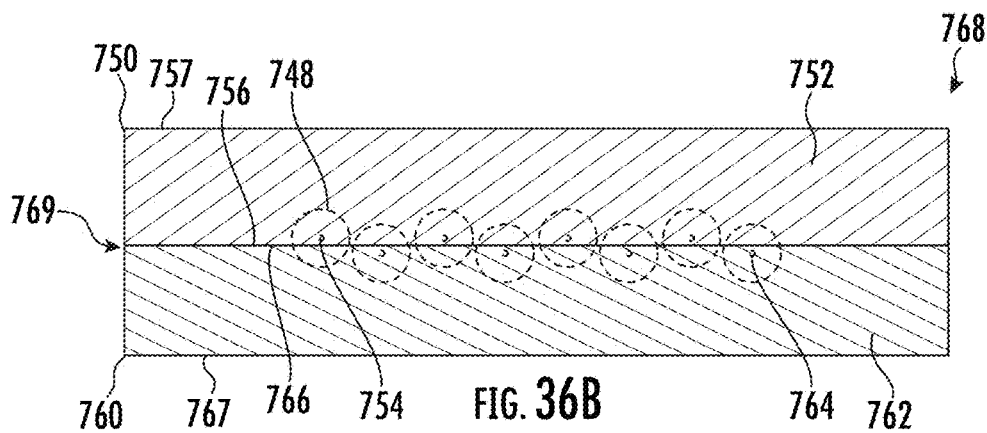
FIG. 36B is an elevational view of a rear end of the optical assembly of FIG. 36A, with waveguides of the first and second PLC members forming a two-dimensional array having a zig-zag configuration and a second pitch, suitable for making optical connections with cores of individual optical fibers shown in dashed line format.

FIGS. 36A and 36B are elevational views of a front end and a rear end, respectively, of an optical assembly 768 including first and second PLC members 750, 760 each having four waveguides 754, 764 embedded in a substrate. Each PLC member 750, 760 has an inner face 756, 766, an outer face 757, 767, and sides 753, 763. The waveguides 754, 764 are positioned proximate to the inner faces 756, 766. As shown in FIG. 36A, each PLC member 750, 760 has a front end 751, 761, and the waveguides 754, 764 form a two-dimensional array having a first pitch that is suitable for making optical connections with cores of a MCF (with an outline of a MCF 742 shown in dashed lines), wherein left-right arrows (superimposed over the first PLC member 751) show directions of active alignment between the PLC members 750, 760. As shown in FIG. 36B, each PLC member 750, 760 has a rear end 752, 762, and the waveguides 754, 764 form a two-dimensional array having a zig-zag configuration and a second pitch, suitable for making optical connections with cores of individual optical fibers (748, shown in dashed line format) of an externally arranged FAU (not shown). A thin layer of adhesive material, optionally index matched to surrounding material of the PLC members 750, 760) may be arranged at an interface 769 between the PLC members 750, 760.

Figure 37A:
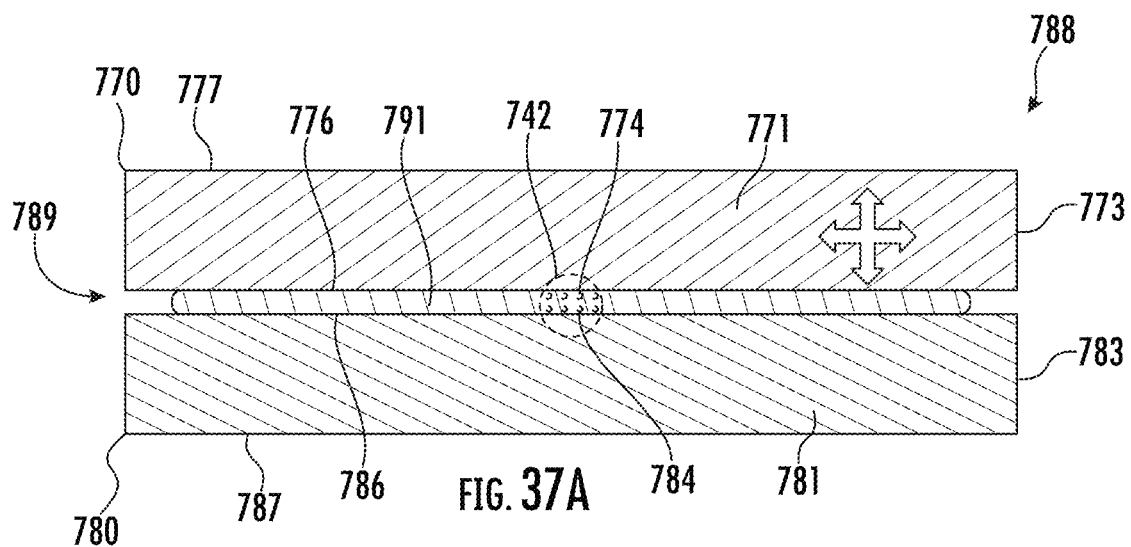
FIG. 37A is an elevational view of a front end of an optical assembly including first and second PLC members each having deposited waveguides forming a two-dimensional array having a first pitch suitable for making optical connections with cores of a MCF, with adhesive material between the PLC members, and with arrows showing left-right and up-down directions of active alignment between the PLC members.
Figure 37B:
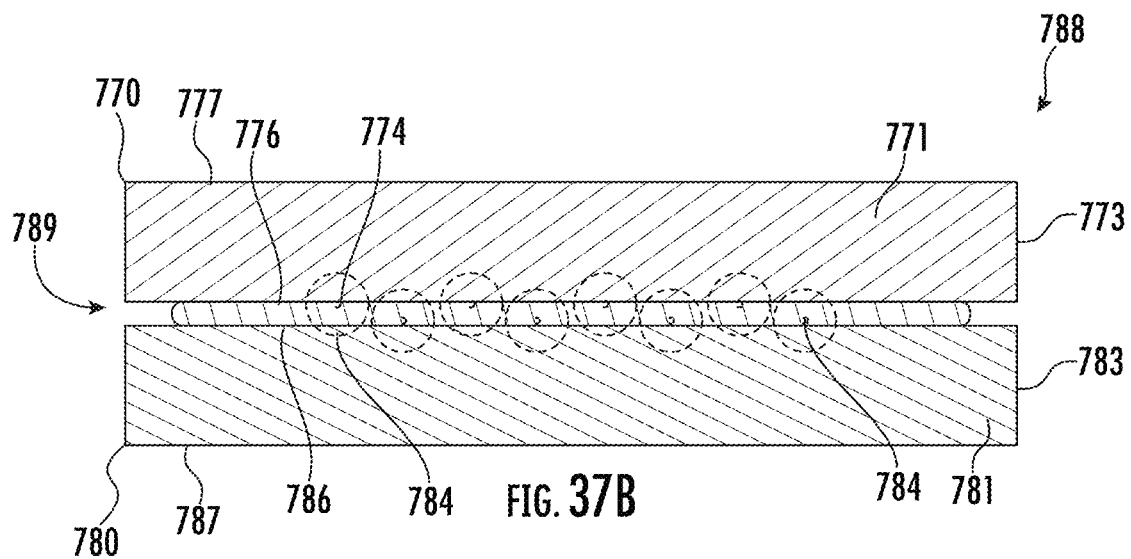
FIG. 37B is an elevational view of a rear end of the optical assembly of FIG. 37A, with waveguides of the first and second PLC members forming a two-dimensional array having a zig-zag configuration and a second pitch, suitable for making optical connections with cores of individual optical fibers shown in dashed line format.

FIGS. 37A and 37B are elevational views of a front end and a rear end, respectively, of an optical assembly 788 including first and second PLC members 770, 780 each having four deposited waveguides 774, 784. Each PLC member 770, 780 has an inner face 776, 786, an outer face 777, 787, and sides 773, 783, wherein the deposited waveguides 774, 784 are positioned proximate to the inner faces 776, 786. As shown in FIG. 37A, each PLC member 770, 780 has a front end 771, 781, and the waveguides 774, 784 form a two-dimensional array having a first pitch that is suitable for making optical connections with cores of a MCF (with an outline of a MCF 742 shown in dashed lines), wherein crossing arrows (superimposed over the first PLC member 770) show directions of active alignment between the PLC members 770, 780. A relatively thick layer of adhesive material 791, optionally index matched to surrounding material of the PLC members 770, 780, is arranged at an interface 789 between the PLC members 770, 780 and permits movement between the PLC members 770, 780 in horizontal and vertical directions. As shown in FIG. 37B, each PLC member 770, 780 has a rear end 772, 782, and the waveguides 774, 784 form a two-dimensional array having a zig-zag configuration and a second pitch, suitable for making optical connections with cores of individual optical fibers (748, shown in dashed line format) of an externally arranged FAU (not shown).

Optical assemblies according to various embodiments may be used as fanout assemblies for interfacing 2D arrays of fiber cores having a first pitch and/or orientation to 2D arrays of fiber cores having a second pitch and/or orientation.

Various sequences may be utilized for producing V-grooves, waveguides, and fiducial marks or alignment structures in body structures of PLC members. In certain embodiments, V-grooves may be formed (e.g., by sawing or etching) prior to fabrication of waveguides (e.g., by ion exchange, laser writing, or dielectric deposition). In certain embodiments, waveguides may be formed prior to fabrication of V-grooves. Depending on the materials used and fabrication techniques, fiducial marks or alignment structures marks may be formed either before to or after waveguide fabrication, and either before or after V-grooves are formed.

Those skilled in the art will appreciate that other modifications and variations can be made without departing from the spirit or scope of the invention.

Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. An optical assembly comprising:
    a first planar lightwave circuit (PLC) member including a first body structure bounded by a first inner face and a first outer face, and defining a plurality of first waveguides in or on the first body structure, wherein the plurality of first waveguides extends between a first input optical surface and a first output optical surface of the first body structure, and wherein the first output surface is an optical surface of the first body structure and in a transverse plane orthogonal to the first inner face and the first outer face; and
    a second PLC member including a second body structure bounded by a second inner face and a second outer face, and defining a plurality of second waveguides in or on the second body structure, wherein the plurality of second waveguides extends between a second input optical surface and a second output optical surface of the second body structure, and wherein the second output surface is an optical surface of the second body structure and in a transverse plane orthogonal to the second inner face and the second outer face;
    wherein the first and second PLC members are in a stacked arrangement with the first inner face of the first PLC member facing the second inner face of the second PLC member, and with the optical surface of the first PLC member aligned with the optical surface of the second PLC member; and
    wherein the plurality of first waveguides is arranged in a first horizontal plane at both the first input optical surface and the first output optical surface, the plurality of second waveguides is arranged in a second horizontal plane at both the second input optical surface and the second output optical surface, the second horizontal plane is vertically offset from the first horizontal plane such that the plurality of first waveguides is vertically offset from the plurality of second waveguides at the first and second input optical surfaces and at the first and second output optical surfaces, with the transverse plane including ends of the plurality of first waveguides and ends of the plurality of second waveguide alternately arranged in a lateral direction.

2. The optical assembly of claim 1, wherein:
    at the first output optical surface, the first waveguides of the plurality of first waveguides are spaced at a first pitch;
    at the second output optical surface, the second waveguides of the plurality of second waveguides are spaced at the first pitch;
    at the first input optical surface, the first waveguides of the plurality of first waveguides are spaced at a second pitch that differs from the first pitch;
    at the second input optical surface, the second waveguides of the plurality of second waveguides are spaced at the second pitch.

3. The optical assembly of claim 1, wherein:
    the first body structure comprises a front end and a rear end; and
    the optical surface of the first body structure is positioned at either the front end or the rear end.

4. The optical assembly of claim 1, wherein:
    the first body structure comprises a front end and a rear end; and
    the optical surface of the first body structure is arranged at an intermediate position between the front end and the rear end.

5. The optical assembly of claim 4, wherein an array of V-grooves is defined in the first body structure between the intermediate position and either the front end or the rear end, the array of V-grooves supporting (i) a plurality of first optical fibers having optical fiber cores registered with the plurality of first waveguides and (ii) a plurality of second optical fibers having optical fiber cores registered with the plurality of second waveguides.

6. The optical assembly of claim 1, wherein:
    first peripheral alignment grooves are defined in the first inner face of the first body structure;
    second peripheral alignment grooves are defined in the second inner face of the second body structure; and
    tubular alignment members are arranged between paired first and second peripheral V-grooves.

7. The optical assembly of claim 6, wherein the tubular alignment members project beyond either (a) front ends of the first and second body structures, or (b) rear ends of the first and second body structures.

8. The optical assembly of claim 6, further comprising:
    a first reference V-groove defined in the first inner face of the first body structure, wherein the first reference V-groove is substantially parallel to, and is shallower than, the first peripheral V-grooves; and a second reference V-groove defined in the second inner face of the second body structure, wherein the second reference V-groove is substantially parallel to, and is shallower than, the second peripheral V-grooves.

9. The optical assembly of claim 1, wherein:
the plurality of first waveguides comprises a plurality of first ion exchange waveguides or first laser-written waveguides that is recessed relative to the first inner face and is positioned closer to the first inner face than the first outer face; and
the plurality of second waveguides comprises a plurality of second ion exchange waveguides or second laser-written waveguides that is recessed relative to the second inner face and is positioned closer to the second inner face than the second outer face.

10. The optical assembly of claim 1, further comprising:
at least one first fiducial mark on the first inner face; and
at least one second fiducial mark on the second inner face;
wherein the at least one second fiducial mark is registered with the at least one first fiducial mark.

11. The optical assembly of claim 1, further comprising at least one of the following features (i) or (ii):
(i) the first body structure comprises a first substrate and a first overcladding layer, wherein the plurality of first waveguides is arranged between the first substrate and the first overcladding layer;
(ii) the second body structure comprises a second substrate and a second overcladding layer, wherein the plurality of second waveguides is arranged between the second substrate and the second overcladding layer.

12. The optical assembly of claim 1, wherein:
the plurality of first waveguides comprises a plurality of deposited dielectric first waveguides positioned closer to the first inner face than the first outer face; and
the plurality of second waveguides comprises a plurality of deposited dielectric second waveguides positioned closer to the second inner face than the second outer face.

13. A method for fabricating an optical assembly, the method comprising:
defining a group of waveguides in or on a single body having an inner face and an outer face, the group of waveguides being arranged closer to the inner face than the outer face;
dividing the single body to form first and second planar lightwave circuit (PLC) members, wherein (i) the first PLC member has a first body structure bounded by a first inner face and a first outer face, and has a plurality of first waveguides as a first portion of the group of waveguides, the plurality of first waveguides extending from an optical surface of the first body structure that is in a transverse plane orthogonal to the first inner face and the first outer face, and (ii) the second PLC member has a second body structure bounded by a second inner face and a second outer face, and has a plurality of second waveguides as a second portion of the group of waveguides, the plurality of second waveguides extending from an optical surface of the second body structure that is in a transverse plane orthogonal to the second inner face and the second outer face; and
stacking the first PLC member and the second PLC member with the first inner face of the first PLC member facing the second inner face of the second PLC member, and with the optical surface of the first PLC member aligned with the optical surface of the second PLC member;
wherein the plurality of first waveguides is arranged in a first horizontal plane, the plurality of second waveguides is arranged in a second horizontal plane that is offset from the first horizontal plane, with the transverse plane including ends of the plurality of first waveguides and ends of the plurality of second waveguide alternately arranged in a lateral direction.

14. The method of claim 13, further comprising polishing the optical surface of the first body structure and the optical surface of the second body structure.

15. The method of claim 13, wherein:
the optical surface of the first body structure comprises a first output optical surface;
the optical surface of the second body structure comprises a second output optical surface;
the first body structure further comprises a first input optical surface that opposes the first output optical surface;
the second body structure further comprises a second input optical surface that opposes the second output optical surface;
the plurality of first waveguides extends between the first input optical surface and the first output optical surface; and
the plurality of second waveguides extends between the second input optical surface and the second output optical surface.

16. The method of claim 15, wherein
at the first output optical surface, the first waveguides of the plurality of first waveguides are spaced at a first pitch;
at the second output optical surface, the second waveguides of the plurality of second waveguides are spaced at the first pitch;
at the first input optical surface, the first waveguides of the plurality of first waveguides are spaced at a second pitch that differs from the first pitch;
at the second input optical surface, the second waveguides of the plurality of second waveguides are spaced at the second pitch.

17. The method of claim 13, further comprising:
defining peripheral alignment grooves in the inner face of the single body, wherein after the dividing of the single body, the first PLC member comprises first peripheral V-grooves defined in the first inner face, and the second PLC member comprises second peripheral alignment grooves defined in the second inner face; and
providing tubular alignment members between pairs of first peripheral alignment grooves and second peripheral alignment grooves.

18. The method of claim 17, further comprising defining a reference V-groove in the inner face of the single body, wherein the reference V-groove is substantially parallel to, and is shallower than, each of the peripheral alignment grooves defined in the inner face of the single body.

19. The method of claim 13, further comprising depositing an overcladding layer over the group of waveguides defined in or on the single body.

* * * * *